United States Patent
Yamashita et al.

(10) Patent No.: US 9,506,676 B2
(45) Date of Patent: Nov. 29, 2016

(54) AIR-CONDITIONING APPARATUS

(75) Inventors: Koji Yamashita, Tokyo (JP); Hiroyuki Morimoto, Tokyo (JP); Katsuhiro Ishimura, Tokyo (JP); Shinichi Wakamoto, Tokyo (JP); Naofumi Takenaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 503 days.

(21) Appl. No.: 13/885,766

(22) PCT Filed: Jan. 31, 2011

(86) PCT No.: PCT/JP2011/000512
§ 371 (c)(1),
(2), (4) Date: May 16, 2013

(87) PCT Pub. No.: WO2012/104891
PCT Pub. Date: Aug. 9, 2012

(65) Prior Publication Data
US 2013/0333862 A1 Dec. 19, 2013

(51) Int. Cl.
*F25B 29/00* (2006.01)
*F25B 1/10* (2006.01)
*F25B 9/00* (2006.01)
(Continued)

(52) U.S. Cl.
CPC ............... *F25B 29/003* (2013.01); *F25B 1/10* (2013.01); *F25B 9/006* (2013.01); *F25B 13/00* (2013.01); *F25B 25/005* (2013.01); *F25B 2313/0272* (2013.01); *F25B 2313/02732* (2013.01); *F25B 2313/02741* (2013.01); *F25B 2400/121* (2013.01); *F25B 2500/08* (2013.01); *F25B 2700/21152* (2013.01)

(58) Field of Classification Search
CPC .................. F25B 29/003; F25B 9/006; F25B 2700/21152; F25B 2500/08; F25B 2400/121; F25B 2313/0272; F25B 2313/02732
See application file for complete search history.

(56) References Cited

U.S. PATENT DOCUMENTS 4,831,835 A * 5/1989 Beehler et al. .............. 62/196.1
2003/0074914 A1* 4/2003 Hirakanu ................ F25B 13/00
62/324.6

(Continued)

FOREIGN PATENT DOCUMENTS

JP  2002061991 A * 2/2002
JP  2002-107002 A    4/2002

(Continued)

OTHER PUBLICATIONS

International Search Report of the International Searching Authority mailed Mar. 22, 2011 for the corresponding international application No. PCT/JP2011/000512 (with English translation).

(Continued)

*Primary Examiner* — Emmanuel Duke
(74) *Attorney, Agent, or Firm* — Posz Law Group, PLC

(57) ABSTRACT

An air-conditioning apparatus controls that a discharge temperature does not become too high with a refrigerant whose compressor discharge temperature readily rises, and thus suppress degradation of the refrigerant and a refrigerating machine oil. An injection pipe that injects a heat source side refrigerant into a compressor is installed, connected a pipe between a backflow prevention device and an opening and closing device installed on a branching pipe, and an aperture unit in the compressor.

19 Claims, 24 Drawing Sheets

(51) Int. Cl.
*F25B 13/00* (2006.01)
*F25B 25/00* (2006.01)

(56) References Cited

U.S. PATENT DOCUMENTS

| | | | |
|---|---|---|---|
| 2006/0080989 A1* | 4/2006 | Aoki | F25B 40/00 62/324.4 |
| 2007/0151270 A1* | 7/2007 | Matsunaga et al. | 62/216 |
| 2009/0013700 A1* | 1/2009 | Unezaki et al. | 62/77 |
| 2009/0199581 A1* | 8/2009 | Ushijima | F25B 30/02 62/238.7 |
| 2009/0241569 A1* | 10/2009 | Okada | F25B 40/00 62/196.1 |
| 2010/0192607 A1* | 8/2010 | Unezaki | F25B 13/00 62/238.7 |

FOREIGN PATENT DOCUMENTS

| | | | | |
|---|---|---|---|---|
| JP | 2003-314930 A | 11/2003 | | |
| JP | 2005-282972 A | 10/2005 | | |
| JP | 2008157550 A | * 7/2008 | | |
| JP | 2009-127902 A | 6/2009 | | |
| JP | 2010-112579 A | 5/2010 | | |
| JP | WO 2010113296 A1 | * 10/2010 | | F24F 3/065 |
| WO | 2009/154149 A1 | 12/2009 | | |
| WO | 2010/049998 A1 | 5/2010 | | |
| WO | 2010/113296 A1 | 10/2010 | | |
| WO | WO 2010113296 A1 | * 10/2010 | | F24F 11/02 |
| WO | WO 2010129920 A1 | * 11/2010 | | C09K 5/045 |
| WO | WO 20100129920 A1 | * 11/2010 | | C09K 5/04 |

OTHER PUBLICATIONS

Office Action mailed Jan. 6, 2015 issued in corresponding JP patent application No. 2012-555549.

Office Action mailed Mar. 11, 2014 in corresponding Japanese patent application No. 2012-555549 (with English translation).

* cited by examiner

F I G. 3
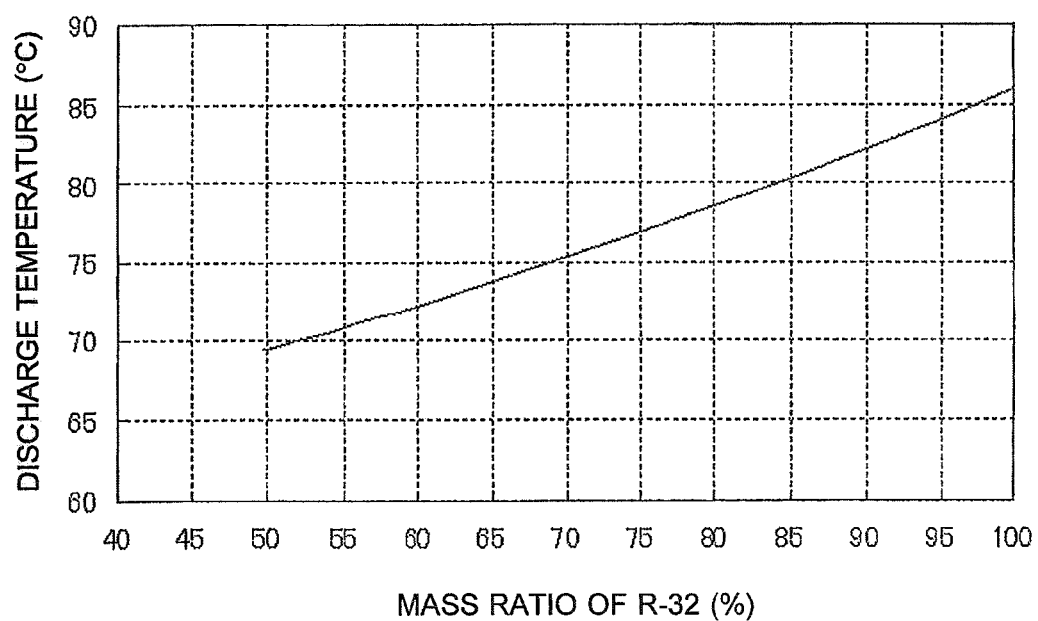

AIR-CONDITIONING APPARATUS

CROSS REFERENCE TO RELATED APPLICATION

This application is a U.S. national stage application of International Application No. PCT/JP2011/000512 filed on Jan. 31, 2011.

TECHNICAL FIELD

The present invention relates to an air conditioning apparatus applied to a multi-air-conditioning system for a building, for example.

BACKGROUND ART

Among conventional air-conditioning apparatus such as multi-air-conditioning systems for a building, there exists an air-conditioning apparatus that, by circulating a refrigerant from an outdoor unit to a relay unit and circulating a heat medium such as water from the relay unit to indoor units, realizes a cooling and heating mixed operation by reducing the transport power for a heat medium such as water while circulating the heat medium through indoor units (see Patent Literature 1, for example).

There also exists an air-conditioning apparatus which includes a circuit that performs liquid injection from a high-pressure liquid pipe of the refrigeration cycle into a compressor in order to reduce the discharge temperature of the compressor, and which is able to apply control to keep the discharge temperature to a set temperature regardless of the operating state (see Patent Literature 2, for example).

Furthermore, there also exists an air-conditioning apparatus using R32 as a refrigerant that injects refrigerant from the outlet side of a gas liquid separator installed on a high-pressure liquid pipe of the refrigeration cycle into a compressor whose hermetically sealed container is in a discharge pressure environment (a high-pressure shell compressor) (see Patent Literature 3, for example).

CITATION LIST

Patent Literature

Patent Literature 1: WO2010/049998 (pp. 3, FIG. 1, etc.)
Patent Literature 2: Japanese Unexamined Patent Application Publication No. 2005-282972 (pp. 4, FIG. 1, etc.)
Patent Literature 3: Japanese Unexamined Patent Application Publication No. 2009-127902 (pp. 4, FIG. 1, etc.)

SUMMARY OF INVENTION

Technical Problem

However, with an air-conditioning apparatus such as a multi-air-conditioning system for a building described in Patent Literature 1, although the case of using a refrigerant such as R410A as the refrigerant is not problematic, the case of using R32 refrigerant or the like is problematic in that there is a possibility of the compressor's discharge temperature becoming too high and the refrigerant or refrigerating machine oil degrading during times such as a heating operation with a low outside air temperature. Also, although there is a description of a simultaneous cooling and heating operation, a method of lowering the discharge temperature is not described. Note that in the multi-air-conditioning system for a building, an expansion device such as an electronic expansion valve that decreases the pressure of the refrigerant is installed in the relay unit or the indoor units separated from the outdoor unit.

Also, in the air-conditioning apparatus described in Patent Literature 2, only an injection method from a high-pressure liquid pipe is described, and there is a problem of being unable to address issues such as the case of reversing the circulation flow of the refrigeration cycle (switching to the cooling operation or the heating operation). Also, the cooling and heating mixed operation is not supported.

Furthermore, with the air-conditioning apparatus described in Patent Literature 3, although an injection method from a high-pressure liquid pipe during both the cooling operation and the heating operation using multiple check vales is disclosed, there is a problem in that an expansion device such as an electronic expansion valve is not installed in the indoor units, and can only be applied to the case of installing in the outdoor unit. Note that the air-conditioning apparatus uses a high-pressure shell structure as the compressor, and does not support the cooling and heating mixed operation.

The present invention, being devised in order to solve problems such as the above, takes as an object thereof to obtain an air-conditioning apparatus able to reliably apply control such that the discharge temperature does not become too high with a refrigerant such as R32 whose compressor discharge temperature readily rises, and thus suppress degradation of the refrigerant and the refrigerating machine oil.

Solution to Problem

An air-conditioning apparatus according to the present invention is provided with a refrigeration cycle in which a compressor that compresses a low pressure refrigerant and discharges a high pressure refrigerant, a first heat exchanger that exchanges heat between a refrigerant and an external fluid, a first expansion device that depressurizes the refrigerant, and one or more second heat exchangers that exchange heat between the refrigerant and the external fluid are connected by refrigerant pipes, an injection pipe that circulates the refrigerant split off from a refrigerant flow path through which the refrigerant that has radiated in the first heat exchanger or the one or more second heat exchangers flows, and a controller that carries out driving control of the compressor. The refrigerant is R32, a refrigerant mixture containing of R32 and HFO1234yf with an R32 mass ratio of 62% or greater, or a refrigerant mixture containing of R32 and HFO1234ze with an R32 mass ratio of 43% or greater. The compressor includes a compression chamber inside a hermetically sealed container, has a low-pressure shell structure in which the inside of the hermetically sealed container is in a low-pressure refrigerant pressure environment that suctions a low-pressure refrigerant inside the hermetically sealed container into the compression chamber, and includes an aperture unit in part of the compression chamber. The injection pipe is connected to the aperture unit via a second expansion device that depressurizes the refrigerant flowing thereinto. The controller controls an injection quantity of refrigerant introduced into the compression chamber from the injection pipe via the aperture unit by controlling an opening degree of the second expansion device.

Advantageous Effects of Invention

According to the present invention, by injecting a refrigerant into a compression chamber of a compressor regardless of the operating mode, it is possible to apply control such that the discharge temperature does not become too high and prevent degradation of the refrigerant and the refrigerating machine oil, even in the case of using a refrigerant such as R32 whose compressor discharge temperature readily rises, thus enabling safe operation.

BRIEF DESCRIPTION OF DRAWINGS

FIG. 3 is a diagram illustrating change in discharge temperature with respect to the mass ratio of R32 in a mixed refrigerant in the case of estimating the discharge temperature with a method similar to that described earlier for a mixed refrigerant containing of R32 and HFO1234yf, a tetrafluoropropene-based refrigerant with a low global warming potential exemplified by the chemical formula $CF_3CF=CH_2$.

DESCRIPTION OF EMBODIMENTS

Embodiment 1

Configuration of Air-Conditioning Apparatus

Figure 1:
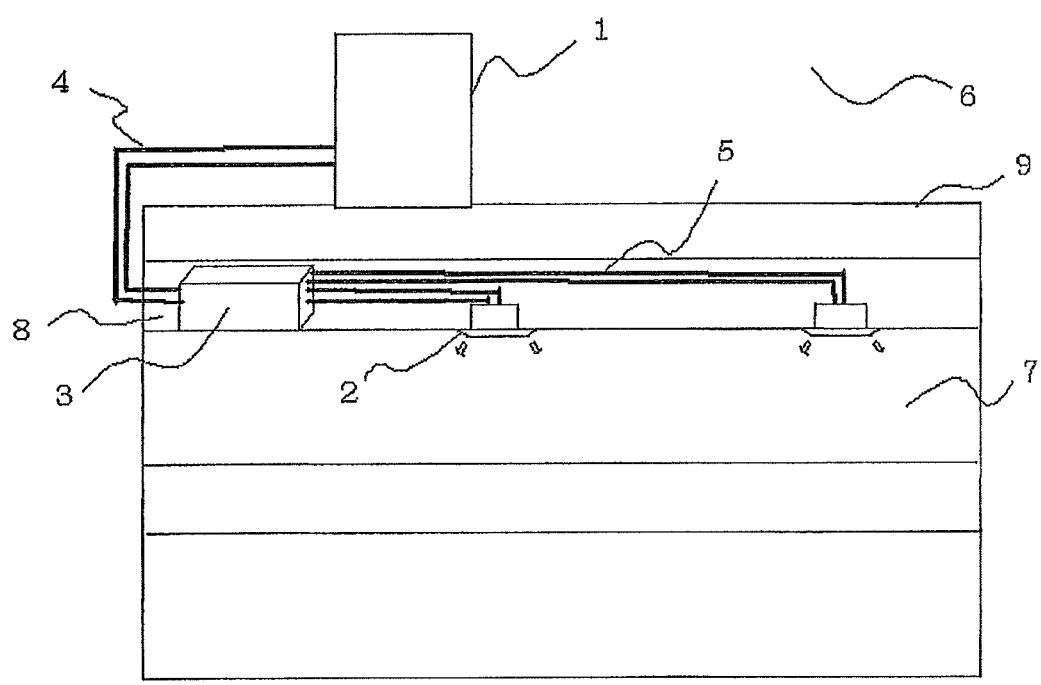
FIG. 1 is a schematic diagram illustrating an exemplary installation of an air-conditioning apparatus according to Embodiment 1 of the present invention.

FIG. 1 is a diagram illustrating an exemplary installation of an air-conditioning apparatus according to Embodiment 1 of the present invention.

With the air-conditioning apparatus according to Embodiment 1, each indoor unit is able to freely select a cooling operation or a heating operation as the operating mode by utilizing refrigeration cycles (the refrigerant circuit A and the heat medium circuit B described later) that circulate refrigerant (the heat source side refrigerant and the heat medium). In addition, the air-conditioning apparatus according to Embodiment 1 implements a technique of indirectly utilizing the heat source side refrigerant. In other words, the air-conditioning apparatus is configured to transfer cooling energy or heating energy stored in the heat source side refrigerant to the heat medium, which is a refrigerant that differs from the heat source side refrigerant, and cools or heats an air-conditioned space with the cooling energy or the heating energy stored in the heat medium.

As illustrated in FIG. 1, the air-conditioning apparatus according to Embodiment 1 includes one outdoor unit 1 which is the heat source unit, multiple indoor units 2, and a heat medium relay unit 3 interposed between the outdoor unit 1 and the indoor units 2. The outdoor unit 1 and the heat medium relay unit 3 are connected by refrigerant pipes 4 that circulate the heat source side refrigerant. The heat medium relay unit 3 and the indoor units 2 are connected by heat medium pipes 5 that circulate the heat medium. Also, cooling energy or heating energy generated at the outdoor unit 1 is transferred to the indoor units 2 via the heat medium relay unit 3.

The outdoor unit 1 is typically installed in an outdoor space 6, which is a space outside a building 9 or the like (such as a roof), and provides cooling energy or heating energy to the indoor units 2 via the heat medium relay unit 3.

Note that although FIG. 1 illustrates the case of the outdoor unit 1 being installed in the outdoor space 6 as an example, the configuration is not limited thereto. For example, the outdoor unit 1 may also be installed in an enclosed space such as a ventilated machine room, and may be installed inside the building 9 insofar as waste heat can be exhausted outside the building 9 by an exhaust duct. Alternatively, the outdoor unit 1 may be installed inside the building 9 in the case of using a water-cooled type. Installing the outdoor unit 1 in such locations is not particularly problematic.

The indoor units 2 are disposed at positions able to supply cooled air or heated air to an indoor space 7, which is a space inside the building 9 (such as a room), and provide cooled air or heated air to the indoor space 7 to be air-conditioned.

Note that although FIG. 1 illustrates the case where the indoor units 2 are ceiling cassettes as an example, the configuration is not limited thereto, and the indoor units 2 may be of any type, such as ceiling-concealed or ceiling-suspended units, insofar as the indoor units 2 are capable of expelling heated air or cooled air into the indoor space 7 directly or via means such as ducts.

The heat medium relay unit 3 is configured as a separate housing from the outdoor unit 1 and the indoor units 2 and is installable in a separate location from the outdoor space 6 and the indoor space 7, and is connected to the outdoor unit 1 and the indoor units 2 by the refrigerant pipes 4 and the heat medium pipes 5, respectively. Also, the heat medium relay unit 3 transfers cooling energy or heating energy supplied from the outdoor unit 1 to the indoor units 2, or more specifically, exchanges heat between a heat source side refrigerant at the outdoor unit 1 and a heat medium (such as water or antifreeze) at the indoor units 2 that differs from the heat source side refrigerant. Additionally, FIG. 1 illustrates an example in which the heat medium relay unit 3, although inside the building 9, is installed in a space 8 which is a separate space from the indoor space 7, such as above the ceiling. Also, since the heat medium relay unit 3 is provided close to the indoor units 2 installed in the indoor space 7, the pipes for the circuit that circulates the heat medium (the heat medium circuit B described later) can be shortened. In so doing, the heat medium transport power in the heat medium circuit B may be reduced, leading to energy saving.

Note that although the heat medium relay unit 3 is installed in the space 8 as illustrated in FIG. 1, the configuration is not limited thereto, and the heat medium relay unit 3 may also be installed in a shared space containing an elevator, for example. In addition, although the heat medium relay unit 3 is provided close to the indoor units 2 as described above, the configuration is not limited thereto, and the heat medium relay unit 3 may also be installed in the vicinity of the outdoor unit 1. In this case, however, much heat medium transport power will be required if the distance from the heat medium relay unit 3 to the indoor units 2 is rather long, and thus care must be taken not to squander the energy-saving advantages.

There are two refrigerant pipes 4, and the outdoor unit 1 is connected to the heat medium relay unit 3 by means of these two refrigerant pipes 4. Also, the heat medium pipes 5 are connected to the heat medium relay unit 3 and each of the indoor units 2, with the heat medium relay unit 3 being connected to each of the indoor units 2 by the two heat medium pipes 5. By using two pipes (the refrigerant pipes 4 and the heat medium pipes 5) to connect each unit (the outdoor unit 1, the indoor units 2, and the heat medium relay unit 3) in the air-conditioning apparatus according to Embodiment 1, achieving facilitated installation work.

However, the number of connected indoor units 2 and heat medium relay units 3 is not limited to the numbers illustrated in FIG. 1 and drawings such as FIG. 2 described later, and may be determined according to the building 9 where the air-conditioning apparatus according to Embodiment 1 is installed.

Furthermore, in the drawings hereinafter, including FIG. 1, the relative sizes of respective structural members are not limited to what is illustrated, which may differ from actual sizes in some cases.

Figure 2:
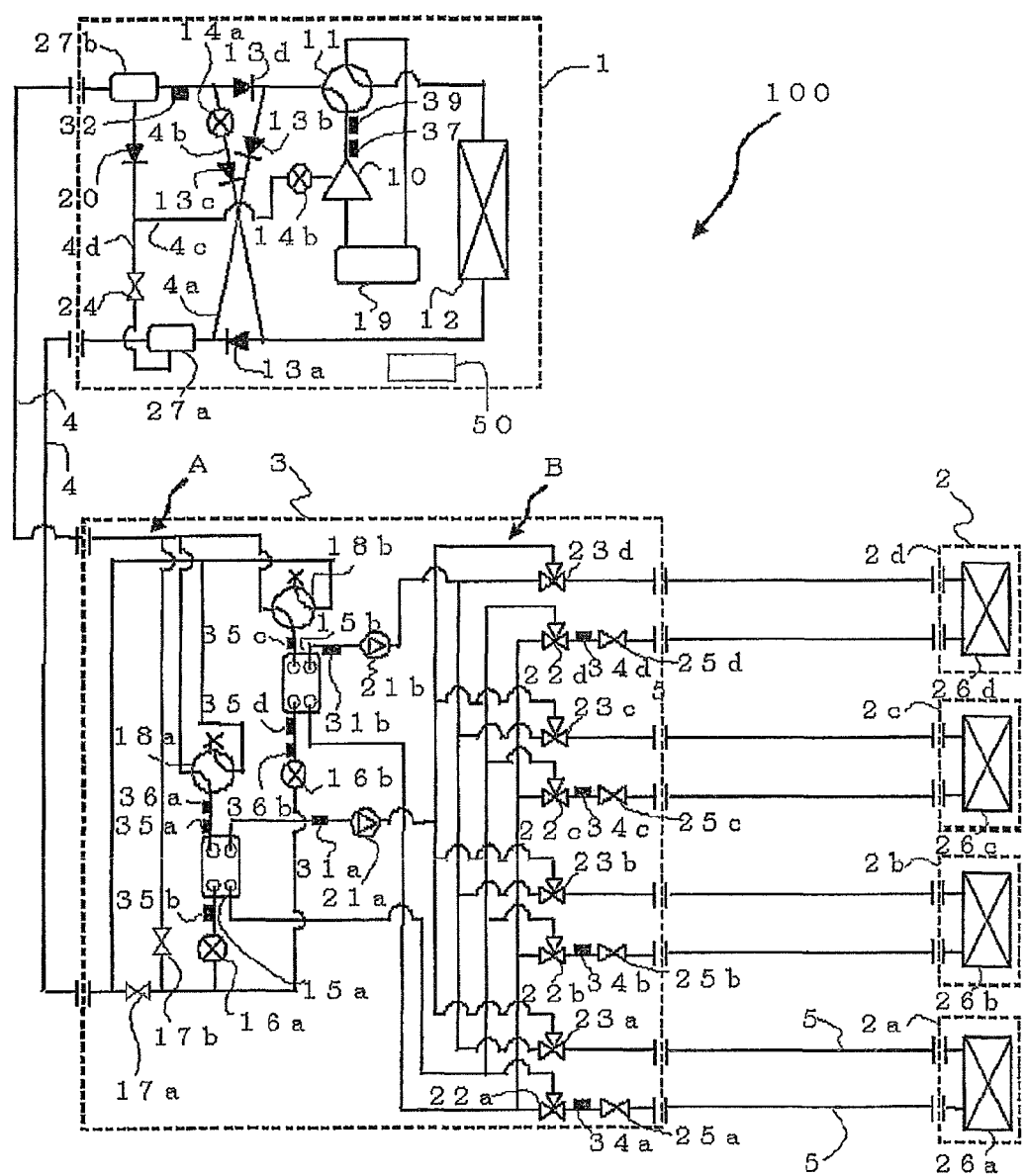
FIG. 2 is a schematic diagram illustrating an exemplary circuit configuration of an air-conditioning apparatus 100 according to Embodiment 1 of the present invention.

FIG. 2 is a diagram illustrating an exemplary circuit configuration of an air-conditioning apparatus (hereinafter designated the air-conditioning apparatus 100) according to Embodiment 1 of the present invention. Hereinafter, a detailed configuration of the air-conditioning apparatus 100 will be described with reference to FIG. 2.

As illustrated in FIG. 2, the outdoor unit 1 and the heat medium relay unit 3 are connected by the two refrigerant pipes 4 as described above. The refrigerant pipes 4 are respectively connected to a heat exchanger related to heat medium 15a and a heat exchanger related to heat medium 15b provided in the heat medium relay unit 3 by internal refrigerant pipes in the heat medium relay unit 3. Herein, the refrigerant circuit A described earlier refers to a refrigerant circuit made up of equipment connected by refrigerant pipes, including the refrigerant pipes 4 that connect the outdoor unit 1 and the heat medium relay unit 3, which circulate the heat source side refrigerant that exchanges heat with a heat medium respectively in the heat exchanger related to heat medium 15a and the heat exchanger related to heat medium 15b inside the heat medium relay unit 3. Specifically, the refrigerant circuit A is made up of a later-described compressor 10, a first refrigerant flow switching device 11, a heat source side heat exchanger 12, a gas liquid separator 27a, an opening and closing device 17, an expansion device 16, the refrigerant flow paths of the heat exchangers related to heat medium 15, a second refrigerant flow switching device 18, a gas liquid separator 27b, an accumulator 19, check valves 13a to 13d, expansion devices 14a and 14b, a backflow prevention device 20, and an opening and closing device 24, which are connected by refrigerant pipes. The relative connections among the above equipment constituting this refrigerant circuit A will be described in detail later.

In addition, the heat medium relay unit 3 and the indoor units 2 are connected by the two heat medium pipes 5 as described above. The heat medium pipes 5 are respectively connected to the heat exchanger related to heat medium 15*a* and the heat exchanger related to heat medium 15*b* provided in the heat medium relay unit 3 by internal heat medium pipes in the heat medium relay unit 3. Herein, the heat medium circuit B described earlier refers to a heat medium circuit made up of equipment connected by heat medium pipes, including the heat medium pipes 5 that connect the heat medium relay unit 3 to each of the indoor units 2, which circulate the heat medium that exchanges heat with the heat source side refrigerant respectively in the heat exchanger related to heat medium 15*a* and the heat exchanger related to heat medium 15*b* inside the heat medium relay unit 3. Specifically, the heat medium circuit B is made up of the heat medium flow paths of the heat exchangers related to heat medium 15, pumps 21, first heat medium flow switching devices 22, heat medium flow control devices 25, use side heat exchangers 26, and second heat medium flow switching devices 23 described later, which are connected by heat medium pipes. In addition, the heat medium that circulates through the heat medium circuit B is not particularly limited, and substances such as brine (antifreeze), water, a mixture of brine and water, or a mixture of water and a highly anticorrosive additive may be used. Using such a heat medium contributes to improved safety even if the heat medium leaks into the indoor space 7 via the indoor units 2, because a highly safe substance is used as the heat medium. The relative connections among the above equipment constituting the heat medium circuit B will be described in detail later.

As above, in the air-conditioning apparatus 100 according to Embodiment 1, the outdoor unit 1 and the heat medium relay unit 3 are connected via the heat exchanger related to heat medium 15*a* and the heat exchanger related to heat medium 15*b* provided in the heat medium relay unit 3, while the heat medium relay unit 3 and the indoor units 2 are also connected via the heat exchanger related to heat medium 15*a* and the heat exchanger related to heat medium 15*b*. In other words, in the air-conditioning apparatus 100, heat is exchanged between the heat source side refrigerant circulating through the refrigerant circuit A and the heat medium circulating through a heat medium circuit B by the heat exchanger related to heat medium 15*a* and the heat exchanger related to heat medium 15*b*.

Hereinafter, a configuration of the outdoor unit 1, the indoor units 2, and the heat medium relay unit 3 will be described in detail with reference to FIG. 2.

(Configuration of Outdoor Unit 1)

The outdoor unit 1 includes a compressor 10, a first refrigerant flow switching device 11 such as a four-way valve, a heat source side heat exchanger 12, an accumulator 19, and gas liquid separators 27*a* and 27*b*, which are connected in series by refrigerant pipes. The outdoor unit 1 is also equipped with a first connecting pipe 4*a*, a second connecting pipe 4*b*, an injection pipe 4*c*, a branching pipe 4*d*, check valves 13*a* to 13*d*, expansion devices 14*a* and 14*b*, a backflow prevention device 20, an opening and closing device 24, and a controller 50. Furthermore, the outdoor unit 1 includes a medium pressure detecting device 32, a discharge refrigerant temperature detecting device 37, and a high pressure detecting device 39 electrically connected to the controller 50. As described later, providing the above first connecting pipe 4*a*, the second connecting pipe 4*b*, and the check valves 13*a* to 13*d* makes it possible to keep the flow of refrigerant circulating into the heat medium relay unit 3 via the refrigerant pipes 4 going in a fixed direction, regardless of the operation requested by the indoor units 2.

The compressor 10 suctions the heat source side refrigerant in a gaseous state and compresses the heat source side refrigerant to a high temperature and high pressure state. The compressor 10 may be a variable-capacity inverter compressor, for example. The compressor 10 also includes a compression chamber inside a hermetically sealed container, and has a low-pressure shell structure in which the inside of the hermetically sealed container is in a low-pressure refrigerant pressure environment that suctions and compresses low-pressure refrigerant inside the hermetically sealed container into the compression chamber. In addition, an aperture unit is provided in a part of the compression chamber of the compressor 10, and connected thereto is the injection pipe 4*c* for introducing (injecting) the heat source side refrigerant into the interior of the compressor 10 from outside the hermetically sealed container via the aperture unit. When the rotation angle of the motor of the compressor 10 has reached a fixed angle, the aperture unit opens, establishing a communication with the interior of the compression chamber and the injection pipe 4*c*.

The first refrigerant flow switching device 11 switches between a flow of the heat source side refrigerant during a heating operation (the heating-only operating mode and the heating main operating mode described later) and a flow of the heat source side refrigerant during a cooling operation (the cooling-only operating mode and the cooling main operating mode described later).

The heat source side heat exchanger 12 functions as an evaporator during the heating operation, functions as a condenser (or radiator) during the cooling operation, and exchanges heat between the heat source side refrigerant and air supplied from an air-sending device (not illustrated) such as a fan.

The accumulator 19 is provided at the intake of the compressor 10 and accumulates surplus refrigerant generated due to the difference between the heating operation and the cooling operation, as well as surplus refrigerant generated due to transitional changes in an operation (for example, a change in the number of operating indoor units 2).

The first connecting pipe 4*a* connects, inside the outdoor unit 1, the refrigerant pipe that connects the first refrigerant flow switching device 11 and the check valve 13*d* described later to the refrigerant pipe that connects the gas liquid separator 27*a* and the check valve 13*a* described later.

The second connecting pipe 4*b* connects, inside the outdoor unit 1, the refrigerant pipe that connects the gas liquid separator 27*b* and the check valve 13*d* described later to the refrigerant pipe that connects the heat source side heat exchanger 12 and the check valve 13*a* described later.

The injection pipe 4*c* connects the pipe between the backflow prevention device 20 installed on the branching pipe 4*d* and the opening and closing device 24 described later to the aperture unit for injecting the heat source side refrigerant into the compressor 10.

The branching pipe 4*d* is a refrigerant pipe that connects the gas liquid separator 27*a* and the gas liquid separator 27*b* described later, and the backflow prevention device 20 as well as the opening and closing device 24 described later are installed thereon from the gas liquid separator 27*b* side.

The check valve 13*a* is provided on the refrigerant pipe that connects the heat source side heat exchanger 12 and the gas liquid separator 27*a* described later, and causes refrigerant to circulate only in the direction from the heat source side heat exchanger 12 to the gas liquid separator 27a.

The check valve 13b is provided on the first connecting pipe 4a, and causes the heat source side refrigerant discharged from the compressor 10 during the heating operation to circulate only in the direction towards the heat medium relay unit 3.

The check valve 13c is provided on the second connecting pipe 4b, and causes refrigerant returning from the heat medium relay unit 3 during the heating operation to circulate only in the direction towards the heat source side heat exchanger 12.

The check valve 13d is provided on the refrigerant pipe that connects the first refrigerant flow switching device 11 and the gas liquid separator 27b described later, and causes refrigerant to circulate only in the direction from the gas liquid separator 27b to the first refrigerant flow switching device 11.

The expansion device 14a is installed in the second connecting pipe 4b, and during the heating operation, expands and depressurizes the heat source side refrigerant flowing into the outdoor unit 1 from the heat medium relay unit 3.

The expansion device 14b is an electronic expansion valve or the like with a variable aperture area, is installed in the injection pipe 4c, and expands and depressurizes the medium pressure two-phase refrigerant.

The backflow prevention device 20 is installed in the branching pipe 4d between the gas liquid separator 27b described later and the opening and closing device 24. During the heating operation, the backflow prevention device 20 conducts the heat source side refrigerant separated by the gas liquid separator 27b only in the direction from the gas liquid separator 27b to the compressor 10.

The opening and closing device 24 is installed in the branching pipe 4d between the gas liquid separator 27a described later and the backflow prevention device 20. During the cooling operation, the opening and closing device 24 enters an open state and conducts the heat source side refrigerant separated by the gas liquid separator 27a to the injection pipe 4c.

The gas liquid separator 27a is installed in a refrigerant pipe between the check valve 13a and the refrigerant pipe 4 that circulates the heat source side refrigerant out of the outdoor unit 1, and in addition, is connected to the gas liquid separator 27b via the branching pipe 4d. During the cooling operation, the gas liquid separator 27a splits high pressure refrigerant flowing out of the heat source side heat exchanger 12 into that which flows into the branching pipe 4d, and that which flows out of the outdoor unit 1.

The gas liquid separator 27b is installed in a refrigerant pipe between the refrigerant pipe 4 that circulates the heat source side refrigerant into the outdoor unit 1 and the check valve 13d, and in addition, is connected to the gas liquid separator 27a via the branching pipe 4d. During the heating operation, the gas liquid separator 27b splits high pressure refrigerant flowing into the outdoor unit 1 into that which flows into the branching pipe 4d, and that which is sent to the heat source side heat exchanger 12 side.

The medium pressure detecting device 32 is installed in the refrigerant pipe on the outlet side of the gas liquid separator 27b proceeding towards the second connecting pipe 4b side. During the heating operation, the medium pressure detecting device 32 detects the pressure of a medium pressure refrigerant flowing out of the gas liquid separator 27b.

The discharge refrigerant temperature detecting device 37 is installed on the refrigerant pipe on the discharge outlet side of the compressor 10, and detects the temperature of the heat source side refrigerant discharged from the compressor 10 (the discharge temperature).

The high pressure detecting device 39 is installed on the refrigerant pipe on the discharge outlet side of the compressor 10, and detects the pressure of the heat source side refrigerant discharged from the compressor 10 (the discharge pressure).

The medium pressure detecting device 32, the discharge refrigerant temperature detecting device 37, and the high pressure detecting device 39 transmit respective detected information to the controller 50.

The controller 50 is made up of a microcomputer or the like, and controls the air-conditioning apparatus 100 overall on the basis of detected information from the various detecting devices as well as operation information from a remote control. Besides controlling the actuators described earlier, the controller 50 controls the driving frequency of the compressor 10, the rotation speed of the air-sending device provided in the heat source side heat exchanger 12 (including ON/OFF operation), the switching of refrigerant flow paths by the first refrigerant flow switching device 11, the opening and closing control of the opening and closing device 24, and controls the respective operating modes described later.

Note that the first refrigerant flow switching device 11, the heat source side heat exchanger 12, the expansion device 14a, and the expansion device 14b are respectively equivalent to the "refrigerant flow switching device", "first heat exchanger", "third expansion device", and "second expansion device" of the present invention. Also, the backflow prevention device 20 and the opening and closing device 24 are respectively equivalent to the "second conducting device" and the "first conducting device" of the present invention.

(Configuration of Indoor Units 2)

The indoor units 2 are respectively equipped with a use side heat exchanger 26. The four indoor units 2 illustrated in FIG. 2 are designated the indoor unit 2a, the indoor unit 2b, the indoor unit 2c, and the indoor unit 2d starting from the bottom of FIG. 2, and will be simply designated the indoor units 2 when not being respectively distinguished. Additionally, the four use side heat exchangers 26 illustrated in FIG. 2 are designated the use side heat exchanger 26a, the use side heat exchanger 26b, the use side heat exchanger 26c, and the use side heat exchanger 26d starting from the bottom of FIG. 2 in correspondence with the indoor units 2a to 2d, and will be simply designated the use side heat exchangers 26 when not being respectively distinguished.

The use side heat exchangers 26 are respectively connected by heat medium pipes to the heat medium pipes 5 that circulate the heat medium flowing out of the heat medium relay unit 3 as well as the heat medium pipes 5 that circulate the heat medium flowing out of the indoor units 2. In addition, the heat source side heat exchangers 26 function as condensers (or radiators) during the heating operation, function as evaporators during the cooling operation, exchange heat between the heat medium and indoor air supplied from an air-sending device (not illustrated), and generate heated air or cooled air to supply to the indoor space 7.

Note that, similarly to FIG. 1, the number of connected indoor units 2 is not limited to the four units illustrated in FIG. 2, and may be one unit or multiple units.

(Configuration of Heat Medium Relay Unit 3)

The heat medium relay unit 3 includes two heat exchangers related to heat medium 15, two expansion devices 16, two opening and closing devices 17, two second refrigerant flow switching devices 18, two pumps 21, four first heat medium flow switching devices 22, four second heat medium flow switching devices 23, and four heat medium flow control devices 25.

The two heat exchangers related to heat medium 15 function as condensers (or radiators) or evaporators, exchanging heat with the heat source side refrigerant and the heat medium, and transferring cooling energy or heating energy generated by the outdoor unit 1 and stored in the heat source side refrigerant to the heat medium. Herein, the two heat exchangers related to heat medium 15 illustrated in FIG. 2 are respectively designated the heat exchanger related to heat medium 15a and the heat exchanger related to heat medium 15b, and will be simply designated the heat exchangers related to heat medium 15 when not being respectively distinguished. Of these, the heat exchanger related to heat medium 15a is provided between the expansion device 16a and the second refrigerant flow switching device 18a on the refrigerant circuit A, serving to heat the heat medium during the heating-only operating mode described later, and serving to cool the heat medium during the cooling-only operating mode, the cooling main operating mode, and the heating main operating mode described later. Additionally, the heat exchanger related to heat medium 15b is provided between the expansion device 16b and the second refrigerant flow switching device 18b on the refrigerant circuit A, serving to cool the heat medium during the cooling-only operating mode described later, and serving to heat the heat medium during the heating-only operating mode, the cooling main operating mode, and the heating main operating mode described later.

The two expansion devices 16 have the function of a pressure-reducing or expansion valve on the refrigerant circuit A, expand the heat source side refrigerant and reduce the pressure of the heat source side refrigerant. Herein, the two expansion devices 16 illustrated in FIG. 2 are respectively designated the expansion device 16a and the expansion device 16b, and will be simply designated the expansion devices 16 when not being respectively distinguished. Of these, the expansion device 16a has one end connected to the heat exchanger related to heat medium 15a so as to be on the upstream side of the heat exchanger related to heat medium 15a with respect to the flow of the heat source side refrigerant during the cooling-only operating mode, while the other end is connected to the opening and closing device 17a. Additionally, the expansion device 16b has one end connected to the heat exchanger related to heat medium 15b so as to be on the upstream side of the heat exchanger related to heat medium 15b with respect to the flow of the heat source side refrigerant during the cooling-only operating mode, while the other end is connected to the opening and closing device 17a. The expansion devices 16 also have variably controllable opening degrees (aperture areas), and may include electronic expansion valves or the like, for example.

The two opening and closing devices 17 include two-way valves or the like, opening and closing the refrigerant pipes on the refrigerant circuit A. Herein, the two opening and closing devices 17 illustrated in FIG. 2 are respectively designated the opening and closing device 17a and the opening and closing device 17b, and will be simply designated the opening and closing devices 17 when not being respectively distinguished. Of these, the opening and closing device 17a has one end connected to the refrigerant pipe 4 that circulates the heat source side refrigerant into the heat medium relay unit 3, while the other end is connected to the expansion device 16a and the expansion device 16b. Additionally, the opening and closing device 17b has one end connected to the refrigerant pipe 4 that circulates the heat source side refrigerant out of the heat medium relay unit 3, while the other end is connected to the port of the opening and closing device 17a on the side connected to the expansion devices 16.

The two second refrigerant flow switching devices 18 include four-way valves or the like, switching the flow of the heat source side refrigerant on the refrigerant circuit A according to the operating mode. Herein, the two second refrigerant flow switching devices 18 illustrated in FIG. 2 are respectively designated the second refrigerant flow switching device 18a and the second refrigerant flow switching device 18b, and will be simply designated the second refrigerant flow switching devices 18 when not being respectively distinguished. Of these, the second refrigerant flow switching device 18a is provided on the downstream side of the heat exchanger related to heat medium 15a with respect to the flow of the heat source side refrigerant during the cooling-only operating mode. Additionally, the second refrigerant flow switching device 18b is provided on the downstream side of the heat exchanger related to heat medium 15b with respect to the flow of the heat source side refrigerant during the cooling-only operating mode.

The two pumps 21 circulate the heat medium under pressure through the heat medium circuit B. Herein, the two pumps 21 illustrated in FIG. 2 are respectively designated the pump 21a and the pump 21b, and will be simply designated the pumps 21 when not being respectively distinguished. Of these, the pump 21a is provided on a heat medium pipe between the heat exchanger related to heat medium 15a and the second heat medium flow switching devices 23. Additionally, the pump 21b is provided on a heat medium pipe between the heat exchanger related to heat medium 15b and the second heat medium flow switching devices 23. The pumps 21 may also include variable-capacity pumps or the like, for example.

However, the pump 21a may also be configured to be provided on a heat medium pipe between the heat exchanger related to heat medium 15a and the first heat medium flow switching devices 22. Likewise, the pump 21b may also be configured to be provided on the heat medium pipe between the heat exchanger related to heat medium 15b and the first heat medium flow switching devices 22.

The four first heat medium flow switching devices 22 include three-way valves or the like, switching the heat medium flow on the heat medium circuit B according to the operating mode. The four first heat medium flow switching devices 22 illustrated in FIG. 2 are designated the first heat medium flow switching device 22a, the first heat medium flow switching device 22b, the first heat medium flow switching device 22c, and the first heat medium flow switching device 22d starting from the bottom of FIG. 2 in correspondence with the indoor units 2a to 2d, and will be simply designated the first heat medium flow switching devices 22 when not being respectively distinguished. Additionally, the number of first heat medium flow switching devices 22 provided corresponds to the number of installed indoor units 2 (four in FIG. 2). Also, of the three ends of the first heat medium flow switching devices 22, one end is connected to the heat exchanger related to heat medium 15a, one end is connected to the heat exchanger related to heat medium 15b, and the remaining end is connected to the heat medium flow control devices 25, respectively, accepting the inflow of the heat medium flowing out of the use side heat exchangers 26 via the heat medium pipes 5 and the heat medium flow control devices 25.

The four second heat medium flow switching devices 23 include three-way valves or the like, switching the heat medium flow on the heat medium circuit B according to the operating mode. The four second heat medium flow switching devices 23 illustrated in FIG. 2 are designated the second heat medium flow switching device 23a, the second heat medium flow switching device 23b, the second heat medium flow switching device 23c, and the second heat medium flow switching device 23d starting from the bottom of FIG. 2 in correspondence with the indoor units 2a to 2d, and will be simply designated the second heat medium flow switching devices 23 when not being respectively distinguished. Additionally, the number of second heat medium flow switching devices 23 provided corresponds to the number of installed indoor units 2 (four in FIG. 2). Also, of the three ends of the second heat medium flow switching devices 23, one end is connected to the pump 21a, another end to the pump 21b, and the remaining end to the use side heat exchangers 26 via the heat medium pipes 5, respectively.

The heat medium flow control devices 25 include two-way valves or the like able to control the port surface area, controlling the flow rate of the heat medium flowing through the use side heat exchangers 26 (heat medium pipes 5) on the heat medium circuit B. The four heat medium flow control devices 25 illustrated in FIG. 2 are designated the heat medium flow control device 25a, the heat medium flow control device 25b, the heat medium flow control device 25c, and the heat medium flow control device 25d starting from the bottom of FIG. 2 in correspondence with the indoor units 2a to 2d, and will be simply designated the heat medium flow control devices 25 when not being respectively distinguished. Additionally, the number of heat medium flow control devices 25 provided corresponds to the number of installed indoor units 2 (four in FIG. 2). Also, the heat medium flow control devices 25 have one end connected to the heat medium pipes 5 that circulate the heat medium flowing out of the use side heat exchangers 26 of the indoor units 2 into the heat medium relay unit 3, and the other end connected to the first heat medium flow switching devices 22, respectively.

Note that although the heat medium flow control devices 25 are installed in the heat medium pipe system on the outlet side of the heat medium flow paths of the use side heat exchangers 26 as above, the configuration is not limited thereto, and the heat medium flow control devices 25 may also be installed in the heat medium pipe system on the inlet side of the use side heat exchangers 26 (for example, between the second heat medium flow switching devices 23 and the heat medium pipes 5 that circulate the heat medium flowing out of the heat medium relay unit 3 into the use side heat exchangers 26 of the indoor units 2).

The heat medium relay unit 3 is also provided with two heat exchanger related to heat medium outlet temperature detecting device 31, four use side heat exchanger outlet temperature detecting device 34, four heat exchanger related to heat medium refrigerant temperature detecting device 35, and two heat exchanger related to heat medium refrigerant pressure detecting device 36. Information detected by these detecting device (temperature information and pressure information) is transmitted to a controller (not illustrated) installed inside the heat medium relay unit 3. The controller is made up of a microcomputer or the like, and on the basis of the detected information and operation information from a remote control or the like, the rotation speed of fans (not illustrated) provided in the use side heat exchangers 26 (including ON/OFF operation), the switching of the heat medium flow paths by the second refrigerant flow switching devices 18, the driving frequency of the pumps 21, the switching of the heat medium flow paths by the first heat medium flow switching devices 22 and the second heat medium flow switching devices 23, the heat medium flow rate of the heat medium flow control devices 25. In addition, by controlling the heat medium flows of the first heat medium flow switching devices 22 and the second heat medium flow switching devices 23, the controller is able to selectively control whether to circulate the heat medium from the heat exchanger related to heat medium 15a into the use side heat exchangers 26, or circulate the heat medium from the heat exchanger related to heat medium 15b into the use side heat exchangers 26. In other words, by controlling the heat medium flow paths of the first heat medium flow switching devices 22 and the second heat medium flow switching devices 23, the controller is able to selectively communicate the inflow paths and the outflow paths of the use side heat exchangers 26 between the heat exchanger related to heat medium 15a and the heat exchanger related to heat medium 15b.

Note that although the controller is installed in the heat medium relay unit 3, the configuration is not limited thereto, and the controller may be substituted by the controller 50 installed in the outdoor unit 1, or alternatively, the controller and the controller 50 may be connected by a wire or wireless communication line, and be configured to communicate with each other.

The two heat exchanger related to heat medium outlet temperature detecting device 31 detect the temperature of the heat medium flowing out of the heat exchangers related to heat medium 15, or in other words, the heat medium at the heat medium outlets of the heat exchangers related to heat medium 15, and may include thermistors or the like, for example. Herein, the two heat exchanger related to heat medium outlet temperature detecting device 31 illustrated in FIG. 2 are respectively designated the heat exchanger related to heat medium outlet temperature detecting device 31a and the heat exchanger related to heat medium outlet temperature detecting device 31b, and will be simply designated the heat exchanger related to heat medium outlet temperature detecting device 31 when not being respectively distinguished. Of these, the heat exchanger related to heat medium outlet temperature detecting device 31a is provided in the heat medium pipe at the inlet of the pump 21a. Additionally, the heat exchanger related to heat medium outlet temperature detecting device 31b is provided in the heat medium pipe at the inlet of the pump 21b.

The four use side heat exchanger outlet temperature detecting device 34 are provided between the first heat medium flow switching devices 22 and the heat medium flow control devices 25 and detect the temperature of the heat medium flowing out of the use side heat exchangers 26, and may include thermistors or the like, for example. Herein, the four use side heat exchanger outlet temperature detecting device 34 illustrated in FIG. 2 are designated the use side heat exchanger outlet temperature detecting device 34a, the use side heat exchanger outlet temperature detecting device 34b, the use side heat exchanger outlet temperature detecting device 34c, and the use side heat exchanger outlet temperature detecting device 34d starting from the bottom of FIG. 2 in correspondence with the indoor units 2a to 2d, and will be simply designated the use side heat exchanger outlet temperature detecting device 34 when not being respectively distinguished. Additionally, the number of use side heat exchanger outlet temperature detecting device 34 provided corresponds to the number of installed indoor units 2 (four in FIG. 2).

The heat exchanger related to heat medium refrigerant temperature detecting device 35a and the heat exchanger related to heat medium refrigerant temperature detecting device 35c are respectively installed between the heat exchangers related to heat medium 15 and the second refrigerant flow switching devices 18 and detect the temperature of the refrigerant flowing into or out of the heat exchangers related to heat medium 15, and may include thermistors or the like, for example. Also, the heat exchanger related to heat medium refrigerant temperature detecting device 35b and the heat exchanger related to heat medium refrigerant temperature detecting device 35d are respectively installed between the heat exchangers related to heat medium 15 and the expansion devices 16 and detect the temperature of the refrigerant flowing into or out of the heat exchangers related to heat medium 15, and may include thermistors or the like, for example. Herein, the two heat exchanger related to heat medium refrigerant temperature detecting device 35a, the heat exchanger related to heat medium refrigerant temperature detecting device 35b, the heat exchanger related to heat medium refrigerant temperature detecting device 35c, and the heat exchanger related to heat medium refrigerant temperature detecting device 35d illustrated in FIG. 2 will be simply designated the heat exchanger related to heat medium refrigerant temperature detecting device 35 when not being respectively distinguished. The heat exchanger related to heat medium refrigerant temperature detecting device 35a is provided between the heat exchanger related to heat medium 15a and the second refrigerant flow switching device 18a. Also, the heat exchanger related to heat medium refrigerant temperature detecting device 35b is provided between the heat exchanger related to heat medium 15a and the expansion device 16a. Also, the heat exchanger related to heat medium refrigerant temperature detecting device 35c is provided between the heat exchanger related to heat medium 15b and the second refrigerant flow switching device 18b. Additionally, the heat exchanger related to heat medium refrigerant temperature detecting device 35d is provided between the heat exchanger related to heat medium 15b and the expansion device 16b.

The heat exchanger related to heat medium refrigerant pressure detecting device 36a is provided between the heat exchanger related to heat medium 15a and the second refrigerant flow switching device 18a, similarly to the installation position of the heat exchanger related to heat medium refrigerant temperature detecting device 35a, and detects the pressure of the refrigerant flowing between the heat exchanger related to heat medium 15a and the second refrigerant flow switching device 18a. The heat exchanger related to heat medium refrigerant pressure detecting device 36b is provided between the heat exchanger related to heat medium 15b and the expansion device 16b, similarly to the installation position of the heat exchanger related to heat medium refrigerant temperature detecting device 35d, and detects the pressure of the refrigerant flowing between the heat exchanger related to heat medium 15b and the expansion device 16b.

Note that the heat exchangers related to heat medium 15 and the expansion devices 16 are respectively equivalent to the "second heat exchangers" and the "first expansion devices" of the present invention.

(Overview of Injection Operation)

In the refrigeration cycle of the air-conditioning apparatus 100 according to Embodiment 1, since the refrigerant and the refrigerating machine oil circulating inside the refrigerant circuit A will degrade if the temperature of the heat source side refrigerant rises, there is an upper limit on the temperature of the heat source side refrigerant. Typically, this upper limit temperature is approximately 120 degrees C. Since the point of highest temperature inside the refrigeration cycle is the temperature of the heat source side refrigerant on the discharge side of the compressor 10 (the discharge temperature), control may be applied such that this discharge temperature does not meet or exceed the upper limit. In the case of using a refrigerant such as R410A, the discharge temperature rarely reaches the upper limit temperature in the normal operation, but if R32 is used as the refrigerant, the discharge temperature rises due to its physical properties, and requires the provision of means for lowering the discharge temperature in the refrigeration cycle.

The air-conditioning apparatus 100 according to the present embodiment an injection operation by the injection pipe 4c is implemented inside the outdoor unit 1 as a means of lowering the discharge temperature of the compressor 10 as described above. Specifically, in the outdoor unit 1, the aperture unit is provided in part of the compression chamber of the compressor 10 as described earlier, and in addition, an injection pipe 4c that introduces the heat source side refrigerant into the compression chamber of the compressor 10 from outside the hermetically sealed container via the aperture unit is provided, and configured such that the heat source side refrigerant is injected into the compression chamber from the injection pipe 4c via the aperture unit. With this injection operation, the discharge temperature of the compressor 10 or the degree of superheat of the refrigerant discharged from the compressor 10 (the discharge superheat) can be lowered, and by having the controller 50 control components such as the opening and closing device 24, the expansion device 14a, and the expansion device 14b, the discharge temperature of the compressor 10 can be lowered to enable safe operation. Specific control of the injection operation will be described in detail in the operational description of each operating mode described later.

Next, differences in the discharge temperature between the case of using R410A or the like and the case of using R32 or the like as the refrigerant will be briefly described.

For example, take the refrigeration cycle of the air-conditioning apparatus 100 to have an evaporating temperature of 0 degrees C. and a condensing temperature of 49 degrees C., and take the superheat (degree of superheat) of an intake refrigerant of the compressor 10 to be 0 degrees C. At this point, provided that R410A is used as the heat source side refrigerant and that adiabatic compression (isentropic compression) is performed, the discharge temperature of the compressor 10 becomes approximately 70 degrees C. due to the physical properties of the heat source side refrigerant. On the other hand, provided that R32 is used as the heat source side refrigerant and that adiabatic compression (isentropic compression) is performed, the discharge temperature of the compressor 10 becomes approximately 86 degrees C. due to the physical properties of the heat source side refrigerant. In other words, in the case of using R32 as the heat source side refrigerant, the discharge temperature rises by approximately 16 degrees C. compared to the case of using R410A. However, since in actual operation polytropic compression is performed in the compressor 10 and operation is less efficient than adiabatic compression, the discharge temperature rises even farther than the above value. Even in the case of using R410A, operating in a state with the discharge temperature exceeding 100 degrees C. occurs frequently. Under operating conditions in which the discharge temperature exceeds 104 degrees C. with R410A, the discharge temperature will exceed the upper limit of 120 degrees C. with R32, and thus it is necessary to lower the discharge temperature.

In the case of using a compressor 10 having a high-pressure shell structure in which the intake refrigerant is suctioned directly into the compression chamber and the heat source side refrigerant discharged out of the compression chamber is discharged inside a hermetically sealed container surrounding the compression chamber, the discharge temperature can be lowered by dampening the intake refrigerant past its saturation point and suctioning the heat source side refrigerant in a two-phase state into the compression chamber of the compressor 10. However, in the case of using a compressor 10 having a low-pressure shell structure, dampening the intake refrigerant only causes a liquid refrigerant to be accumulated inside the shell of the compressor 10, and two-phase gas-liquid refrigerant is not suctioned into the compression chamber. Consequently, in order to lower the discharge temperature in the case of using a compressor 10 having a low-pressure shell structure and using a refrigerant such as R32 with a higher discharge temperature, a method of injecting a low-temperature refrigerant from outside the compression chamber during the compression process in the compressor 10 to lower the temperature of the heat source side refrigerant is effective. Thus, the discharge temperature may be lowered by an injection operation like that described above.

Also, the method of controlling the quantity of the heat source side refrigerant to inject into the compression chamber of the compressor 10 (the injection quantity) by the controller 50 may involve applying control to keep the discharge temperature detected by the discharge refrigerant temperature detecting device 37 at a target value (100 degrees C., for example), and varying this target value according to the outdoor air temperature. The injection flow rate is increased or decreased by the controller 50 adjusting the opening degree (aperture area) of the expansion device 14b.

Note that the injection quantity control method by the controller 50 is not limited to that described above, and control may also be applied to inject in the case where the discharge temperature detected by the discharge refrigerant temperature detecting device 37 is expected to exceed a target value (110 degrees C., for example), and to not inject in the case where the discharge temperature is less than or equal to the target value. Also, the controller 50 may apply control to keep the discharge temperature detected by the discharge refrigerant temperature detecting device 37 within a target range (80 degrees C. to 100 degrees C., for example), increasing the injection quantity in cases where the discharge temperature is expected to exceed the upper bound of the target range, and decreasing the injection quantity in cases where the discharge temperature is expected to fall below the lower bound of the target range.

Also, although the above control of the injection quantity is configured to keep the discharge temperature to a target value or within a target range, the control may also be configured to keep the discharge superheat (discharge degree of superheat) to a target value or within a target range. For example, the controller 50 may also compute the discharge superheat (discharge degree of superheat) on the basis of the discharge temperature detected by the discharge refrigerant temperature detecting device 37 and the discharge pressure detected by the high pressure detecting device 39, and control the injection quantity so as to keep the discharge superheat to a target value (30 degrees C., for example), while varying the target value according to the outdoor air temperature.

Also, the injection quantity control method by the controller 50 is not limited to that described above, and control may also be applied to inject in the case where the computed discharge superheat is expected to exceed a target value (40 degrees C., for example), and to not inject in the case where the computed discharge superheat is less than or equal to the target value. Also, the controller 50 may apply control to keep the computed discharge superheat within a target range (10 degrees C. to 40 degrees C., for example), increasing the injection quantity in cases where the discharge superheat is expected to exceed the upper bound of the target range, and decreasing the injection quantity in cases where the discharge superheat is expected to fall below the lower bound of the target range.

Note that although the foregoing describes the case where R32 circulates through the refrigerant circuit A as the heat source side refrigerant, with the configuration according to Embodiment 1, the discharge temperature can be lowered and similar effects are exhibited for any heat source side refrigerant insofar as its discharge temperature rises past R410A when given the same condensing temperature, evaporating temperature, superheat (degree of superheat), subcooling (degree of subcooling), and compressor efficiency. Particularly, the effect is greater if the heat source side refrigerant rises 3 degrees C. or more past R410A.

FIG. 3 is a diagram illustrating change in the discharge temperature with respect to the mass ratio of R32 in a mixed refrigerant in the case of estimating the discharge temperature with a method similar to that described earlier for a mixed refrigerant containing of R32 and HFO1234yf, a tetrafluoropropene-based refrigerant with a low global warming potential exemplified by the chemical formula $CF_3CF=CH_2$.

As illustrated in FIG. 3, it is demonstrated that when the mass ratio of R32 is 52%, the discharge temperature becomes approximately 70 degrees C., nearly equal to that of R410A, whereas when the mass ratio of R32 is 62%, the discharge temperature is approximately 73 degrees C., 3 degrees C. higher than that of R410A. Thus, for refrigerant mixtures containing of R32 and HFO1234yf, lowering the discharge temperature with an injection operation is more effective in the case of using a refrigerant mixture having an R32 mass ratio near 62% or greater.

Also, if estimating the discharge temperature with a method similar to that described earlier for a mixed refrigerant containing of R32 and HFO1234ze, a tetrafluoropropene-based refrigerant with a low global warming potential exemplified by the chemical formula $CF_3CH=CHF$, it is demonstrated that when the mass ratio of R32 in the refrigerant mixture is 34%, the discharge temperature becomes approximately 70 degrees C., nearly equal to that of R410A, whereas when the mass ratio of R32 is 43%, the discharge temperature is approximately 73 degrees C., 3 degrees C. higher than that of R410A. Thus, for refrigerant mixtures of R32 and HFO1234ze, lowering the discharge temperature with an injection operation is more effective in the case of using a refrigerant mixture having an R32 mass ratio near 43% or greater.

The above estimation of discharge temperature was carried out using REFPROP Version 8.0, sold by the National Institute of Standards and Technology (NIST). Note that the estimation of discharge temperature herein assumes adiabatic compression, but since polytropic compression is carried out in the actual compression, the values become several tens of degrees higher (20 degrees C. or more, for example) than the temperatures stated herein.

Note that the refrigerant types in the refrigerant mixture are not limited to those described above, and a refrigerant mixture containing small quantities of other refrigerant components does not largely affect the discharge temperature, and similar effects are exhibited. For example, a refrigerant mixture containing of R32 and HFO1234yf that also contains small quantities of other refrigerants or the like may still be used.

Next, the respective operating modes implemented by the air-conditioning apparatus 100 according to Embodiment 1 will be described. The air-conditioning apparatus 100 is capable of selecting the cooling operation or the heating operation with the indoor units 2, on the basis of instructions from each of the indoor units 2. In other words, the air-conditioning apparatus 100 is configured such that all indoor units 2 may operate identically, but also such that each of the indoor units 2 may operate differently.

The operating modes implemented by the air-conditioning apparatus 100 include a cooling only operating mode in which all indoor units 2 being driven implement the cooling operation, a heating only operating mode in which all indoor units 2 being driven implement the heating operation, a cooling main operating mode in which the cooling load is larger, and a heating main operating mode in which the heating load is larger. Hereinafter, the respective operating modes will be described together with the flows of the heat source side refrigerant and the heat medium. Also, in the following description, it is assumed that the controller 50 installed in the outdoor unit 1 implements control of the air-conditioning apparatus 100 overall. Note that when injecting the refrigerant from the injection pipe 4c connected to the aperture unit in the compression chamber of the compressor 10 into the compression chamber, pressure loss occurs at the aperture unit in the compression chamber (pressure loss occurring because the heat source side refrigerant flows through a narrow path, and in addition, the flow is suddenly expanded or contracted). However, the presence or absence of such pressure loss does not affect the advantages of Embodiment 1, and in the following description, such pressure loss at the aperture unit will be ignored (treated as non-existent) in order to ease of understanding of the operation.

(Cooling Only Operating Mode)

Figure 4:
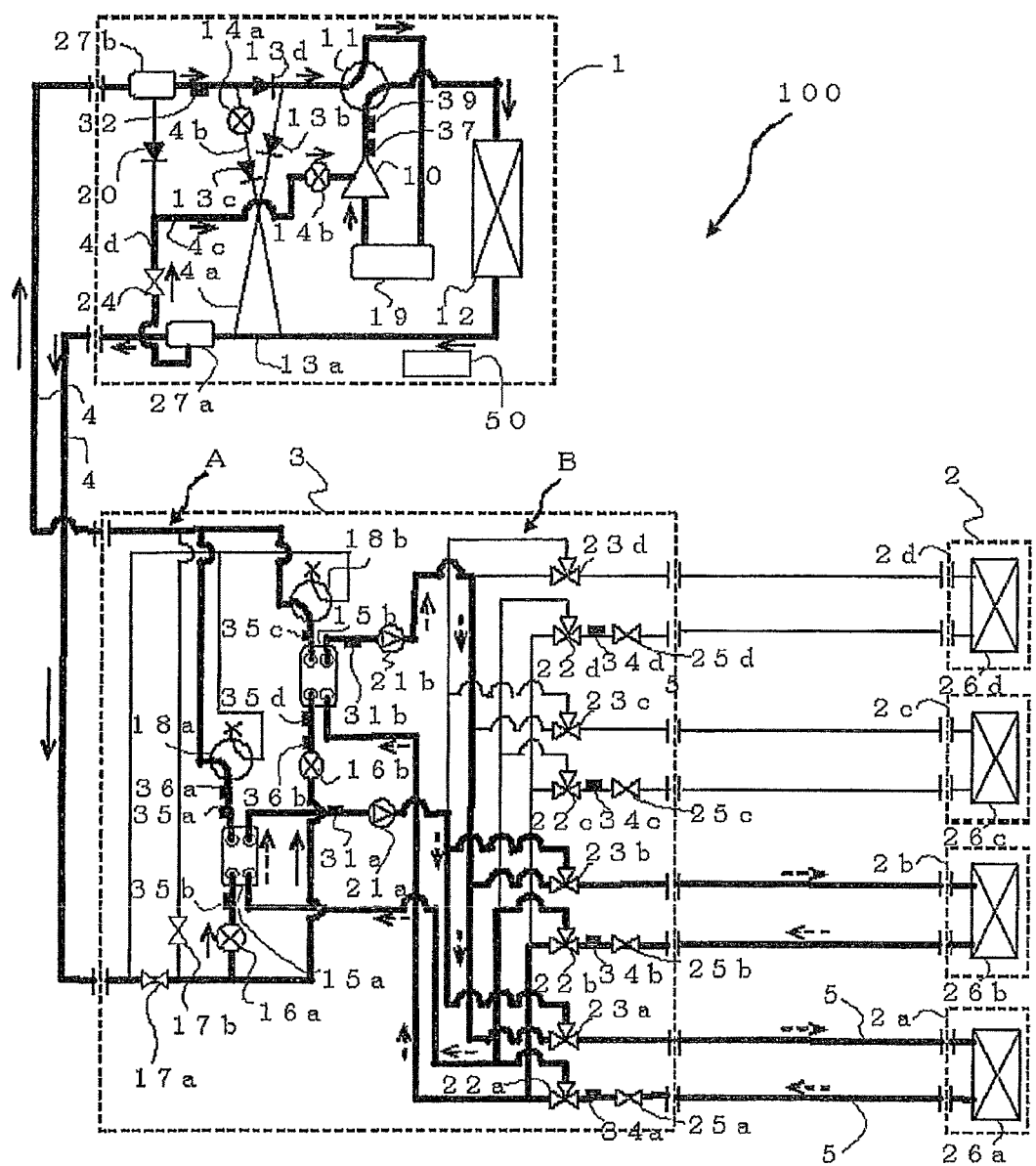
FIG. 4 is a refrigerant circuit diagram illustrating the flows of a heat source side refrigerant and a heat medium during a cooling-only operating mode of the air-conditioning apparatus 100 according to Embodiment 1 of the present invention.
Figure 5:
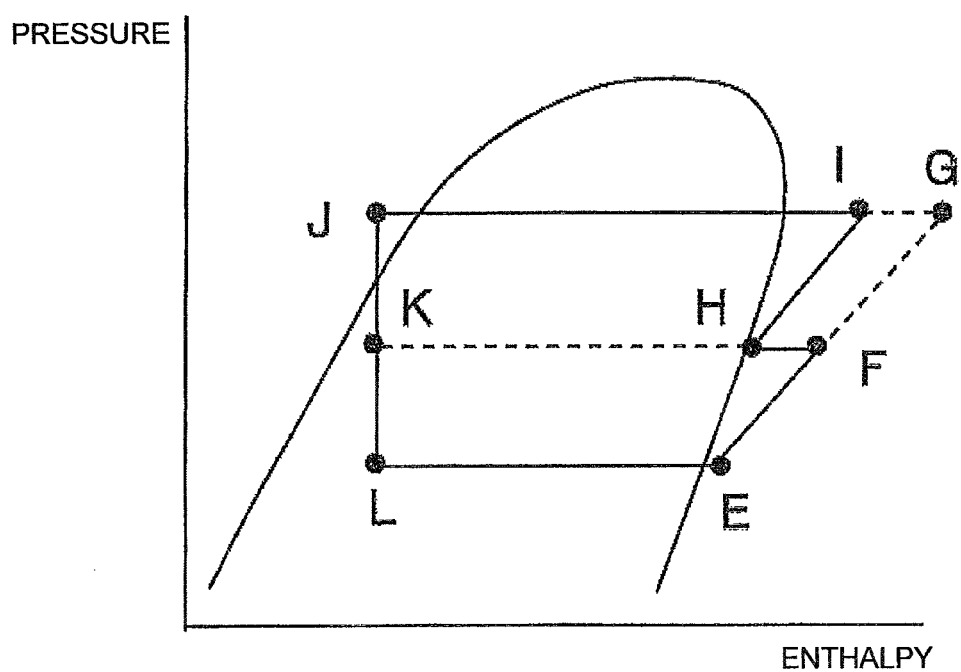
FIG. 5 is a refrigeration cycle p-h diagram during the cooling-only operating mode of the air-conditioning apparatus 100 according to Embodiment 1 of the present invention.

FIG. 4 is a refrigerant circuit diagram illustrating the flows of the heat source side refrigerant and the heat medium during a cooling only operating mode of the air-conditioning apparatus 100 according to Embodiment 1 of the present invention, while FIG. 5 is a refrigeration cycle p-h diagram during the cooling only operating mode of the same air-conditioning apparatus 100. The cooling only operating mode will be described with FIG. 4, taking as an example the case where a cooling load is generated by the use side heat exchanger 26a and the use side heat exchanger 26b only. Note that in FIG. 4, pipes indicated by the thick lines represent pipes carrying the heat source side refrigerant and the heat medium, while solid-line arrows represent the direction in which the heat source side refrigerant flows and broken-line arrows represent the direction in which the heat medium flows.

In the case of the cooling only operating mode illustrated in FIG. 4, the controller 50 causes the first refrigerant flow switching device 11 to switch the refrigerant flow path in the outdoor unit 1 to circulate the heat source side refrigerant discharged from the compressor 10 into the heat source side heat exchanger 12. In addition, the controller 50 applies opening and closing control to put the opening and closing device 17a in an open state, the opening and closing device 17b in a closed state, and the opening and closing device 24 in an open state. Then, in the heat medium relay unit 3, the controller 50 drives the pump 21a and the pump 21b, opens the heat medium flow control device 25a and the heat medium flow control device 25b, and fully closes the heat medium flow control device 25c and the heat medium flow control device 25d, causing the heat medium to circulate between each of the heat exchanger related to heat medium 15a and the heat exchanger related to heat medium 15b, and the use side heat exchanger 26a and the use side heat exchanger 26b, respectively.

First, the flow of the heat source side refrigerant in the refrigerant circuit A will be described with reference to FIGS. 4 and 5. A low temperature and low pressure gaseous refrigerant (point E) is compressed by the compressor 10 and discharged as a high temperature and high pressure gaseous refrigerant (point I), which flows into the heat source side heat exchanger 12 via the first refrigerant flow switching device 11 and condenses to become a high pressure liquid refrigerant while radiating heat to the outdoor air. The high pressure liquid refrigerant (point J) flowing out of the heat source side heat exchanger 12 flows out of the outdoor unit 1 via the check valve 13a and the gas liquid separator 27a, and flows into the heat medium relay unit 3 via the refrigerant pipes 4.

In addition, a portion of the high pressure liquid refrigerant flowing into the gas liquid separator 27a is split by the branching pipe 4d and after passing through the opening and closing device 24, flows into the injection pipe 4c, and is expanded and depressurized by the expansion device 14b to become a low temperature and medium pressure two-phase gas-liquid refrigerant (point K), which is injected into the compressor 10 from the aperture unit provided in the compression chamber of the compressor 10. At this point, a medium pressure gaseous refrigerant (point F) mixes with a low temperature and medium pressure two-phase gas-liquid refrigerant (point K) inside the compressor 10, the temperature of the heat source side refrigerant decreases (point H), and as a result, the discharge temperature of the gaseous refrigerant discharged from the compressor 10 decreases (point I). Additionally, the point G in FIG. 5 is the discharge temperature of the compressor 10 in the case where an injection operation is not carried out, which demonstrates that the injection operation lowers the discharge temperature from the point G to the point I.

After passing through the opening and closing device 17a, the high pressure liquid refrigerant flowing into the heat medium relay unit 3 splits and respectively flows into the expansion device 16a and the expansion device 16b, and expands and loses pressure to become a low temperature and low pressure two-phase gas-liquid refrigerant (point L). The two-phase gas-liquid refrigerant respectively flows into the heat exchanger related to heat medium 15a and the heat exchanger related to heat medium 15b which act as evaporators, and evaporates to become a low temperature and low pressure gaseous refrigerant (point E) while cooling the heat medium by absorbing heat from the heat medium circulating through the heat medium circuit B. The gaseous refrigerant flowing out of the heat exchanger related to heat medium 15a and the heat exchanger related to heat medium 15b converges via the second refrigerant flow switching device 18a and the second refrigerant flow switching device 18b, respectively, flows out of the heat medium relay unit 3, and once again flows into the outdoor unit 1 through the refrigerant pipes 4.

The gaseous refrigerant flowing into the outdoor unit 1 passes through the gas liquid separator 27b and the check valve 13d, and is once again suctioned into the compressor 10 via the first refrigerant flow switching device 11 and the accumulator 19.

At this point, the controller 50 controls the opening degree of the expansion device 16a such that the superheat (degree of superheat) obtained as the difference between the temperature detected by the heat exchanger related to heat medium refrigerant temperature detecting device 35a and the temperature detected by the heat exchanger related to heat medium refrigerant temperature detecting device 35b becomes constant. Similarly, the controller 50 controls the opening degree of the expansion device 16b such that the superheat obtained as the difference between the temperature detected by the heat exchanger related to heat medium refrigerant temperature detecting device 35c and the temperature detected by the heat exchanger related to heat medium refrigerant temperature detecting device 35d becomes constant.

Also, the expansion device 14b is taken to have a variable aperture area such as an electronic expansion valve, and the controller 50 controls the injection flow rate by controlling the aperture area of the expansion device 14b such that the discharge temperature detected by the discharge refrigerant temperature detecting device 37 does not rise too high. The control method is as described earlier.

Note that although the expansion device 14b is taken to have a variable aperture area such as an electronic expansion valve, the configuration is not limited thereto, and the expansion device 14b may also include a capillary tube in which the quantity of the heat source side refrigerant which is injected depends on a pressure differential.

In addition, such control of the expansion device 14b can be similarly applied in other operating modes.

Herein, the heat source side refrigerant in the flow path proceeding from the opening and closing device 24 in the branching pipe 4d to the backflow prevention device 20 is a high pressure refrigerant, whereas the heat source side refrigerant which returns to the outdoor unit 1 from the heat medium relay unit 3 via the refrigerant pipes 4 and reaches the gas liquid separator 27b is a low pressure refrigerant. At this point, the backflow prevention device 20 prevents the high pressure refrigerant splitting off from the gas liquid separator 27a from flowing to the gas liquid separator 27b. The action of the backflow prevention device 20 prevents the high pressure refrigerant in the branching pipe 4d from mixing with the low pressure refrigerant in the gas liquid separator 27b. The same holds true for the cooling main operating mode described later.

Note that the backflow prevention device 20 may be a check valve, or alternatively, a device such as a solenoid valve which can be switched open or closed or a device having a variable aperture area such as an electronic expansion valve that can switch a refrigerant flow path open or closed.

Note that besides being a device such as a solenoid valve which can be switched open or closed, the opening and closing device 24a may also have a variable aperture area such as an electronic expansion valve, or be any device able to switch a refrigerant flow path open or closed.

Next, the flow of the heat medium in the heat medium circuit B will be described with reference to FIG. 4. In the cooling only operating mode, the cooling energy of the heat source side refrigerant is transferred to the heat medium in both the heat exchanger related to heat medium 15a and the heat exchanger related to heat medium 15b, and the cooled heat medium is circulated through the heat medium circuit B by the pump 21a and the pump 21b.

The pressurized heat medium flowing out of the pump 21a and the pump 21b flows out of the heat medium relay unit 3 via the second heat medium flow switching device 23a and the second heat medium flow switching device 23b, and respectively flows into the indoor unit 2a and the indoor unit 2b via the heat medium pipes 5. At this point, since the heat medium flow control device 25c and the heat medium flow control device 25d are fully closed, the heat medium does not respectively flow into the indoor unit 2c and the indoor unit 2d via the second heat medium flow switching device 23c and the second heat medium flow switching device 23d.

The heat medium flowing into the indoor unit 2a and the indoor unit 2b respectively flows into the use side heat exchanger 26a and the use side heat exchanger 26b. Then, the heat medium flowing into the use side heat exchanger 26a and the use side heat exchanger 26b absorbs heat from the indoor air, thereby carrying out a cooling operation on the indoor space 7. Then, the heat medium flowing out of the use side heat exchanger 26a and the use side heat exchanger 26b respectively flows out of the indoor unit 2a and the indoor unit 2b, and flows into the heat medium relay unit 3 via the heat medium pipes 5.

The heat medium flowing into the heat medium relay unit 3 flows into the heat medium flow control device 25a and the heat medium flow control device 25b. At this point, the heat medium is made to flow into the use side heat exchanger 26a and the use side heat exchanger 26b at a flow rate controlled by the action of the heat medium flow control device 25a and the heat medium flow control device 25b, this flow rate being the flow rate of the heat medium necessary to cover the air conditioning load required indoors. Heat medium flowing out of the heat medium flow control device 25a respectively flows into the heat exchanger related to heat medium 15a and the heat exchanger related to heat medium 15b via the first heat medium flow switching device 22a. Similarly, heat medium flowing out of the heat medium flow control device 25b respectively flows into the heat exchanger related to heat medium 15a and the heat exchanger related to heat medium 15b via the first heat medium flow switching device 22b. The heat medium flowing into the heat exchanger related to heat medium 15a and the heat exchanger related to heat medium 15b is once again respectively suctioned into the pump 21a and the pump 21b. At this point, the first heat medium flow switching device 22a and the first heat medium flow switching device 22b are set to intermediate opening degrees to maintain flow paths flowing into both the heat exchanger related to heat medium 15a and the heat exchanger related to heat medium 15b.

In addition, the air conditioning load required in the indoor space 7 may be covered by applying control to keep the difference between the temperature detected by the heat exchanger related to heat medium outlet temperature detecting device 31a or the temperature detected by the heat exchanger related to heat medium outlet temperature detecting device 31b and the temperature detected by the use side heat exchanger outlet temperature detecting device 34 at a target value. Also, although the cooling operation by the use side heat exchangers 26 should ideally be controlled according to the temperature difference between the inlet temperature and the outlet temperature, the heat medium temperature at the outlet of the use side heat exchangers 26 is nearly the same temperature as the temperature detected by the heat exchanger related to heat medium outlet temperature detecting device 31, and thus using the heat exchanger related to heat medium outlet temperature detecting device 31 enables a reduction in the number of temperature detecting device to constitute a system at lower cost.

Note that the temperature of either the heat exchanger related to heat medium outlet temperature detecting device 31a of the heat exchanger related to heat medium outlet temperature detecting device 31b may be used as the outlet temperature of the heat exchangers related to heat medium 15, or alternatively, their average temperature may be used.

In the case of implementing the above cooling only operating mode, it is not necessary for the heat medium to flow to use side heat exchangers 26 with no heat load (include those switched off by thermostat control). For this reason, heat medium is made to not flow to the use side heat exchangers 26 by closing flow paths with the heat medium flow control devices 25. In FIG. 4, the heat medium is flowing through the use side heat exchanger 26a and the use side heat exchanger 26b because a heat load exists, but since there is no heat load on the use side heat exchanger 26c and the use side heat exchanger 26d, the heat medium flow control device 25c and the heat medium flow control device 25d are fully closed. Furthermore, in the case where a heat load is generated from the use side heat exchanger 26c or the use side heat exchanger 26d, the heat medium flow control device 25c or the heat medium flow control device 25d may be opened to allow the circulation of the heat medium.

Note that this mode is similarly applicable to the other operating modes.

(Heating Only Operating Mode)

Figure 6:
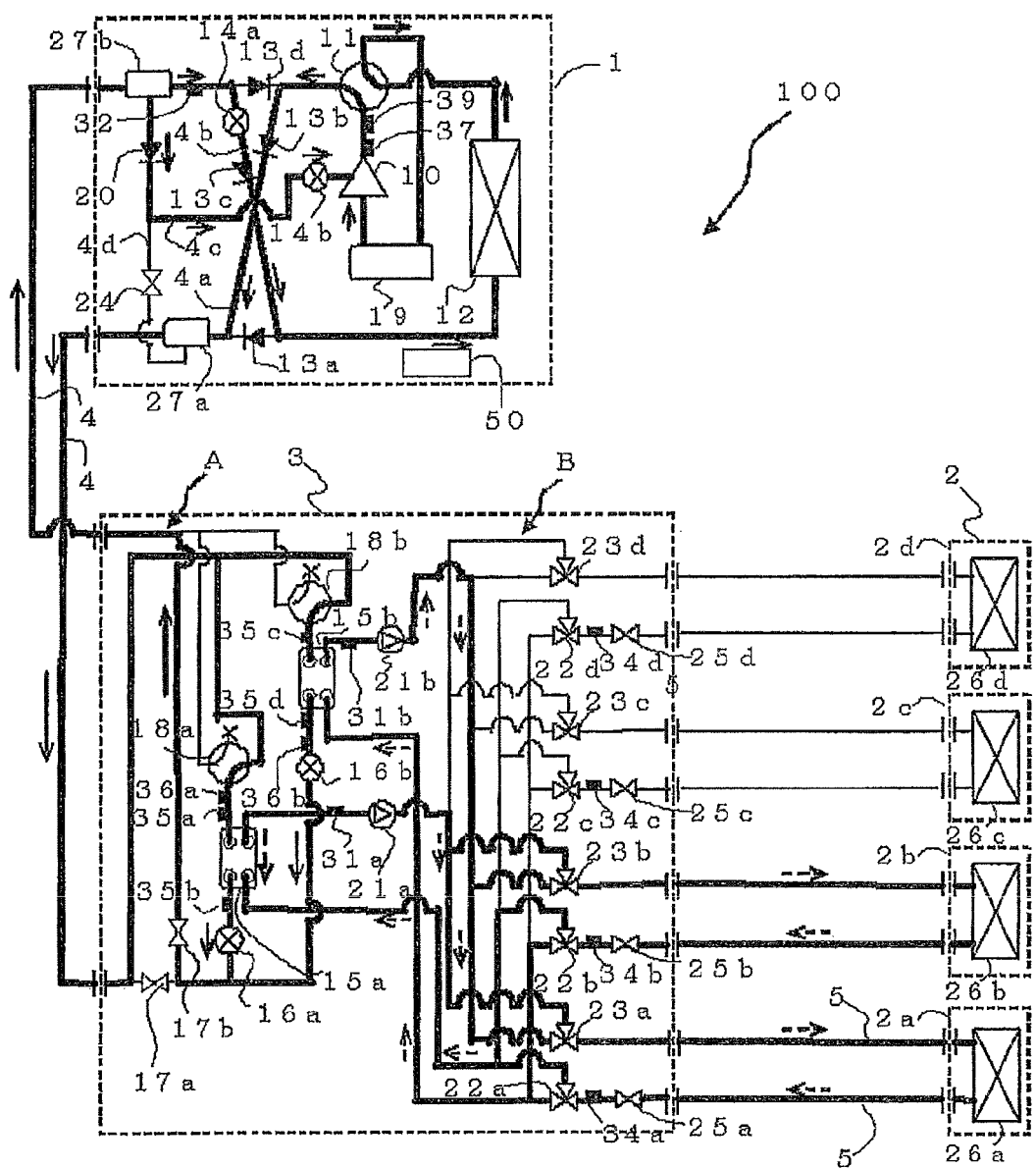
FIG. 6 is a refrigerant circuit diagram illustrating the flows of the heat source side refrigerant and the heat medium during a heating-only operating mode of the air-conditioning apparatus 100 according to Embodiment 1 of the present invention.
Figure 7:
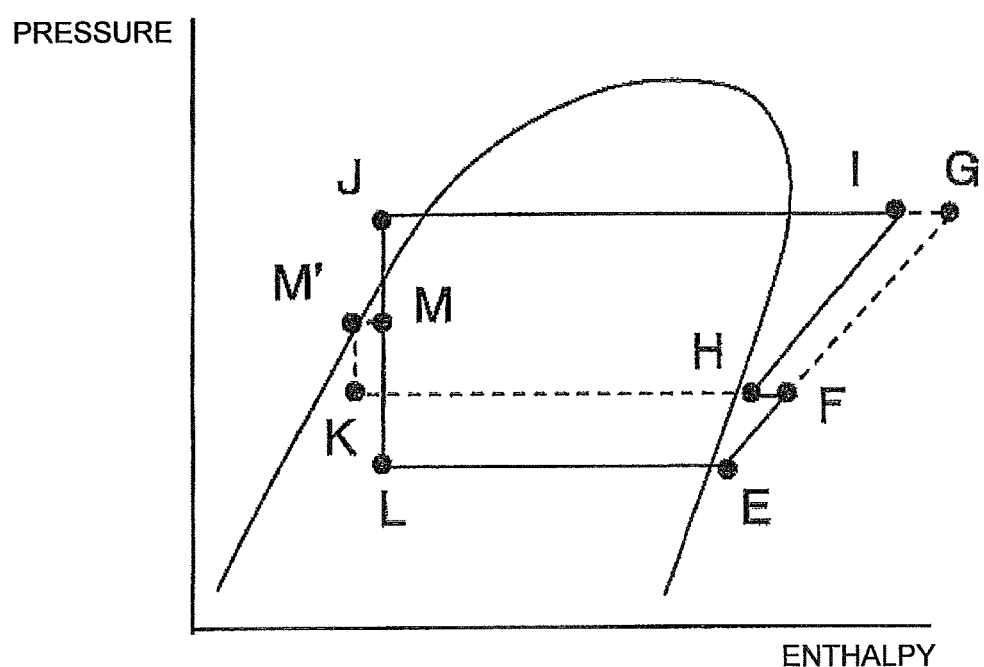
FIG. 7 is a refrigeration cycle p-h diagram during the heating-only operating mode of the air-conditioning apparatus 100 according to Embodiment 1 of the present invention.

FIG. 6 is a refrigerant circuit diagram illustrating the flows of the heat source side refrigerant and the heat medium during a heating only operating mode of the air-conditioning apparatus 100 according to Embodiment 1 of the present invention, while FIG. 7 is a refrigeration cycle p-h diagram during the heating only operating mode of the same air-conditioning apparatus 100. The heating only operating mode will be described with reference to FIG. 6, taking as an example the case where a heating load is generated by the use side heat exchanger 26a and the use side heat exchanger 26b only. Note that in FIG. 6, pipes indicated by the thick lines represent pipes carrying the heat source side refrigerant and the heat medium, while solid-line arrows represent the direction in which the heat source side refrigerant flows and broken-line arrows represent the direction in which the heat medium flows.

In the case of the heating only operating mode illustrated in FIG. 6, the controller 50 causes the first refrigerant flow switching device 11 to switch the refrigerant flow path in the outdoor unit 1 to circulate the heat source side refrigerant discharged from the compressor 10 into the heat medium relay unit 3, without passing through the heat source side heat exchanger 12. In addition, the controller 50 applies opening and closing control to put the opening and closing device 17a in a closed state, the opening and closing device 17b in an open state, and the opening and closing device 24 in a closed state. Then, in the heat medium relay unit 3, the controller 50 drives the pump 21a and the pump 21b, opens the heat medium flow control device 25a and the heat medium flow control device 25b, and closes the heat medium flow control device 25c and the heat medium flow control device 25d, causing heat medium to circulate between each of the heat exchanger related to heat medium 15a and the heat exchanger related to heat medium 15b, and the use side heat exchanger 26a and the use side heat exchanger 26b, respectively.

First, the flow of the heat source side refrigerant in the refrigerant circuit A will be described with reference to FIGS. 6 and 7. A low temperature and low pressure gaseous refrigerant (point E) is compressed by the compressor 10 and discharged as a high temperature and high pressure gaseous refrigerant (point I), which flows out of the outdoor unit 1 via the first refrigerant flow switching device 11, the check valve 13b in the first connecting pipe 4a, and the gas liquid separator 27a. The high temperature and high pressure gaseous refrigerant flowing out of the outdoor unit 1 flows into the heat medium relay unit 3 via the refrigerant pipes 4.

The high temperature and high pressure gaseous refrigerant flowing into the heat medium relay unit 3 splits and respectively flows, via the second refrigerant flow switching device 18a and the second refrigerant flow switching device 18b, into the heat exchanger related to heat medium 15a and the heat exchanger related to heat medium 15b which act as condensers. The high temperature and high pressure gaseous refrigerant flowing into the heat exchanger related to heat medium 15a and the heat exchanger related to heat medium 15b condenses to become a high pressure liquid refrigerant (point J) while heating the heat medium by radiating heat to the heat medium circulating through the heat medium circuit B. The high pressure liquid refrigerant flowing out of the heat exchanger related to heat medium 15a and the heat exchanger related to heat medium 15b is respectively expanded and depressurized by the expansion device 16a and the expansion device 16b to become a medium temperature and medium pressure two-phase gas-liquid refrigerant or liquid refrigerant (point M), which later converges, flows out of the heat medium relay unit 3 via the opening and closing device 17b, and once again flows into the outdoor unit 1 through the refrigerant pipes 4.

The medium temperature and medium pressure two-phase gas-liquid refrigerant or liquid refrigerant flowing into the outdoor unit 1 flows into the second connecting pipe 4b via the gas liquid separator 27b, and is expanded and depressurized by the expansion device 14a to become a low temperature and low pressure two-phase gas-liquid refrigerant (point L). The low temperature and low pressure two-phase gas-liquid refrigerant flows into the heat source side heat exchanger 12 via the check valve 13c and evaporates to become a low temperature and low pressure gaseous refrigerant (point E) while absorbing heat from the outside air. The low temperature and low pressure gaseous refrigerant flowing out of the heat source side heat exchanger 12 is once again suctioned into the compressor 10 via the first refrigerant flow switching device 11 and the accumulator 19.

Also, when the medium temperature and medium pressure two-phase gas-liquid refrigerant flows into the gas liquid separator 27b, a liquid refrigerant is divided from the two-phase gas-liquid refrigerant, and the liquid refrigerant thus divided (saturated liquid refrigerant, point M') flows into the injection pipe 4c after passing through the backflow prevention device 20. The liquid refrigerant flowing into the injection pipe 4c is expanded and depressurized by the expansion device 14b to become a low temperature and medium pressure two-phase gas-liquid refrigerant at a slightly lowered pressure (point K), which is injected into the compressor 10 from the aperture unit provided in the compression chamber of the compressor 10. At this point, a medium pressure gaseous refrigerant (point F) mixes with the low temperature and medium pressure two-phase gas-liquid refrigerant (point K) inside the compressor 10, the temperature of the heat source side refrigerant decreases (point H), and as a result, the discharge temperature of the gaseous refrigerant discharged from the compressor 10 decreases (point I). Additionally, the point G in FIG. 7 is the discharge temperature of the compressor 10 in the case where an injection operation is not carried out, which demonstrates that the injection operation lowers the discharge temperature from the point G to the point I.

At this point, the controller 50 controls the opening degree of the expansion device 16a such that the subcooling (degree of subcooling) obtained as the difference between the temperature detected by the heat exchanger related to heat medium refrigerant temperature detecting device 35b and a value obtained by converting the pressure detected by the heat exchanger related to heat medium refrigerant pressure detecting device 36a into a saturation temperature becomes constant. Similarly, the controller 50 controls the opening degree of the expansion device 16b such that the subcooling obtained as the difference between the temperature detected by the heat exchanger related to heat medium refrigerant temperature detecting device 35d and a value obtained by converting the pressure detected by the heat exchanger related to heat medium refrigerant pressure detecting device 36b into a saturation temperature becomes constant.

Note that in the case where the temperature at an intermediate position between the heat exchangers related to heat medium 15 can be measured, the temperature at that intermediate position may be used instead of the heat exchanger related to heat medium refrigerant pressure detecting device 36. In this case, the system can be configured at lower cost.

In addition, by entering a closed state, the opening and closing device 24 prevents a high pressure refrigerant in the gas liquid separator 27a from mixing with a medium pressure refrigerant that has passed through the backflow prevention device 20.

Also, the expansion device 14a is taken to have a variable aperture area such as an electronic expansion valve, with the controller 50 able to control the medium pressure on the upstream side of the expansion device 14a at an arbitrary pressure. For example, if the opening degree of the expansion device 14a is controlled such that the medium pressure detected by the medium pressure detecting device 32 becomes a constant value, control of the discharge temperature by the expansion device 14b can be stabilized.

However, the expansion device 14a is not limited thereto, and may be combined with an opening and closing valve such as a small solenoid valve to enable the selection of multiple aperture areas, or alternatively, be a capillary tube in which medium pressure is maintained according to pressure loss of the refrigerant, although controllability is to be slightly worsened. Nonetheless, controlling to keep the discharge temperature at a target is still possible.

In addition, the control method for the expansion device 14a and the expansion device 14b is not limited to that described above, and a control method that fully opens the expansion device 14b and controls the discharge temperature of the compressor 10 with the expansion device 14a may also be used. Doing so has the advantage of simplifying control while also allowing the use of a low-cost device as the expansion device 14b.

Also, the medium pressure detecting device 32 may be a pressure sensor, or alternatively, be configured to compute medium pressure by computation using a temperature sensor.

Note that in the heating only operating mode, since the heat exchanger related to heat medium 15a and the heat exchanger related to heat medium 15b are both heating the heat medium, control may also be applied to maintain the medium pressure slightly higher than the medium pressure on the upstream side of the expansion device 14a (point M in FIG. 7) insofar as the subcooling by the expansion device 16a and the expansion device 16b is within a controllable range. If control is applied to raise the medium pressure in this way, the differential pressure between the inside pressure of the compression chamber and the pressure can be increased, and thus the injection quantity into the compression chamber can be increased, and it is possible to supply the compression chamber with an injection quantity sufficient to lower the discharge temperature, even in cases where the outside air temperature is low. Also, in the case of setting a higher medium pressure, it is also possible to create a state in which the medium pressure liquid refrigerant flows into the gas liquid separator 27b, which has the advantage of making control of the expansion device 14a easier to stabilize.

Next, the flow of the heat medium in the heat medium circuit B will be described with reference to FIG. 6. In the heating only operating mode, the heating energy of the heat source side refrigerant is transferred to the heat medium in both the heat exchanger related to heat medium 15a and the heat exchanger related to heat medium 15b, and the heated heat medium is circulated through the heat medium circuit B by the pump 21a and the pump 21b.

The pressurized heat medium flowing out of the pump 21a and the pump 21b flows out of the heat medium relay unit 3 via the second heat medium flow switching device 23a and the second heat medium flow switching device 23b, and respectively flows into the indoor unit 2a and the indoor unit 2b via the heat medium pipes 5. At this point, since the heat medium flow control device 25c and the heat medium flow control device 25d are fully closed, the heat medium does not respectively flow into the indoor unit 2c and the indoor unit 2d via the second heat medium flow switching device 23c and the second heat medium flow switching device 23d.

The heat medium flowing into the indoor unit 2a and the indoor unit 2b respectively flows into the use side heat exchanger 26a and the use side heat exchanger 26b. Then, the heat medium flowing into the use side heat exchanger 26a and the use side heat exchanger 26b radiates heat to the indoor air, thereby carrying out the heating operation on the indoor space 7. Then, the heat medium flowing out of the use side heat exchanger 26a and the use side heat exchanger 26b respectively flows out of the indoor unit 2a and the indoor unit 2b, and flows into the heat medium relay unit 3 via the heat medium pipes 5.

The heat medium flowing into the heat medium relay unit 3 flows into the heat medium flow control device 25a and the heat medium flow control device 25b. At this point, the heat medium is made to flow into the use side heat exchanger 26a and the use side heat exchanger 26b at a flow rate controlled by the action of the heat medium flow control device 25a and the heat medium flow control device 25b, this flow rate being the flow rate of the heat medium necessary to cover the air conditioning load required indoors. The heat medium flowing out of the heat medium flow control device 25a respectively flows into the heat exchanger related to heat medium 15a and the heat exchanger related to heat medium 15b via the first heat medium flow switching device 22a. Similarly, the heat medium flowing out of the heat medium flow control device 25b respectively flows into the heat exchanger related to heat medium 15a and the heat exchanger related to heat medium 15b via the first heat medium flow switching device 22b. The heat medium flowing into the heat exchanger related to heat medium 15a and the heat exchanger related to heat medium 15b is once again respectively suctioned into the pump 21a and the pump 21b. At this point, the first heat medium flow switching device 22a and the first heat medium flow switching device 22b are set to intermediate opening degrees to maintain flows flowing into both the heat exchanger related to heat medium 15a and the heat exchanger related to heat medium 15b.

In addition, the air conditioning load required in the indoor space 7 may be covered by applying control to keep the difference between the temperature detected by the heat exchanger related to heat medium outlet temperature detecting device 31a or the temperature detected by the heat exchanger related to heat medium outlet temperature detecting device 31b and the temperature detected by the use side heat exchanger outlet temperature detecting device 34 at a target value. Also, although the heating operation by the use side heat exchangers 26 should ideally be controlled according to the difference between the inlet temperature and the outlet temperature, the heat medium temperature at the outlet of the use side heat exchangers 26 is nearly the same temperature as the temperature detected by the heat exchanger related to heat medium outlet temperature detecting device 31, and thus using the heat exchanger related to heat medium outlet temperature detecting device 31 enables a reduction in the number of temperature detecting device to constitute a system at lower cost.

Note that the temperature of either the heat exchanger related to heat medium outlet temperature detecting device 31a or the heat exchanger related to heat medium outlet temperature detecting device 31b may be used as the outlet temperature of the heat exchangers related to heat medium 15, or alternatively, their average temperature may be used.

(Cooling Main Operating Mode)

Figure 8:
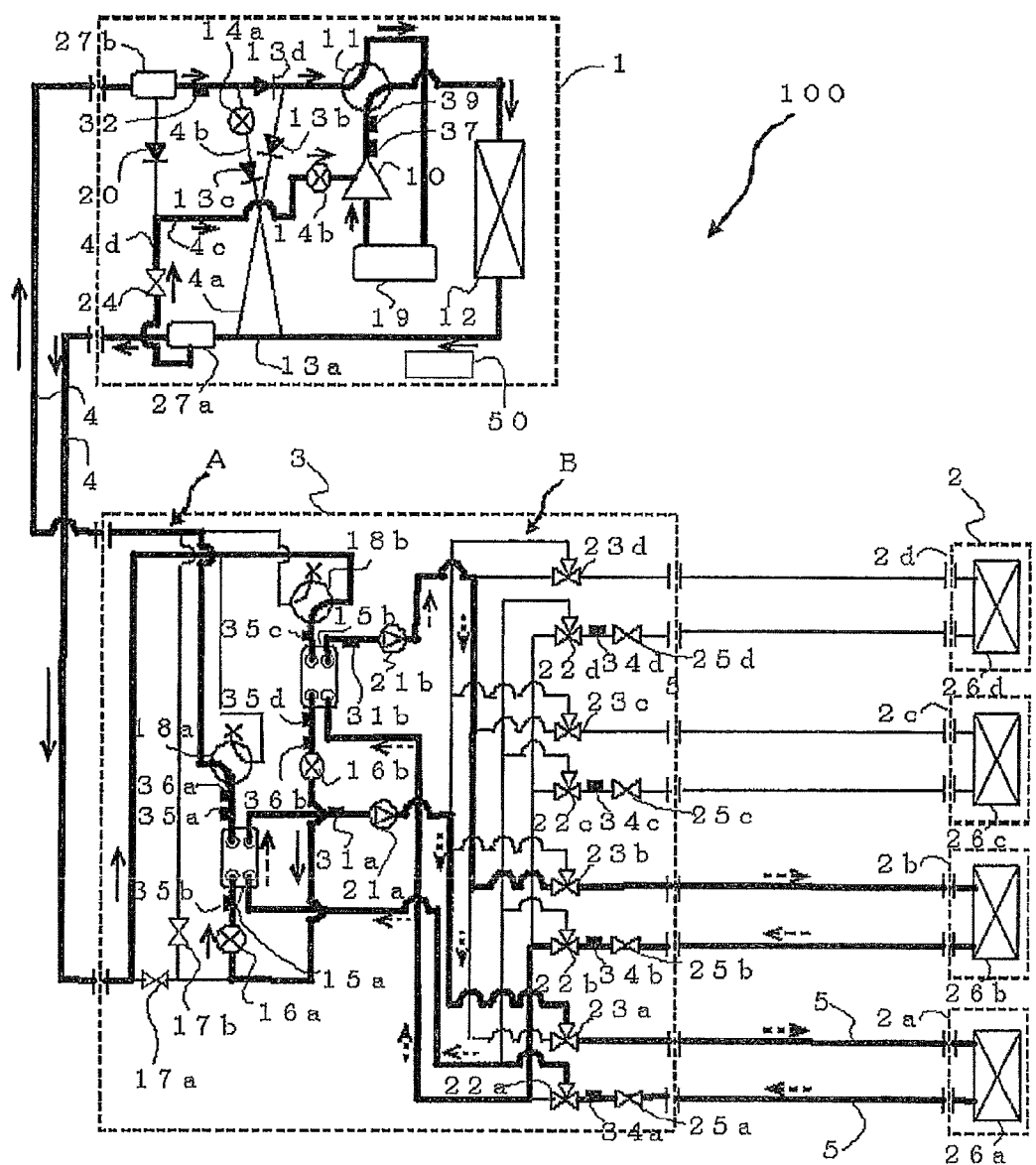
FIG. 8 is a refrigerant circuit diagram illustrating the flows of the heat source side refrigerant and the heat medium during a cooling main operating mode of the air-conditioning apparatus 100 according to Embodiment 1 of the present invention.
Figure 9:
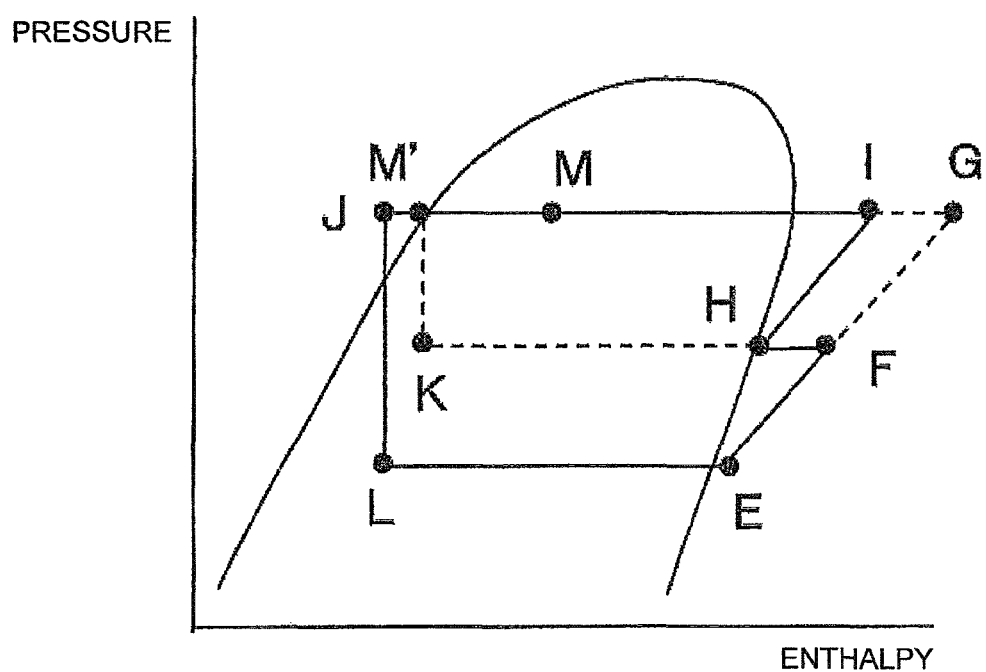
FIG. 9 is a refrigeration cycle p-h diagram during the cooling main operating mode of the air-conditioning apparatus 100 according to Embodiment 1 of the present invention.

FIG. 8 is a refrigerant circuit diagram illustrating the flows of the heat source side refrigerant and the heat medium during a cooling main operating mode of the air-conditioning apparatus 100 according to Embodiment 1 of the present invention, while FIG. 9 is a refrigeration cycle p-h diagram during the cooling main operating mode of the same air-conditioning apparatus 100. The cooling main operating mode will be described with FIG. 8, taking as an example the case where a cooling load is generated by the use side heat exchanger 26a, and a heating load is generated by the use side heat exchanger 26b. Note that in FIG. 8, pipes indicated by the thick lines represent pipes carrying the heat source side refrigerant and the heat medium, while solid-line arrows represent the direction in which the heat source side refrigerant flows and broken-line arrows represent the direction in which the heat medium flows.

In the case of the cooling main operating mode illustrated in FIG. 8, the controller 50 causes the first refrigerant flow switching device 11 to switch such that the heat source side refrigerant discharged from the compressor 10 flows into the heat source side heat exchanger 12 in the outdoor unit 1. In addition, the controller 50 applies opening and closing control to put the expansion device 16a in a fully open state, the opening and closing device 17a and the opening and closing device 17b in a closed state, and the opening and closing device 24 in an open state. Then, in the heat medium relay unit 3, the controller 50 drives the pump 21a and the pump 21b, opens the heat medium flow control device 25a and the heat medium flow control device 25b, and fully closes the heat medium flow control device 25c and the heat medium flow control device 25d, causing the heat medium to respectively circulate between the heat exchanger related to heat medium 15a and the use side heat exchanger 26a, and between the heat exchanger related to heat medium 15b and the use side heat exchanger 26b.

First, the flow of the heat source side refrigerant in the refrigerant circuit A will be described with reference to FIGS. 8 and 9. A low temperature and low pressure gaseous refrigerant (point E) is compressed by the compressor 10 and discharged as a high temperature and high pressure gaseous refrigerant (point I), which flows into the heat source side heat exchanger 12 via the first refrigerant flow switching device 11 and condenses to become a high pressure two-phase gas-liquid refrigerant while radiating heat to the outside air. The high pressure two-phase gas-liquid refrigerant (point M) flowing out of the heat source side heat exchanger 12 flows out of the outdoor unit 1 via the check valve 13a and the gas liquid separator 27a, and flows into the heat medium relay unit 3 via the refrigerant pipes 4.

Also, in the high pressure two-phase gas-liquid refrigerant flowing into the gas liquid separator 27a, a liquid refrigerant is divided from the two-phase gas-liquid refrigerant, and the liquid refrigerant thus divided (saturated liquid refrigerant, point M') is split by the branching pipe 4d and flows into the injection pipe 4c after passing through the opening and closing device 24. The liquid refrigerant flowing into the injection pipe 4c is expanded and depressurized by the expansion device 14b to become the low temperature and medium pressure two-phase gas-liquid refrigerant (point K), which is injected into the compressor 10 from the aperture unit provided in the compression chamber of the compressor 10. At this point, a medium pressure gaseous refrigerant (point F) mixes with the low temperature and medium pressure two-phase gas-liquid refrigerant (point K) inside the compressor 10, the temperature of the heat source side refrigerant decreases (point H), and as a result, the discharge temperature of the gaseous refrigerant discharged from the compressor 10 decreases (point I). Additionally, the point G in FIG. 9 is the discharge temperature of the compressor 10 in the case where an injection operation is not carried out, which demonstrates that the injection operation lowers the discharge temperature from the point G to the point I.

The two-phase gas-liquid refrigerant flowing into the heat medium relay unit 3 passes through the second refrigerant flow switching device 18b and flows into the heat exchanger related to heat medium 15b which acts as a condenser, and condenses to become a high pressure liquid refrigerant (point J) while heating the heat medium by radiating heat to the heat medium circulating through the heat medium circuit B. The liquid refrigerant flowing out of the heat exchanger related to heat medium 15b is expanded and depressurized by the expansion device 16b to become a low pressure and low pressure two-phase gas-liquid refrigerant (point L). The two-phase gas-liquid refrigerant passes through the expansion device 16a and flows into the heat exchanger related to heat medium 15a which acts as an evaporator, and evaporates to become the low temperature and low pressure gaseous refrigerant (point E) while cooling the heat medium by absorbing heat from the heat medium circulating through the heat medium circuit B. The gaseous refrigerant flowing out of the heat exchanger related to heat medium 15a flows out of the heat medium relay unit 3 via the second refrigerant flow switching device 18a, and once again flows into the outdoor unit 1 via the refrigerant pipes 4.

The gaseous refrigerant flowing into the outdoor unit 1 passes through the gas liquid separator 27b and the check valve 13d, and is once again suctioned into the compressor 10 via the first refrigerant flow switching device 11 and the accumulator 19.

At this point, the controller 50 controls the opening degree of the expansion device 16b such that the superheat obtained as the difference between the temperature detected by the heat exchanger related to heat medium refrigerant temperature detecting device 35a and the temperature detected by the heat exchanger related to heat medium refrigerant temperature detecting device 35b becomes constant.

Note that the controller 50 may also control the opening degree of the expansion device 16b such that the subcooling obtained as the difference between the temperature detected by the heat exchanger related to heat medium refrigerant temperature detecting device 35d and a value obtained by converting the pressure detected by the heat exchanger related to heat medium refrigerant pressure detecting device 36b into a saturation temperature becomes constant.

The control device may also fully open the expansion device 16b and control the superheat or subcooling with the expansion device 16a.

Next, the flow of the heat medium in the heat medium circuit B will be described with reference to FIG. 8. In the cooling main operating mode, the heating energy of the heat source side refrigerant is transferred to the heat medium by the heat exchanger related to heat medium 15b, and the heated heat medium is circulated through the heat medium circuit B by the pump 21b. Also, the cooling energy of the heat source side refrigerant is transferred to the heat medium by the heat exchanger related to heat medium 15a, and the cooled heat medium is circulated through the heat medium circuit B by the pump 21a.

The pressurized heat medium flowing out of the pump 21b flows out of the heat medium relay unit 3 via the second heat medium flow switching device 23b, and flows into the indoor unit 2b via the heat medium pipes 5. The pressurized heat medium flowing out of the pump 21a flows out of the heat medium relay unit 3 via the second heat medium flow switching device 23a, and flows into the indoor unit 2a via the heat medium pipes 5. At this point, since the heat medium flow control device 25c and the heat medium flow control device 25d are fully closed, the heat medium does not respectively flow into the indoor unit 2c and the indoor unit 2d via the second heat medium flow switching device 23c and the second heat medium flow switching device 23d.

The heat medium flowing into the indoor unit 2b flows into the use side heat exchanger 26b, while the heat medium flowing into the indoor unit 2a flows into the use side heat exchanger 26a. The heat medium flowing into the use side heat exchanger 26b radiates heat to the indoor air, thereby carrying out the heating operation on the indoor space 7. Meanwhile, the heat medium flowing into the use side heat exchanger 26a absorbs heat from the indoor air, thereby carrying out the cooling operation on the indoor space 7. Then, the heat medium flowing out of the use side heat exchanger 26b at a somewhat lowered temperature flows out of the indoor unit 2b, and flows into the heat medium relay unit 3 via the heat medium pipes 5. Meanwhile, the heat medium flowing out of the use side heat exchanger 26a at a somewhat raised temperature flows out of the indoor unit 2a, and flows into the heat medium relay unit 3 via the heat medium pipes 5.

The heat medium flowing into the heat medium relay unit 3 from the use side heat exchanger 26b flows into the heat medium flow control device 25b, while the heat medium flowing into the heat medium relay unit 3 from the use side heat exchanger 26a flows into the heat medium flow control device 25a. At this point, the heat medium is made to flow into the use side heat exchanger 26a and the use side heat exchanger 26b at a flow rate controlled by the action of the heat medium flow control device 25a and the heat medium flow control device 25b, this flow rate being the flow rate of the heat medium necessary to cover the air conditioning load required indoors. The heat medium flowing out of the heat medium flow control device 25b flows into the heat exchanger related to heat medium 15b via the first heat medium flow switching device 22b, and is once again suctioned into the pump 21b. Meanwhile, the heat medium flowing out of the heat medium flow control device 25a flows into the heat exchanger related to heat medium 15a via the first heat medium flow switching device 22a, and is once again suctioned into the pump 21a. As above, the heated heat medium and the cooled heat medium flows into the use side heat exchangers 26 having the heating load and the cooling load, respectively, and due to the action of the first heat medium flow switching devices 22 and the second heat medium flow switching devices 23, the heat medium does not mix.

In addition, the air conditioning load required in the indoor space 7 may be covered by keeping the difference between the temperature detected by the heat exchanger related to heat medium outlet temperature detecting device 31b and the temperature detected by the use side heat exchanger outlet temperature detecting device 34b at a target value on the heating side, while keeping the difference between the temperature detected by the use side heat exchanger outlet temperature detecting device 34a and the temperature detected by the heat exchanger related to heat medium outlet temperature detecting device 31a at a target value on the cooling side.

(Heating Main Operating Mode)

Figure 10:
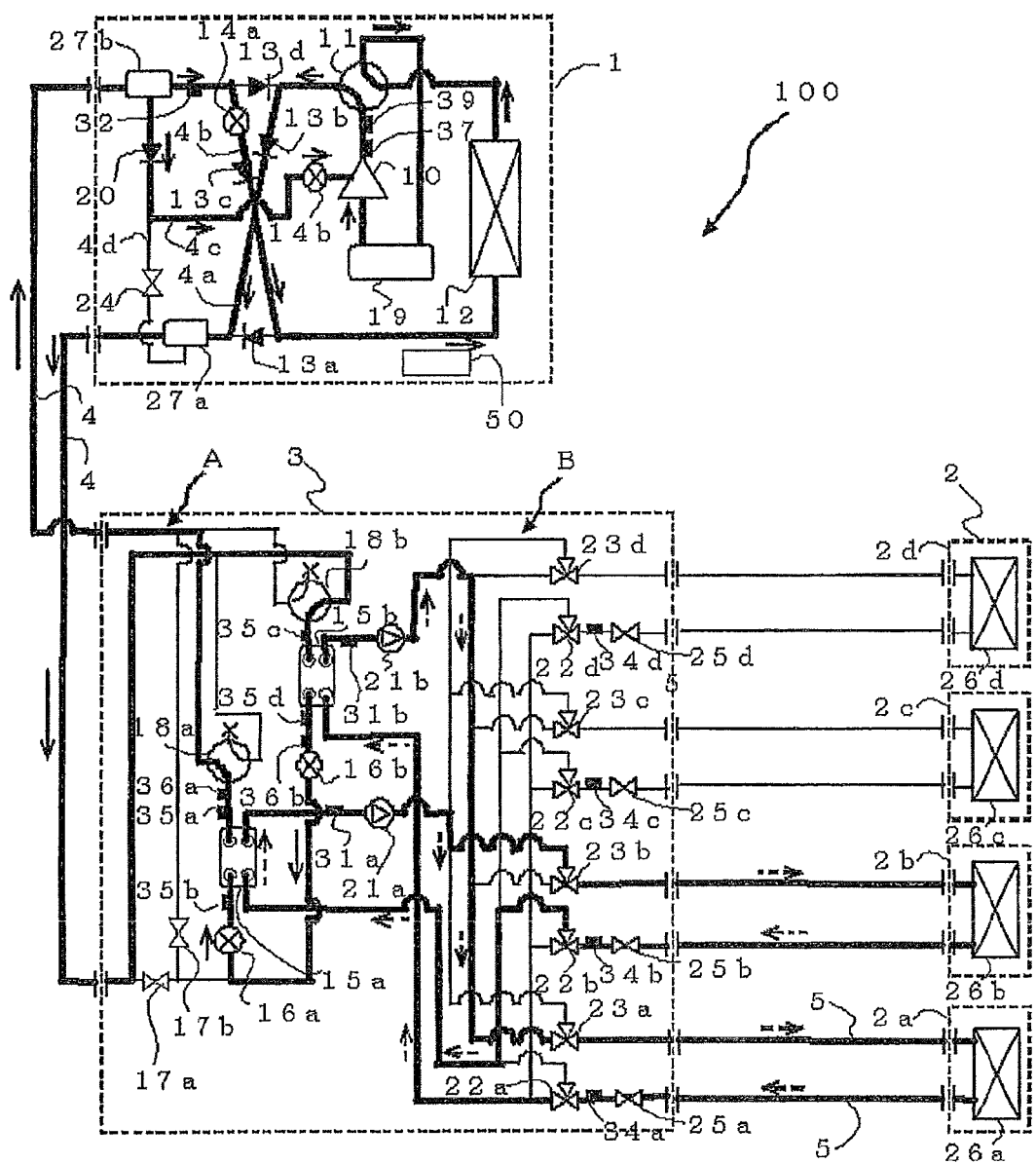
FIG. 10 is a refrigerant circuit diagram illustrating the flows of the heat source side refrigerant and the heat medium during a heating main operating mode of the air-conditioning apparatus 100 according to Embodiment 1 of the present invention.
Figure 11:
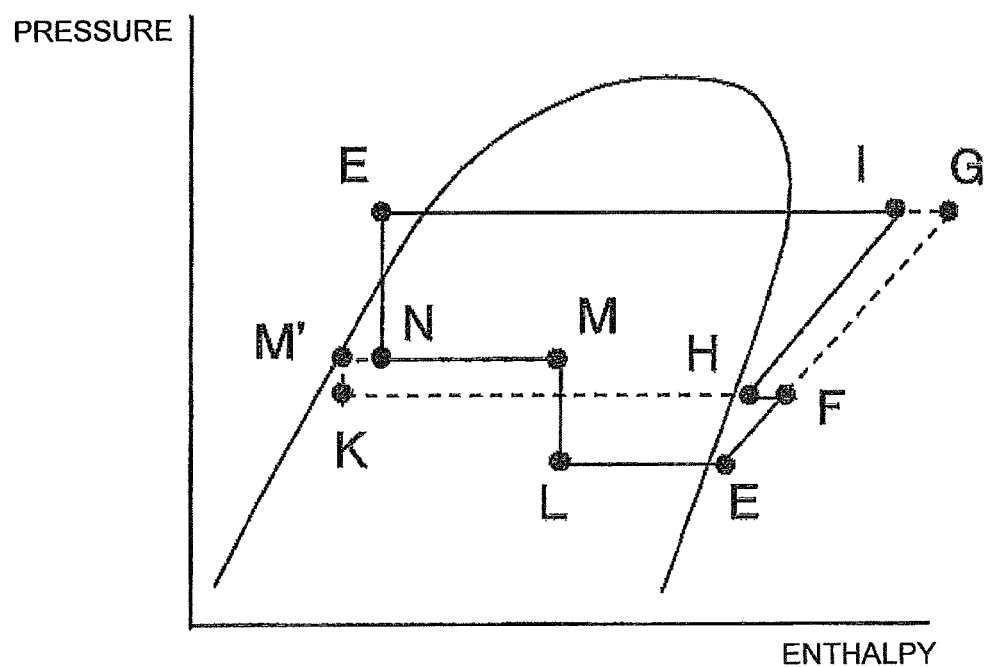
FIG. 11 is a refrigeration cycle p-h diagram during the heating main operating mode of the air-conditioning apparatus 100 according to Embodiment 1 of the present invention.

FIG. 10 is a refrigerant circuit diagram illustrating the flows of the heat source side refrigerant and the heat medium during a heating main operating mode of the air-conditioning apparatus 100 according to Embodiment 1 of the present invention, while FIG. 11 is a refrigeration cycle p-h diagram during the heating main operating mode of the same air-conditioning apparatus 100. The heating main operating mode will be described with FIG. 10, taking as an example the case where a heating load is generated by the use side heat exchanger 26a, and a cooling load is generated by the use side heat exchanger 26b. Note that in FIG. 10, pipes indicated by the thick lines represent pipes circulating the heat source side refrigerant and the heat medium, while solid-line arrows represent the direction in which the heat source side refrigerant flows and broken-line arrows represent the direction in which the heat medium flows.

In the case of the heating main operating mode illustrated in FIG. 10, the controller 50 causes the first refrigerant flow switching device 11 to switch such that the heat source side refrigerant discharged from the compressor 10 flows into the heat medium relay unit 3 without passing through the heat source side heat exchanger 12 in the outdoor unit 1. In addition, the controller 50 applies opening and closing control to put the expansion device 16a in a fully open state, the opening and closing device 17a in a closed state, the opening and closing device 17b in a closed state, and the opening and closing device 24 in an open state. Then, in the heat medium relay unit 3, the controller 50 drives the pump 21a and the pump 21b, opens the heat medium flow control device 25a and the heat medium flow control device 25b, and fully closes the heat medium flow control device 25c and the heat medium flow control device 25d, causing the heat medium to respectively circulate between the heat exchanger related to heat medium 15a and the use side heat exchanger 26b, and between the heat exchanger related to heat medium 15b and the use side heat exchanger 26a.

First, the flow of the heat source side refrigerant in the refrigerant circuit A will be described with reference to FIGS. 10 and 11. A low temperature and low pressure gaseous refrigerant (point E) is compressed by the compressor 10 and discharged as a high temperature and high pressure gaseous refrigerant (point I), which flows out of the outdoor unit 1 via the first refrigerant flow switching device 11, the check valve 13b in the first connecting pipe 4a, and the gas liquid separator 27a. The high temperature and high pressure gaseous refrigerant flowing out of the outdoor unit 1 flows into the heat medium relay unit 3 via the refrigerant pipes 4.

The high temperature and high pressure gaseous refrigerant flowing into the heat medium relay unit 3 passes through the second refrigerant flow switching device 18b and flows into the heat exchanger related to heat medium 15b which acts as a condenser, and condenses to become a high pressure liquid refrigerant (point J) while heating the heat medium by radiating heat to the heat medium circulating through the heat medium circuit B. The liquid refrigerant flowing out of the heat exchanger related to heat medium 15b is expanded and depressurized by the expansion device 16b to become a medium pressure two-phase gas-liquid refrigerant (point N). The two-phase gas-liquid refrigerant passes through the expansion device 16a and flows into the heat exchanger related to heat medium 15a which acts as an evaporator, and its quality increases (point M) while cooling the heat medium by absorbing heat from the heat medium circulating through the heat medium circuit B. The two-phase gas-liquid refrigerant flowing out of the heat exchanger related to heat medium 15a flows out of the heat medium relay unit 3 via the second refrigerant flow switching device 18a, and once again flows into the outdoor unit 1 via the refrigerant pipes 4.

The two-phase gas-liquid refrigerant flowing into the outdoor unit 1 flows into the second connecting pipe 4b via the gas liquid separator 27b, and is expanded and depressurized by the expansion device 14a to become a low temperature and low pressure two-phase gas-liquid refrigerant (point L). The low temperature and low pressure two-phase gas-liquid refrigerant flows into the heat source side heat exchanger 12 via the check valve 13c and evaporates to become the low temperature and low pressure gaseous refrigerant (point E) while absorbing heat from the outside air. The low temperature and low pressure gaseous refrigerant flowing out of the heat source side heat exchanger 12 is once again suctioned into the compressor 10 via the first refrigerant flow switching device 11 and the accumulator 19.

Also, in the medium temperature and medium pressure two-phase gas-liquid refrigerant flowing into the gas liquid separator 27b, liquid refrigerant is divided from the two-phase gas-liquid refrigerant, and the liquid refrigerant thus divided (saturated liquid refrigerant, point M') flows into the injection pipe 4c after passing through the backflow prevention device 20. The liquid refrigerant flowing into the injection pipe 4c is expanded and depressurized by the expansion device 14b to become a low temperature and medium pressure two-phase gas-liquid refrigerant at a slightly lowered pressure (point K), which is injected into the compressor 10 from the aperture unit provided in the compression chamber of the compressor 10. At this point, a medium pressure gaseous refrigerant (point F) mixes with the low temperature and medium pressure two-phase gas-liquid refrigerant (point K) inside the compressor 10, the temperature of the heat source side refrigerant decreases (point H), and as a result, the discharge temperature of the gaseous refrigerant discharged from the compressor 10 decreases (point I). Additionally, the point G in FIG. 11 is the discharge temperature of the compressor 10 in the case where an injection operation is not carried out, which demonstrates that the injection operation lowers the discharge temperature from the point G to the point I.

At this point, the controller 50 controls the opening degree of the expansion device 16b such that the subcooling obtained as the difference between the temperature detected by the heat exchanger related to heat medium refrigerant temperature detecting device 35d and a value obtained by converting the pressure detected by the heat exchanger related to heat medium refrigerant pressure detecting device 36b into a saturation temperature becomes constant.

Note that the controller 50 may also fully open the expansion device 16b and control the above subcooling with the expansion device 16a.

In addition, by entering a closed state, the opening and closing device 24 prevents high pressure refrigerant in the gas liquid separator 27a from mixing with medium pressure refrigerant that has passed through the backflow prevention device 20.

Also, the expansion device 14a is taken to have a variable aperture area such as an electronic expansion valve, with the controller 50 able to control the medium pressure on the upstream side of the expansion device 14a at an arbitrary pressure. For example, if the opening degree of the expansion device 14a is controlled such that the medium pressure detected by the medium pressure detecting device 32 becomes a constant value, control of the discharge temperature by the expansion device 14b can be stabilized. However, the expansion device 14a is not limited thereto, and may be combined with an opening and closing valve such as a small solenoid valve to enable the selection of multiple aperture areas, or alternatively, be a capillary tube in which medium pressure is formed according to pressure loss of the refrigerant, although controllability is to be slightly worsened. Nonetheless, controlling to keep the discharge temperature at a target is still possible.

In addition, the control method for the expansion device 14a and the expansion device 14b is not limited to that described above, and a control method that fully opens the expansion device 14b and controls the discharge temperature of the compressor 10 with the expansion device 14a may also be used. Doing so has the advantage of simplifying control while also allowing the use of a low-cost device as the expansion device 14b. In this case, however, the medium pressure can no longer be freely controlled, and it is necessary to implement control of the expansion device 14a while taking into account both the medium pressure and the discharge temperature.

Also, the medium pressure detecting device 32 may be a pressure sensor, or alternatively, be configured to compute medium pressure by computation using a temperature sensor.

Note that in the heating main operating mode, it is necessary to cool the heat medium in the heat exchanger related to heat medium 15a, and the pressure of the refrigerant on the upstream side of the expansion device 14a (medium pressure) cannot be set very high. If medium pressure cannot be set high, the injection quantity into the compression chamber decreases, and the discharge temperature is not lowered as much. However, this is not problematic. Since it is necessary to prevent freezing of the heat medium, it may be configured such that the heating main operating mode is not implemented when the outside air temperature is low (for example, when the outside air temperature is −5 degrees C. or less). When the outside temperature is high, the discharge temperature is not very high, and the injection quantity does not need to be very large. By controlling the opening degree of the expansion device 14a, cooling of the heat medium in the heat exchanger related to heat medium 15b is also possible, and the medium pressure can be set to enable supplying the compression chamber of the compressor 10 with an injection quantity sufficient to lower the discharge temperature. Thus, stable operation is possible.

Next, the flow of the heat medium in the heat medium circuit B will be described with reference to FIG. 10. In the heating main operating mode, the heating energy of the heat source side refrigerant is transferred to the heat medium by the heat exchanger related to heat medium 15b, and the heated heat medium is circulated through the heat medium circuit B by the pump 21b. Also, the cooling energy of the heat source side refrigerant is transferred to the heat medium by the heat exchanger related to heat medium 15a, and the cooled heat medium is circulated through the heat medium circuit B by the pump 21a.

The heat medium pressurized by the pump 21b and flowing out thereof flows out of the heat medium relay unit 3 via the second heat medium flow switching device 23a, and flows into the indoor unit 2a via the heat medium pipes 5. The heat medium pressurized by the pump 21a and flowing out thereof flows out of the heat medium relay unit 3 via the second heat medium flow switching device 23b, and flows into the indoor unit 2b via the heat medium pipes 5. At this point, since the heat medium flow control device 25c and the heat medium flow control device 25d are fully closed, the heat medium does not respectively flow into the indoor unit 2c and the indoor unit 2d via the second heat medium flow switching device 23c and the second heat medium flow switching device 23d.

The heat medium flowing into the indoor unit 2b flows into the use side heat exchanger 26b, while heat medium flowing into the indoor unit 2a flows into the use side heat exchanger 26a. The heat medium flowing into the use side heat exchanger 26b absorbs heat from the indoor air, thereby carrying out a cooling operation on the indoor space 7. Meanwhile, the heat medium flowing into the use side heat exchanger 26a radiates heat to the indoor air, thereby carrying out a heating operation on the indoor space 7. Then, the heat medium flowing out of the use side heat exchanger 26b at a somewhat raised temperature flows out of the indoor unit 2b, and flows into the heat medium relay unit 3 via the heat medium pipes 5. Meanwhile, the heat medium flowing out of the use side heat exchanger 26a at a somewhat lowered temperature flows out of the indoor unit 2a, and flows into the heat medium relay unit 3 via the heat medium pipes 5.

The heat medium flowing into the heat medium relay unit 3 from the use side heat exchanger 26b flows into the heat medium flow control device 25b, while the heat medium flowing into the heat medium relay unit 3 from the use side heat exchanger 26a flows into the heat medium flow control device 25a. At this point, the heat medium is made to flow into the use side heat exchanger 26a and the use side heat exchanger 26b at a flow rate controlled by the action of the heat medium flow control device 25a and the heat medium flow control device 25b, this flow rate being the flow rate of the heat medium necessary to cover the air conditioning load required indoors. Heat medium flowing out of the heat medium flow control device 25b flows into the heat exchanger related to heat medium 15a via the first heat medium flow switching device 22b, and is once again suctioned into the pump 21a. Meanwhile, heat medium flowing out of the heat medium flow control device 25a flows into the heat exchanger related to heat medium 15b via the first heat medium flow switching device 22a, and is once again suctioned into the pump 21b. As above, the heated heat medium and the cooled heat medium flows into the use side heat exchangers 26 having the heating load and the cooling load, respectively, and due to the action of the first heat medium flow switching devices 22 and the second heat medium flow switching devices 23, the heat medium does not mix.

In addition, the air conditioning load required in the indoor space 7 may be covered by keeping the temperature difference between the temperature detected by the heat exchanger related to heat medium outlet temperature detecting device 31b and the temperature detected by the use side heat exchanger outlet temperature detecting device 34a at a target value on the heating side, while keeping the temperature difference between the temperature detected by the use side heat exchanger outlet temperature detecting device 34b and the temperature detected by the heat exchanger related to heat medium outlet temperature detecting device 31a at a target value on the cooling side.

In the above cooling main operating mode and heating main operating mode, a change in the operating state of the heat exchanger related to heat medium 15a and the heat exchanger related to heat medium 15b (the heating operation or the cooling operation of the heat medium) causes currently warm heat medium to cool and become a cool heat medium, or alternatively, causes current cool heat medium to become a warm heat medium, thus generating excess energy. Thus, the air-conditioning apparatus 100 according to Embodiment 1 is configured such that the heat exchanger related to heat medium 15b is always on the heating side and the heat exchanger related to heat medium 15a is always on the cooling side in both the cooling main operating mode and the heating main operating mode.

Also, in the case where the use side heat exchangers 26 generate a mixed heating load and cooling load in the cooling main operating mode and the heating main operating mode as above, the first heat medium flow switching devices 22 and the second heat medium flow switching devices 23 corresponding to the use side heat exchangers 26 implementing heating switch to a flow path connected to the heat exchanger related to heat medium 15b used to heat the heat medium, while the first heat medium flow switching devices 22 and the second heat medium flow switching devices 23 switch to a flow path connected to the heat exchanger related to heat medium 15a used to cool the heat medium. In so doing, each indoor unit 2 is able to switch freely between the heating operation and the cooling operation.

(Expansion Device 14a and Expansion Device 14b)

An injection operation into the compression chamber of the compressor 10 in each operating mode is carried out as above. Consequently, a liquid refrigerant divided by the gas liquid separator 27a and the gas liquid separator 27b flows into the expansion device 14b. However, liquid refrigerant divided by the gas liquid separator 27a and the gas liquid separator 27b is not supercooled except during the cooling only operating mode, and enters a saturated liquid state. A saturated liquid state is a state in which small quantities of gaseous refrigerant are actually mixed in, and may also become two-phase gas-liquid refrigerant due to slight pressure loss in the opening and closing device 24 and the refrigerant pipes or the like. Also, in the case of using an electronic expansion valve as the expansion device 14b, when the two-phase gas-liquid refrigerant flows in, and a gaseous refrigerant and a liquid refrigerant are flowing separately, a state of gas flowing and a state of liquid flowing through the expansion unit of the expansion device 14b may occur separately, and the pressure on the outlet side of the expansion device 14b may be unstable in some cases. Liquid refrigerant separation particularly occurs with a strong tendency in cases of low quality. Thus, if a device having a structure like that illustrated in FIG. 12 below is used as the expansion device 14b, stable control becomes possible, even when the two-phase gas-liquid refrigerant flows in. The case of using a gas liquid separator enables sufficiently stable control even without modifying the expansion device 14b in this way, but given the expansion device 14b a structure as in FIG. 12 enables stable control regardless of environmental conditions.

Note that the expansion device structure illustrated in FIG. 12 below is not limited to being applied to the expansion device 14b, and is similarly effective even when applied to the expansion device 14a circulating a two-phase gas-liquid refrigerant in the heating only operating mode and the heating main operating mode.

Figure 12:
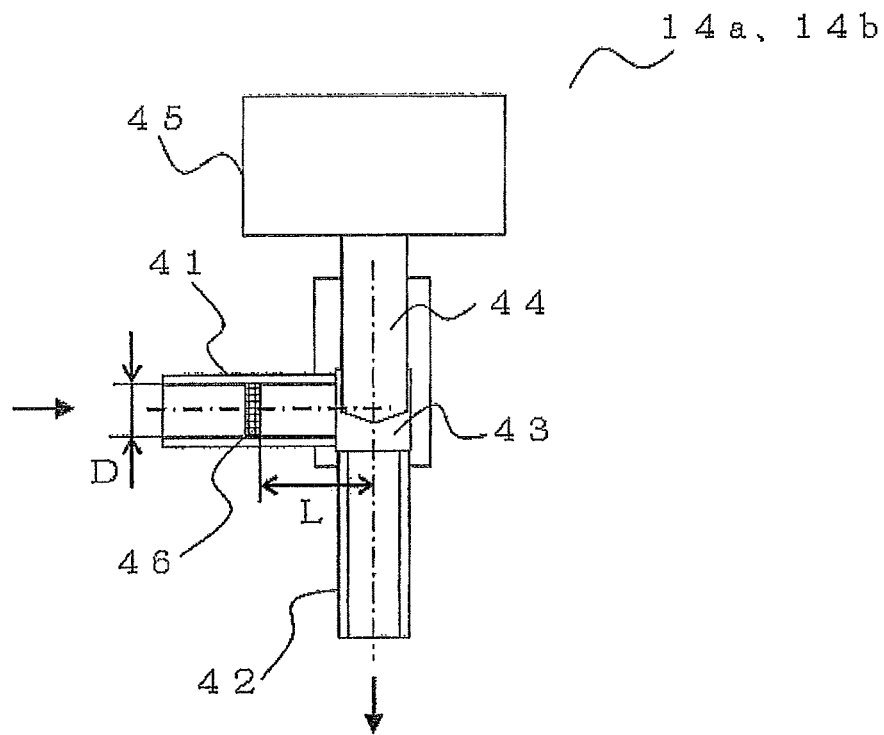
FIG. 12 is a structural diagram of the expansion device 14b (or the expansion device 14a) of the air-conditioning apparatus 100 according to Embodiment 1 of the present invention.

FIG. 12 is a structural diagram of the expansion device 14b (or the expansion device 14a) of the air-conditioning apparatus 100 according to Embodiment 1 of the present invention. Hereinafter, the structure of an expansion device will be described with reference to FIG. 12, taking the expansion device 14b as an example.

As illustrated in FIG. 12, the expansion device 14b is made up of an inflow pipe 41, an outflow pipe 42, an expansion portion 43, a valve body 44, a motor 45, and a mixing device 46, with the mixing device 46 installed inside the inflow pipe 41. The two-phase gas-liquid refrigerant flowing into the inflow pipe 41 is mixed by the mixing device 46 such that the gaseous refrigerant and the liquid refrigerant is nearly uniformly intermingled. The two-phase gas-liquid refrigerant with nearly uniformly intermingled gaseous refrigerant and liquid refrigerant is pushed through the expansion portion 43 by the valve body 44 and depressurized, and flows out of the outflow pipe 42. At this point, the position of the valve body 44 is controlled by the motor 45 to control the expansion rate in the expansion portion 43. The motor 45 may be driven and controlled by the controller 50.

The mixing device 46 may be any device capable of creating a state in which gaseous refrigerant and liquid refrigerant are nearly uniformly intermingled, and may be realized using foam metal, for example. The foam metal is a metal porous body having a three-dimensional network-like structure similar to resin foam such as sponges, and has the greatest porosity (void ratio) among metal porous bodies (80% to 97%). When a two-phase gas-liquid refrigerant is made to flow through such foam metal, a gaseous refrigerant among the two-phase gas-liquid refrigerant is finely distributed and mixed by the three-dimensional network-like structure, which has the effect of uniformly intermingling the gaseous refrigerant with the liquid refrigerant.

At this point, provided that the inner diameter of a pipe is D and the length of a pipe is L, it is clear from the field of fluid dynamics that the effects of mixing will disappear and the flow inside a pipe will return to the original flow upon reaching a distance where L/D becomes 8 to 10 starting from the location having the structure that mixes the flow. Thus, provided that the inner diameter of the inflow pipe 41 is D and the length from the mixing device 46 to the expansion portion 43 is L in the expansion device 14b, if the mixing device 46 is installed at a position such that L/D is 6 or less, the mixed two-phase gas-liquid refrigerant will be able to reach the expansion portion 43 while still in the mixed state, enabling stable control.

Figure 13:
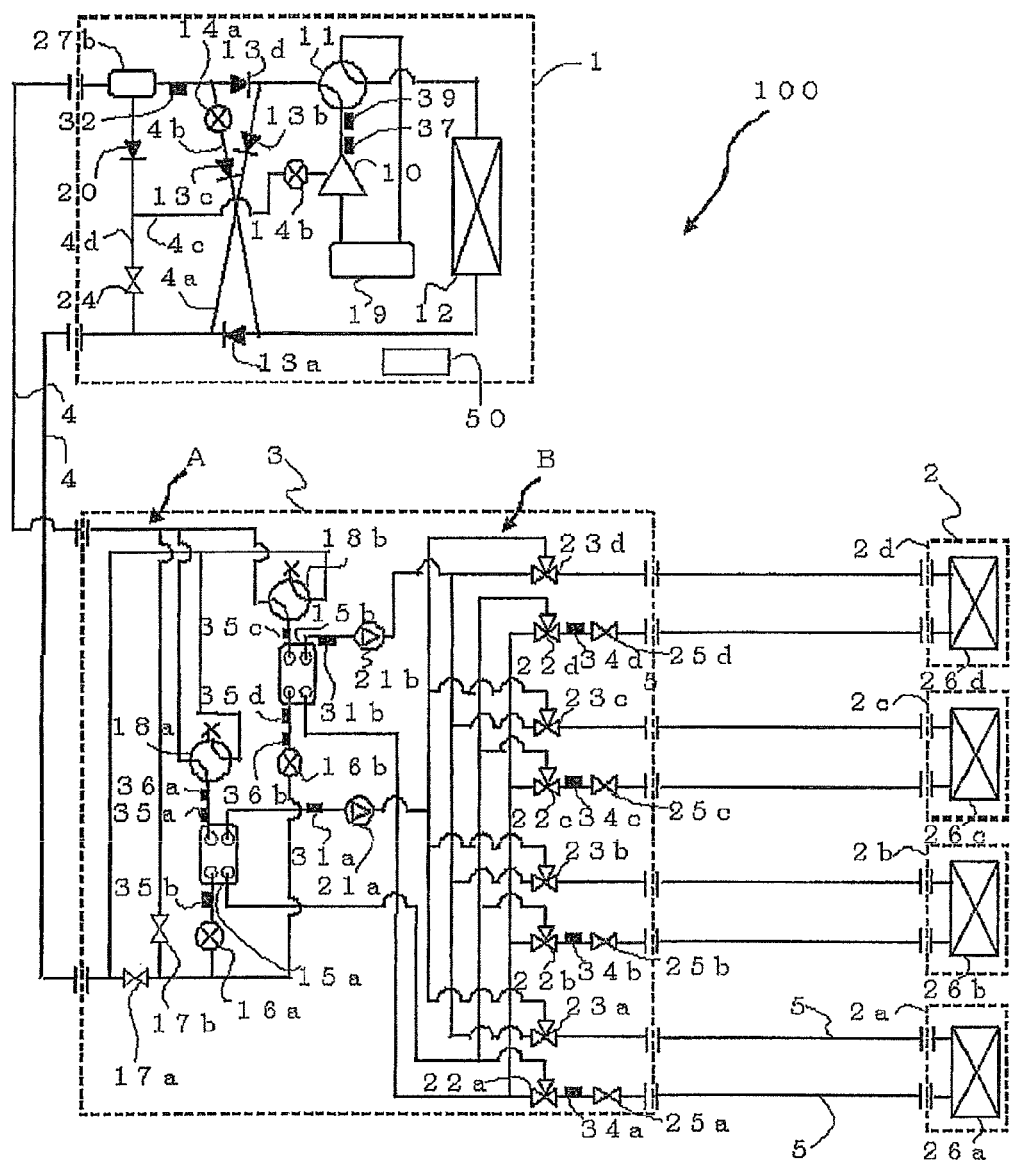
FIG. 13 is a schematic diagram illustrating another mode of a circuit configuration of the air-conditioning apparatus 100 according to Embodiment 1 of the present invention.

Also, a state of higher discharge temperature occurs in the case where the frequency of the compressor 10 rises and the condensing temperature rises in order to keep the evaporating temperature at a target temperature, such as 0 degrees C., for example, in the cooling only operating mode in the case of a high outside air temperature, and in the case where the frequency of the compressor 10 rises and the evaporating temperature lowers in order to keep the condensing temperature at a target temperature, such as 49 degrees C., for example, in the heating only operating mode in the case of a low outside air temperature. On the other hand, with the cooling main operating mode it is necessary to maintain both the condensing temperature and the evaporating temperature at respective target temperatures (such as 49 degrees C. and 0 degrees C.), and since both the condensing temperature and the evaporating temperature rise past their target temperatures in the cooling main operating mode in the case of a high outside air temperature, a state in which the frequency of the compressor 10 rises extremely as in the cooling only operating mode in the case of a high outside air temperature hardly occurs, and a constraint is imposed on frequency increases of the compressor 10 so that the condensing temperature does not become too high. For this reason, the discharge temperature does not tend to rise in the cooling main operating mode. Thus, the gas liquid separator 27a may be removed and a branching unit that simply splits refrigerant, and an injection operation may not be carried out by putting the opening and closing device 24 in a closed state during the cooling main operating mode, as illustrated in FIG. 13.

Effects of Embodiment 1

According to the foregoing configuration and operations, it is possible to inject the heat source side refrigerant into the compression chamber of the compressor 10 regardless of the operating mode and apply control such that the discharge temperature does not become too high, even in the case of using a refrigerant such as R32 having a higher discharge temperature in the compressor 10, thus suppressing degradation of the heat source side refrigerant and the refrigerating machine oil, and enabling safe operation.

Additionally, even if a compressor with a low-pressure shell structure is used as the compressor 10, it is still possible to lower the discharge temperature by injecting a low-temperature heat source side refrigerant from outside during the compression process.

Also, in the air-conditioning apparatus 100 according to Embodiment 1, in the case where only a heating load or only a cooling load is generated in the use side heat exchangers 26, the corresponding first heat medium flow switching devices 22 and the second heat medium flow switching devices 23 may be set to intermediate opening degrees to allow heat medium to flow through both the heat exchanger related to heat medium 15a and the heat exchanger related to heat medium 15b. Doing so enables the use of both the heat exchanger related to heat medium 15a and the heat exchanger related to heat medium 15b for the heating operation or the cooling operation, thereby increasing the heat transfer area and enabling efficient heating operation or cooling operation to be conducted.

Also, in the case where the use side heat exchangers 26 generate a mixed heating load and cooling load, the first heat medium flow switching devices 22 and the second heat medium flow switching devices 23 corresponding to the use side heat exchangers 26 implementing heating operation switch to a flow path connected to the heat exchanger related to heat medium 15b used for heating, while the first heat medium flow switching devices 22 and the second heat medium flow switching devices 23 corresponding to the use side heat exchangers 26 implementing cooling operation switch to a flow path connected to the heat exchanger related to heat medium 15a used for cooling. In so doing, each indoor unit 2 is able to switch freely between the heating operation and the cooling operation.

Note that although the first heat medium flow switching devices 22 and the second heat medium flow switching devices 23 are devices such as three-way valves able to switch among a three-way passage, the configuration is not limited thereto, and the first heat medium flow switching devices 22 and the second heat medium flow switching devices 23 may also be devices able to switch flow paths, such as a combination of two opening and closing valves or other devices that open and close a two-way passage. In addition, the first heat medium flow switching devices 22 and the second heat medium flow switching devices 23 may be devices such as mixing valves driven by a stepping motor which are able to vary the flow rate in a three-way passage, or alternatively, a combination of two devices such as electronic expansion valves able to vary the flow rate in a two-way passage. In this case, it is also possible to prevent a water hammer caused by the sudden opening or closing of a flow path. Furthermore, although Embodiment 1 describes as an example the case where the heat medium flow control devices 25 are two-way valves, the heat medium flow control devices 25 may also be control valves having a three-way passage, and may be installed together with bypass pipes that bypass the use side heat exchangers 26.

Also, the heat medium flow control devices 25 may use a device driven by a stepping motor and able to control the flow rate flowing through a flow path, and may also be a two-way valve or a three-way valve with one end sealed. Moreover, a device such as an opening and closing valve that opens and closes a two-way passage may be used, with the average flow rate controlled by repeatedly switching on and off. Furthermore, although the case of the heat medium flow control devices 25 being housed inside the heat medium relay unit 3 is described as an example, the configuration is not limited thereto, and the heat medium flow control devices 25 may also be housed inside the indoor units 2, or installed separately from the heat medium relay unit 3 and the indoor units 2 (that is, in the heat medium pipes 5).

In addition, although the second refrigerant flow switching devices 18 are four-way valves, the configuration is not limited thereto, and refrigerant may be made to flow in the same way by using multiple two-way flow switching valves or three-way flow switching valves.

In addition, although fans are typically installed in the heat source side heat exchanger 12 and the use side heat exchangers 26a to 26d to promote condensation and evaporation by blowing air, the configuration is not limited thereto. For example, devices such as panel heaters utilizing radiation may also be used as the use side heat exchangers 26a to 26d, while a water-cooled device that moves heat with water or antifreeze may be used as the heat source side heat exchanger 12. Any device may be used insofar as the device has a structure enabling heat to be radiated or absorbed.

In addition, although the case of two heat exchangers related to heat medium 15a and 15b is described as an example, the configuration is not limited thereto, and any number of heat exchangers related to heat medium 15 may be installed insofar as the configuration enables the heating or cooling of heat medium.

In addition, the pumps 21a and 21b are not limited to one each, and multiple low-capacity pumps may also be arranged in parallel.

Also, a typical gas liquid separator acts to separate a gaseous refrigerant and a liquid refrigerant in a two-phase gas-liquid refrigerant. In contrast, as described in the foregoing, the gas liquid separators 27 according to Embodiment 1 act such that, in the case where refrigerant in a two-phase gas-liquid state flows into the inlet of a gas liquid separator 27, a portion of liquid refrigerant is separated from the two-phase gas-liquid refrigerant and made to flow through the branching pipe 4d, while the remaining two-phase gas-liquid refrigerant (with slightly increased quality) is made to flow out of the gas liquid separator 27. Consequently, it is desirable for the gas liquid separators 27 to be horizontal gas liquid separators having an elongated structure as illustrated in drawings such as FIG. 2, in which an inlet pipe and an outlet pipe are attached on the sides of the gas liquid separators 27, with liquid refrigerant removal pipes structured to separate and flush liquid refrigerant downstream to the gas liquid separators 27. However, the gas liquid separators may be of any structure insofar as the structure separates a portion of liquid refrigerant from inflowing two-phase gas-liquid refrigerant, and causes the remaining two-phase gas-liquid refrigerant to flow out.

In addition, in the heating only operating mode and the heating main operating mode, frost forms around the heat source side heat exchanger 12 in the case where the temperature of the air surrounding the heat source side heat exchanger 12 is low, since a low temperature and low pressure heat source side refrigerant below the freezing point flows inside the refrigerant pipes of the heat source side heat exchanger 12. If frost forms on the heat source side heat exchanger 12, the frost layer becomes thermal resistance, and in addition, the path through which the air surrounding the heat source side heat exchanger 12 flows becomes narrower, impeding the flow of air. For this reason, the exchange of heat between the heat source side refrigerant and the air is obstructed, lowering the heating capacity and operational efficiency of the equipment. Thus, in the case of increased frost buildup on the heat source side heat exchanger 12, a defrosting operation that melts frost around the heat source side heat exchanger 12 is carried out.

Herein, the defrosting operation in the air-conditioning apparatus 100 according to Embodiment 1 will be described with reference to FIG. 14. The heat source side refrigerant is compressed and heated by the compressor 10, discharged from the compressor 10, and flows into the heat source side heat exchanger 12 via the first refrigerant flow switching device 11. The heat source side refrigerant flowing into the heat source side heat exchanger 12 then radiates heat and melts the surrounding buildup of frost. The heat source side refrigerant flowing out of the heat source side heat exchanger 12 passes through the check valve 13a to reach the gas liquid separator 27a, and is split by the gas liquid separator 27a.

One of the flows split by the gas liquid separator 27a flows out of the outdoor unit 1 and flows into the heat medium relay unit 3 via the refrigerant pipes 4. The heat source side refrigerant flowing into the heat medium relay unit 3 flows out of the heat medium relay unit 3 via the opening and closing device 17a and the opening and closing device 17b which are in the open state, and passes through the refrigerant pipes 4 to once again flow into the outdoor unit 1. The heat source side refrigerant flowing into the outdoor unit 1 passes through the check valve 13d via the gas liquid separator 27b, and is once again suctioned into the compressor 10 via the first refrigerant flow switching device 11 and the accumulator 19. At this point, the expansion device 16a and the expansion device 16b are fully closed or have small opening degrees through which the heat source side refrigerant does not flow, such that the heat source side refrigerant does not flow to the heat exchanger related to heat medium 15a and the heat exchanger related to heat medium 15b.

In addition, the other flow separated by the gas liquid separator 27a flows into the branching pipe 4d, flows into the injection pipe 4c via the opening and closing device 24 which is in an open state, is injected into the compression chamber of the compressor 10 via the expansion device 14b which is in a fully open state, and passes through the accumulator 19 to converge with the heat source side refrigerant suctioned into the compressor 10 (the first flow divided by the gas liquid separator 27a).

Figure 14:
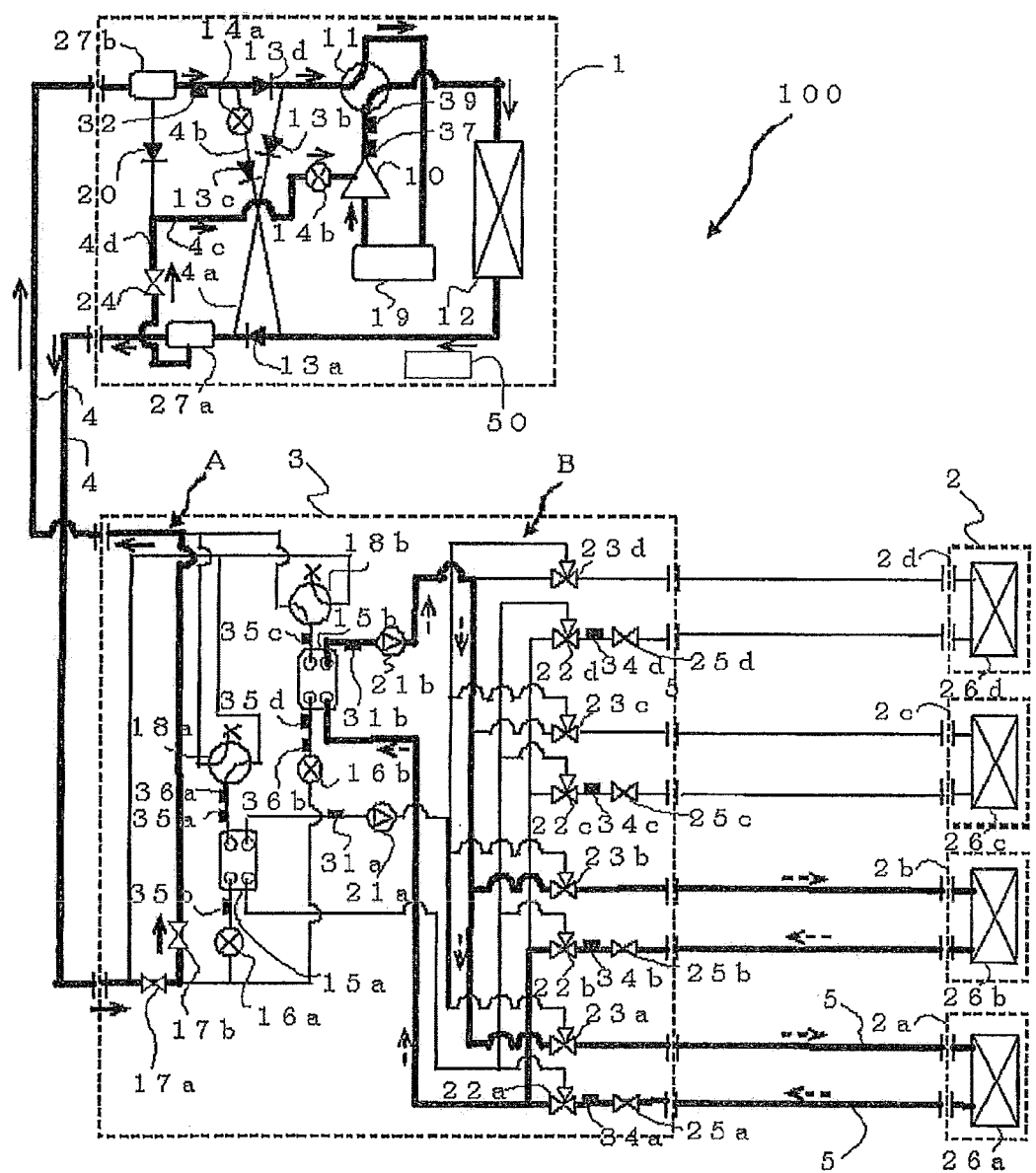
FIG. 14 is a refrigerant circuit diagram illustrating the flows of the heat source side refrigerant and the heat medium during a defrosting operating mode of the air-conditioning apparatus 100 according to Embodiment 1 of the present invention.

Note that in FIG. 14, the pump 21b is driven to circulate the heat medium use side heat exchangers 26 which have a heating request (in FIG. 14, the use side heat exchangers 26a and 26b). Thus, it is possible to continue heating operation with the heating energy stored in the heat medium, even during the defrosting operation. The pump 21a may also be driven during the defrosting operation after the heating only operating mode, or the pump 21a and the pump 21b may be suspended and suspend the heating operation during the defrosting operation.

As above, in the defrosting operation, the heat source side refrigerant is split at the gas liquid separator 27a, and a portion thereof is injected into the compression chamber of the compressor 10 while melting frost buildup around the heat source side heat exchanger 12. Thus, waste heat from the compressor 10 is more easily transferred to the heat source side refrigerant directly, enabling the efficient implementation of the defrosting operation. In addition, since the flow rate of the heat source side refrigerant circulating through the heat medium relay unit 3 away from the outdoor unit 1 can be decreased by the injection flow rate, it is possible to decrease the power of the compressor 10.

Embodiment 2

The points regarding the air-conditioning apparatus 100 according to Embodiment 2 that differ from the configuration and operation of the air-conditioning apparatus 100 according to Embodiment 1 will be mainly described.
(Configuration of Air-Conditioning Apparatus)

Figure 15:
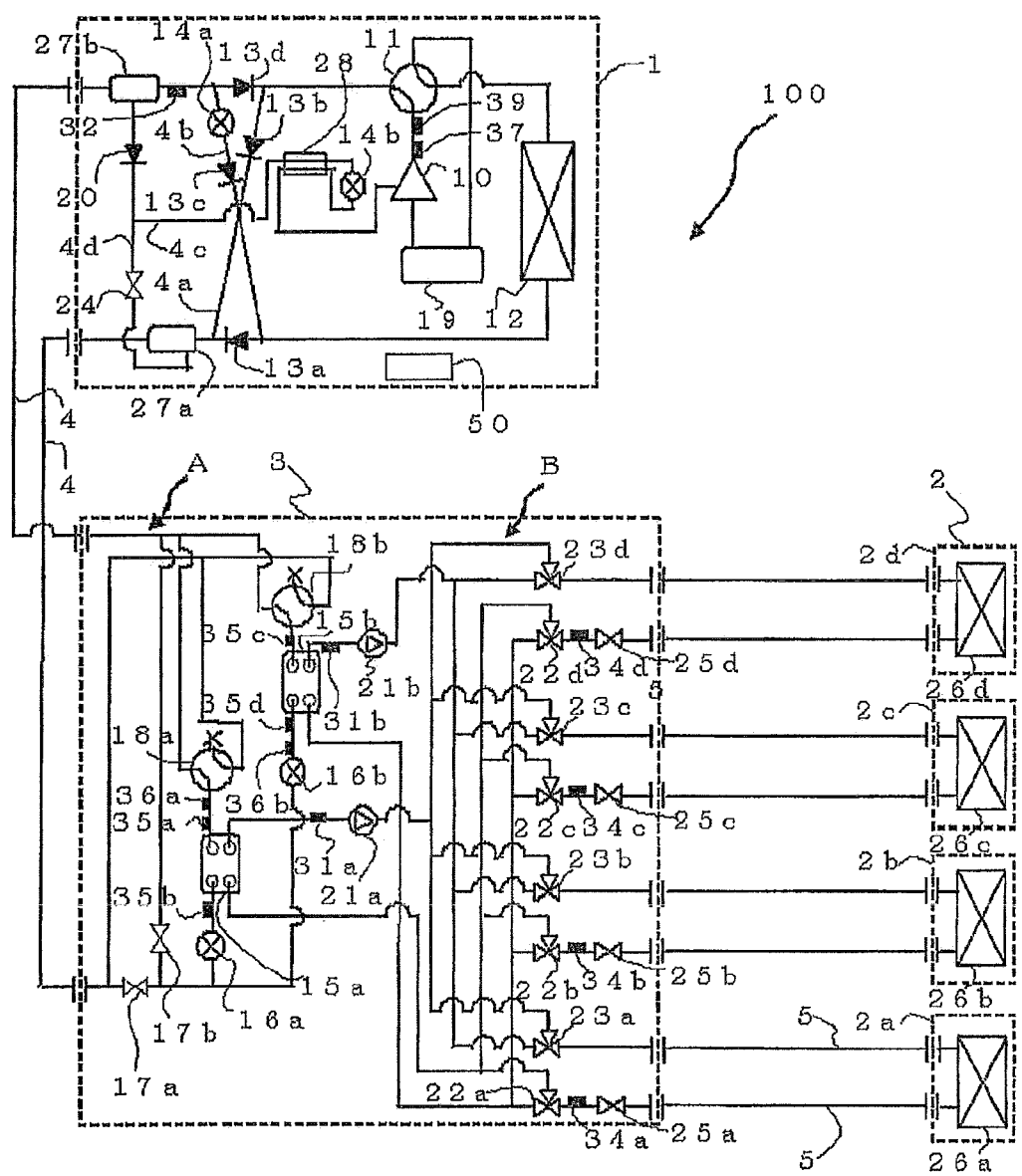
FIG. 15 is a schematic diagram illustrating an exemplary circuit configuration of an air-conditioning apparatus 100 according to Embodiment 2 of the present invention.

FIG. 15 is a schematic diagram illustrating an exemplary circuit configuration of an air-conditioning apparatus 100 according to Embodiment 2 of the present invention. Hereinafter, a configuration of the air-conditioning apparatus 100 will be described with reference to FIG. 15.

As illustrated in FIG. 15, a heat exchanger related to refrigerant 28 is installed on the injection pipe 4c joined to the aperture unit in the compression chamber of the compressor 10. From the joint of the injection pipe 4c connected to the branching pipe 4d, the heat exchanger related to refrigerant 28, the expansion device 14b, the heat exchanger related to refrigerant 28 again, and the aperture unit in the compression chamber of the compressor 10 are connected in that order by refrigerant pipes. In other words, it is configured such that, of the heat source side refrigerant to be injected, the heat source side refrigerant before flowing into the expansion device 14b and the heat source side refrigerant after passing through the expansion device 14b exchange heat in the heat exchanger related to refrigerant 28.

Hereinafter, the respective operating modes of the air-conditioning apparatus 100 according to Embodiment 2 will be described. Also, in the following description, it is assumed that the controller 50 installed in the outdoor unit 1 implements control of the air-conditioning apparatus 100 overall. Note that the flow of the heat medium in the air-conditioning apparatus 100 according to Embodiment 2 is similar to the respective operating modes of the air-conditioning apparatus 100 according to Embodiment 1.
(Cooling Only Operating Mode)

Figure 16:
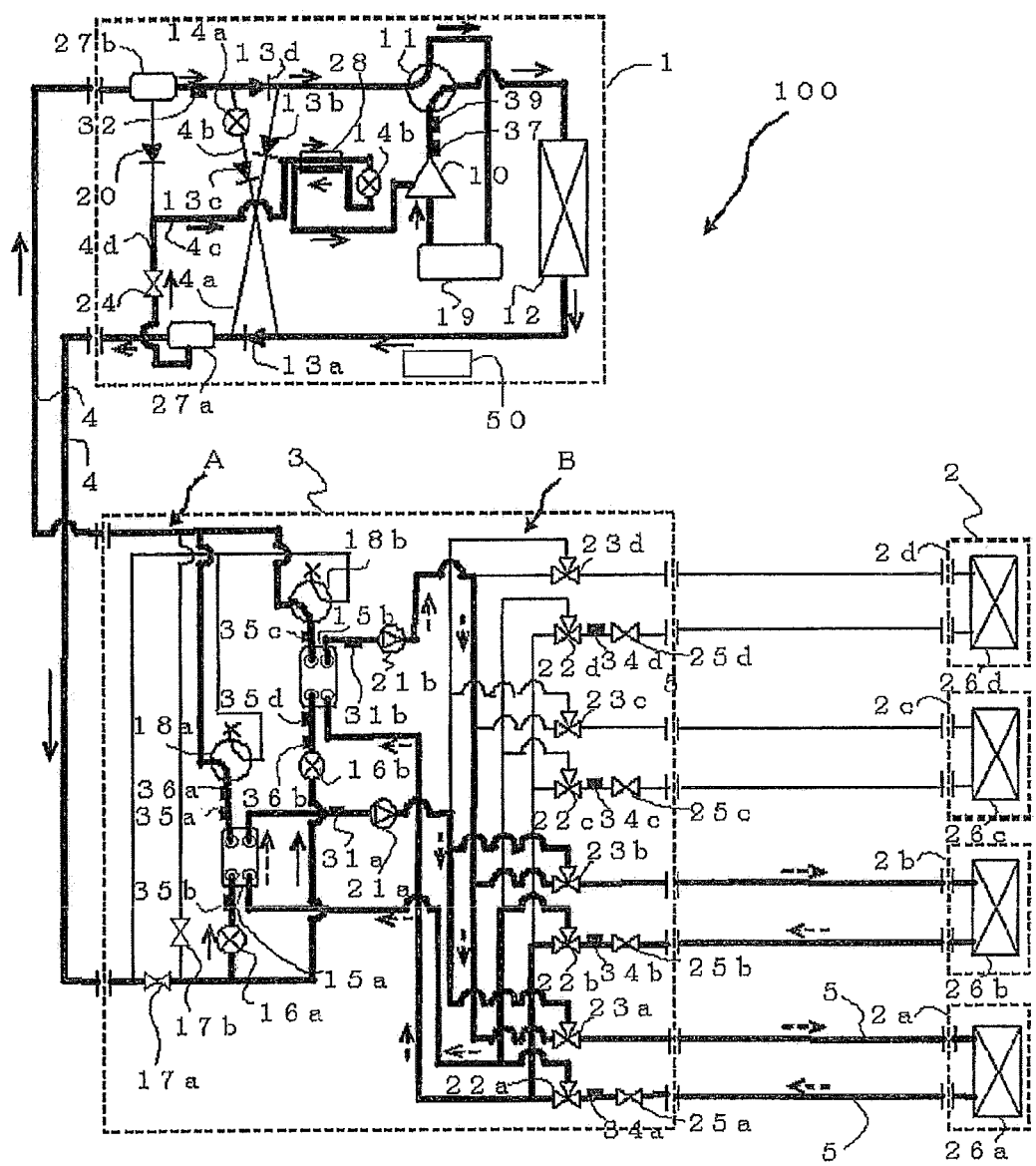
FIG. 16 is a refrigerant circuit diagram illustrating the flows of the heat source side refrigerant and the heat medium during a cooling-only operating mode of the air-conditioning apparatus 100 according to Embodiment 2 of the present invention.
Figure 17:
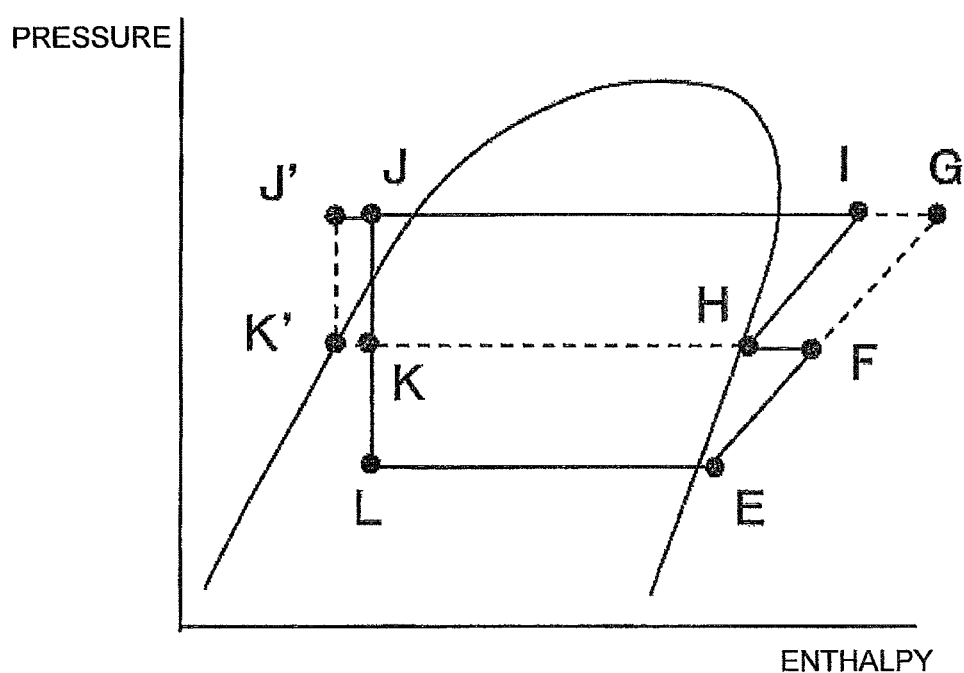
FIG. 17 is a refrigeration cycle p-h diagram during the cooling-only operating mode of the air-conditioning apparatus 100 according to Embodiment 2 of the present invention.

FIG. 16 is a refrigerant circuit diagram illustrating the flows of the heat source side refrigerant and the heat medium during a cooling only operating mode of the air-conditioning apparatus 100 according to Embodiment 2 of the present invention, while FIG. 17 is a refrigeration cycle p-h diagram during the cooling only operating mode of the same air-conditioning apparatus 100. The cooling only operating mode will be described with FIG. 16, taking as an example the case where a cooling load is generated by the use side heat exchanger 26a and the use side heat exchanger 26b only. Note that in FIG. 16, pipes indicated by the thick lines represent pipes carrying the heat source side refrigerant and the heat medium, while solid-line arrows represent the direction in which the heat source side refrigerant flows and broken-line arrows represent the direction in which the heat medium flows.

The flow of the heat source side refrigerant in the refrigerant circuit A will be described with reference to FIGS. 16 and 17. A low temperature and low pressure gaseous refrigerant (point E) is compressed by the compressor 10 and discharged as a high temperature and high pressure gaseous refrigerant (point I), which flows into the heat source side heat exchanger 12 via the first refrigerant flow switching device 11 and condenses to become a high pressure liquid refrigerant while radiating heat to the outside air. The high pressure liquid refrigerant (point J) flowing out of the heat source side heat exchanger 12 flows out of the outdoor unit 1 via the check valve 13a and the gas liquid separator 27a, and flows into the heat medium relay unit 3 via the refrigerant pipes 4.

In addition, a portion of the high pressure liquid refrigerant flowing into the gas liquid separator 27a is split by the branching pipe 4d, and after passing through the opening and closing device 24, flows into the injection pipe 4c, and flows into the heat exchanger related to refrigerant 28. The liquid refrigerant flowing into the heat exchanger related to refrigerant 28 is cooled by the heat source side refrigerant with lowered pressure and temperature that has been depressurized by the expansion device 14b (point J'). The liquid refrigerant flowing out of the heat exchanger related to refrigerant 28 is expanded and depressurized by the expansion device 14b to become a low temperature and medium pressure heat source side refrigerant (point K'), and once again flows into the heat exchanger related to refrigerant 28. The heat source side refrigerant once again flowing into the heat exchanger related to refrigerant 28 is heated by the liquid refrigerant yet to be depressurized by the expansion device 14b, and becomes a low temperature and medium pressure two-phase gas-liquid refrigerant with a somewhat raised temperature (point K). The two-phase gas-liquid refrigerant flowing out of the heat exchanger related to refrigerant 28 is injected into the compressor 10 from the aperture unit provided in the compression chamber of the compressor 10. At this point, a medium pressure gaseous refrigerant (point F) mixes with the low temperature and medium pressure two-phase gas-liquid refrigerant (point K) inside the compressor 10, the temperature of the heat source side refrigerant decreases (point H), and as a result, the discharge temperature of the gaseous refrigerant discharged from the compressor 10 decreases (point I). Additionally, the point G in FIG. 17 is the discharge temperature of the compressor 10 in the case where an injection operation is not carried out, which demonstrates that the injection operation lowers the discharge temperature from the point G to the point I.

After passing through the opening and closing device 17a, the high pressure liquid refrigerant flowing into the heat medium relay unit 3 splits and respectively flows into the expansion device 16a and the expansion device 16b, and expands and loses pressure to become a low temperature and low pressure two-phase gas-liquid refrigerant (point L). The two-phase gas-liquid refrigerant respectively flows into the heat exchanger related to heat medium 15a and the heat exchanger related to heat medium 15b which act as evaporators, and evaporates to become the low temperature and low pressure gaseous refrigerant (point E) while cooling the heat medium by absorbing heat from the heat medium circulating through the heat medium circuit B. The gaseous refrigerant flowing out of the heat exchanger related to heat medium 15a and the heat exchanger related to heat medium 15b converges via the second refrigerant flow switching device 18a and the second refrigerant flow switching device 18b, respectively, flows out of the heat medium relay unit 3, and once again flows into the outdoor unit 1 through the refrigerant pipes 4.

The gaseous refrigerant flowing into the outdoor unit 1 passes through the gas liquid separator 27b and the check valve 13d, and is once again suctioned into the compressor 10 via the first refrigerant flow switching device 11 and the accumulator 19.

When a two-phase gas-liquid refrigerant flows into the expansion device 14b, control may become unstable, but even if the subcooling is small at the outlet of the heat source side heat exchanger 12 due to factors such as a small enclosed quantity of the heat source side refrigerant, a liquid refrigerant can be reliably supplied to the expansion device 14b with the cooling of the two-phase gas-liquid refrigerant by the action of the heat exchanger related to refrigerant 28, thus enabling stable control.

(Heating Only Operating Mode)

Figure 18:
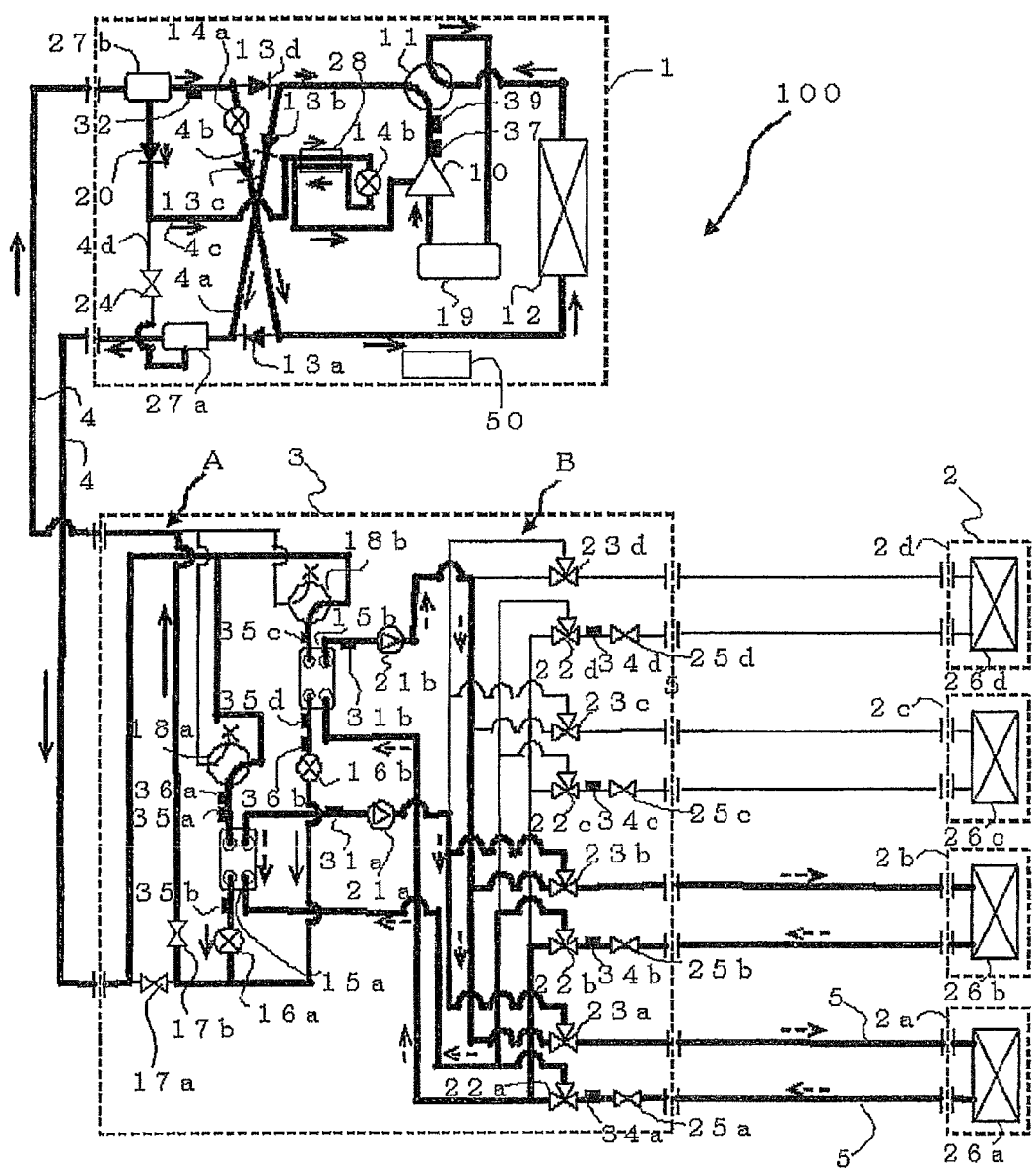
FIG. 18 is a refrigerant circuit diagram illustrating the flows of the heat source side refrigerant and the heat medium during a heating-only operating mode of the air-conditioning apparatus 100 according to Embodiment 2 of the present invention.
Figure 19:
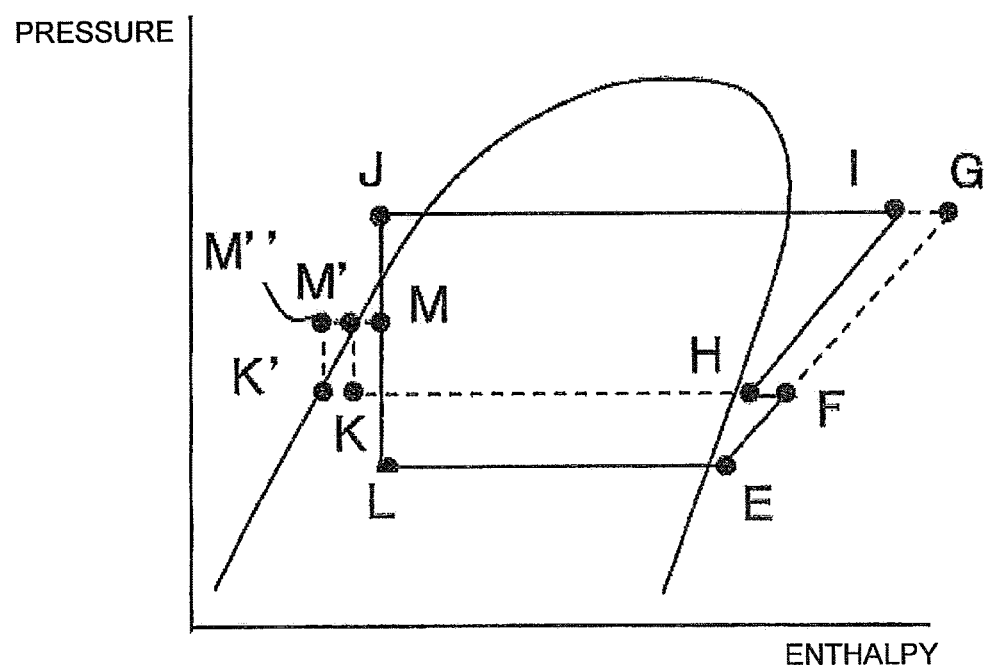
FIG. 19 is a refrigeration cycle p-h diagram during the heating-only operating mode of the air-conditioning apparatus 100 according to Embodiment 2 of the present invention.

FIG. 18 is a refrigerant circuit diagram illustrating the flows of the heat source side refrigerant and the heat medium during a heating only operating mode of the air-conditioning apparatus 100 according to Embodiment 2 of the present invention, while FIG. 19 is a refrigeration cycle p-h diagram during the heating only operating mode of the same air-conditioning apparatus 100. The heating only operating mode will be described with FIG. 18, taking as an example the case where a heating load is generated by the use side heat exchanger 26a and the use side heat exchanger 26b only. Note that in FIG. 18, pipes indicated by the thick lines represent pipes carrying the heat source side refrigerant and the heat medium, while solid-line arrows represent the direction in which the heat source side refrigerant flows and broken-line arrows represent the direction in which the heat medium flows.

The flow of the heat source side refrigerant in the refrigerant circuit A will be described with reference to FIGS. 18 and 19. A low temperature and low pressure gaseous refrigerant (point E) is compressed by the compressor 10 and discharged as a high temperature and high pressure gaseous refrigerant (point I), which flows out of the outdoor unit 1 via the first refrigerant flow switching device 11, the check valve 13b in the first connecting pipe 4a, and the gas liquid separator 27a. The high temperature and high pressure gaseous refrigerant flowing out of the outdoor unit 1 flows into the heat medium relay unit 3 via the refrigerant pipes 4.

The high temperature and high pressure gaseous refrigerant flowing into the heat medium relay unit 3 splits and respectively flows, via the second refrigerant flow switching device 18a and the second refrigerant flow switching device 18b, into the heat exchanger related to heat medium 15a and the heat exchanger related to heat medium 15b which act as condensers. The high temperature and high pressure gaseous refrigerant flowing into the heat exchanger related to heat medium 15a and the heat exchanger related to heat medium 15b condenses to become a high pressure liquid refrigerant (point J) while heating the heat medium by radiating heat to the heat medium circulating through the heat medium circuit B. The high pressure liquid refrigerant flowing out of the heat exchanger related to heat medium 15a and the heat exchanger related to heat medium 15b is respectively expanded and depressurized by the expansion device 16a and the expansion device 16b to become a medium temperature and medium pressure two-phase gas-liquid refrigerant or a liquid refrigerant (point M), which later converges, flows out of the heat medium relay unit 3 via the opening and closing device 17b, and once again flows into the outdoor unit 1 through the refrigerant pipes 4.

The medium temperature and medium pressure two-phase gas-liquid refrigerant or a liquid refrigerant flowing into the outdoor unit 1 flows into the second connecting pipe 4b via the gas liquid separator 27b, and is expanded and depressurized by the expansion device 14a to become a low temperature and low pressure two-phase gas-liquid refrigerant (point L). The low temperature and low pressure two-phase gas-liquid refrigerant flows into the heat source side heat exchanger 12 via the check valve 13c and evaporates to become the low temperature and low pressure gaseous refrigerant (point E) while absorbing heat from the outside air. The low temperature and low pressure gaseous refrigerant flowing out of the heat source side heat exchanger 12 is once again suctioned into the compressor 10 via the first refrigerant flow switching device 11 and the accumulator 19.

Also, in the medium temperature and medium pressure two-phase gas-liquid refrigerant flowing into the gas liquid separator 27b, liquid refrigerant is divided from the two-phase gas-liquid refrigerant, and the liquid refrigerant thus divided (saturated liquid refrigerant, point M') flows into the injection pipe 4c after passing through the backflow prevention device 20. The liquid refrigerant flowing into the injection pipe 4c flows into the heat exchanger related to refrigerant 28. The liquid refrigerant flowing into the heat exchanger related to refrigerant 28 is cooled by the heat source side refrigerant with lowered pressure and temperature that has been depressurized by the expansion device 14b (point M"). The liquid refrigerant flowing out of the heat exchanger related to refrigerant 28 is expanded and depressurized by the expansion device 14b to become a low temperature and medium pressure heat source side refrigerant (point K'), and once again flows into the heat exchanger related to refrigerant 28. The heat source side refrigerant once again flowing into the heat exchanger related to refrigerant 28 is heated by the liquid refrigerant yet to be depressurized by the expansion device 14b, increasing the quality (point K). The two-phase gas-liquid refrigerant flowing out of the heat exchanger related to refrigerant 28 is injected into the compressor 10 from the aperture unit provided in the compression chamber of the compressor 10. At this point, a medium pressure gaseous refrigerant (point F) mixes with the low temperature and medium pressure two-phase gas-liquid refrigerant (point K) inside the compressor 10, the temperature of the heat source side refrigerant decreases (point H), and as a result, the discharge temperature of the gaseous refrigerant discharged from the compressor 10 decreases (point I). Additionally, the point G in FIG. 19 is the discharge temperature of the compressor 10 in the case where an injection operation is not carried out, which demonstrates that the injection operation lowers the discharge temperature from the point G to the point I.

A refrigerant in a saturated liquid state is actually in a state containing small quantities of microscopic gaseous refrigerant, and with slight pressure loss becomes a two-phase gas-liquid refrigerant. When the two-phase gas-liquid refrigerant flows into the expansion device 14b, control may become unstable, but the liquid refrigerant can be reliably supplied to the expansion device 14b with the cooling of the two-phase gas-liquid refrigerant by the action of the heat exchanger related to refrigerant 28 as above, thus enabling stable control.

(Cooling Main Operating Mode)

Figure 20:
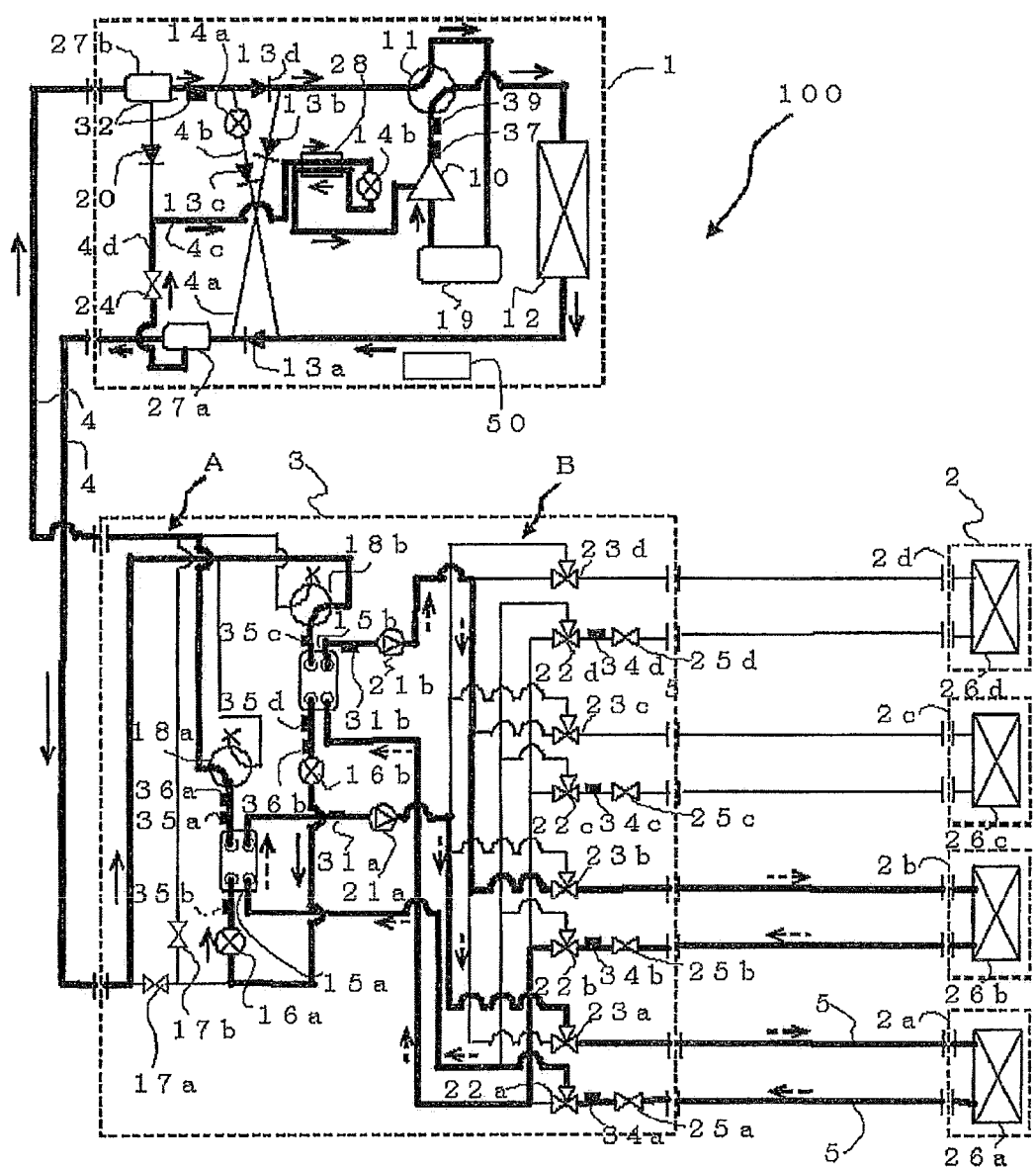
FIG. 20 is a refrigerant circuit diagram illustrating the flows of the heat source side refrigerant and the heat medium during a cooling main operating mode of the air-conditioning apparatus 100 according to Embodiment 2 of the present invention.
Figure 21:
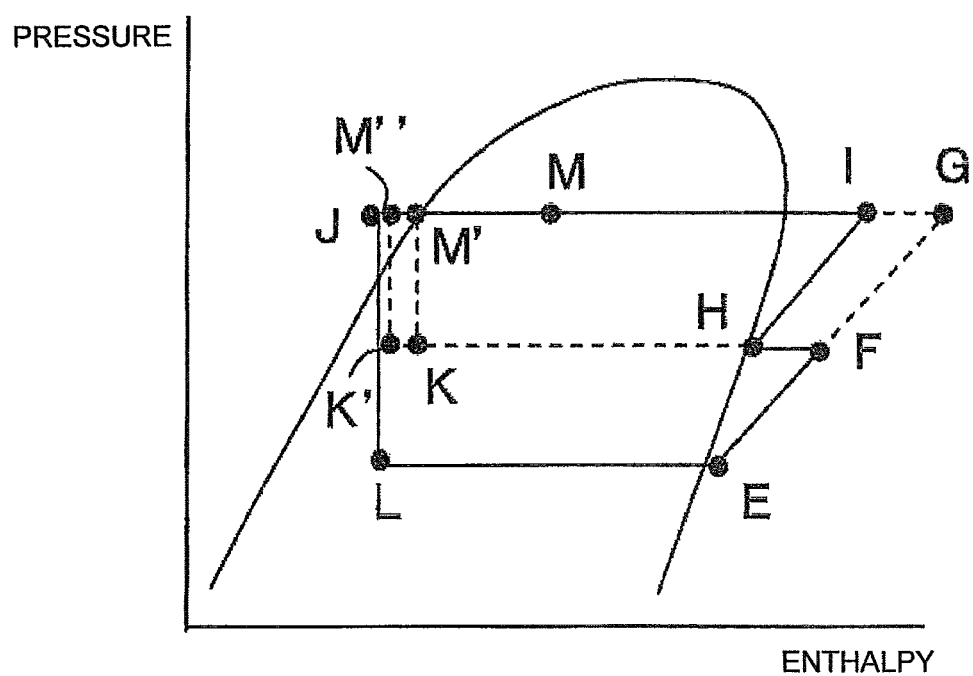
FIG. 21 is a refrigeration cycle p-h diagram during the cooling main operating mode of the air-conditioning apparatus 100 according to Embodiment 2 of the present invention.

FIG. 20 is a refrigerant circuit diagram illustrating the flows of the heat source side refrigerant and the heat medium during a cooling main operating mode of the air-conditioning apparatus 100 according to Embodiment 2 of the present invention, while FIG. 21 is a refrigeration cycle p-h diagram during the cooling main operating mode of the same air-conditioning apparatus 100. The cooling main operating mode will be described with FIG. 20, taking as an example the case where a cooling load is generated by the use side heat exchanger 26a, and a heating load is generated by the use side heat exchanger 26b. Note that in FIG. 20, pipes indicated by the thick lines represent pipes carrying the heat source side refrigerant and the heat medium, while solid-line arrows represent the direction in which the heat source side refrigerant flows and broken-line arrows represent the direction in which the heat medium flows.

The flow of the heat source side refrigerant in the refrigerant circuit A will be described with reference to FIGS. 20 and 21. A low temperature and low pressure gaseous refrigerant (point E) is compressed by the compressor 10 and discharged as a high temperature and high pressure gaseous refrigerant (point I), which flows into the heat source side heat exchanger 12 via the first refrigerant flow switching device 11 and condenses to become a high pressure two-phase gas-liquid refrigerant while radiating heat to the outside air. The high pressure two-phase gas-liquid refrigerant (point M) flowing out of the heat source side heat exchanger 12 flows out of the outdoor unit 1 via the check valve 13a and the gas liquid separator 27a, and flows into the heat medium relay unit 3 via the refrigerant pipes 4.

Also, in the high pressure two-phase gas-liquid refrigerant flowing into the gas liquid separator 27a, a liquid refrigerant is divided from the two-phase gas-liquid refrigerant, and the liquid refrigerant thus divided (saturated liquid refrigerant, point M') is split by the branching pipe 4d and flows into the injection pipe 4c after passing through the opening and closing device 24. The liquid refrigerant flowing into the injection pipe 4c flows into the heat exchanger related to refrigerant 28. The liquid refrigerant flowing into the heat exchanger related to refrigerant 28 is cooled by the heat source side refrigerant with lowered pressure and temperature that has been depressurized by the expansion device 14b (point M"). The liquid refrigerant flowing out of the heat exchanger related to refrigerant 28 is expanded and depressurized by the expansion device 14b to become a low temperature and medium pressure heat source side refrigerant (point K'), and once again flows into the heat exchanger related to refrigerant 28. The heat source side refrigerant once again flowing into the heat exchanger related to refrigerant 28 is heated by the liquid refrigerant yet to be depressurized by the expansion device 14b, increasing the quality (point K). The two-phase gas-liquid refrigerant flowing out of the heat exchanger related to refrigerant 28 is injected into the compressor 10 from the aperture unit provided in the compression chamber of the compressor 10. At this point, a medium pressure gaseous refrigerant (point F) mixes with the low temperature and medium pressure two-phase gas-liquid refrigerant (point K) inside the compressor 10, the temperature of the heat source side refrigerant decreases (point H), and as a result, the discharge temperature of the gaseous refrigerant discharged from the compressor 10 decreases (point I). Additionally, the point G in FIG. 21 is the discharge temperature of the compressor 10 in the case where an injection operation is not carried out, which demonstrates that the injection operation lowers the discharge temperature from the point G to the point I.

The two-phase gas-liquid refrigerant flowing into the heat medium relay unit 3 passes through the second refrigerant flow switching device 18b and flows into the heat exchanger related to heat medium 15b which acts as a condenser, and condenses to become a high pressure liquid refrigerant (point J) while heating the heat medium by radiating heat to the heat medium circulating through the heat medium circuit B. The liquid refrigerant flowing out of the heat exchanger related to heat medium 15b is expanded and depressurized by the expansion device 16b to become a low pressure and low pressure two-phase gas-liquid refrigerant (point L). The two-phase gas-liquid refrigerant passes through the expansion device 16a and flows into the heat exchanger related to heat medium 15a which acts as an evaporator, and evaporates to become the low temperature and low pressure gaseous refrigerant (point E) while cooling the heat medium by absorbing heat from the heat medium circulating through the heat medium circuit B. The gaseous refrigerant flowing out of the heat exchanger related to heat medium 15a flows out of the heat medium relay unit 3 via the second refrigerant flow switching device 18a, and once again flows into the outdoor unit 1 via the refrigerant pipes 4.

The gaseous refrigerant flowing into the outdoor unit 1 passes through the gas liquid separator 27b and the check valve 13d, and is once again suctioned into the compressor 10 via the first refrigerant flow switching device 11 and the accumulator 19.

A refrigerant in a saturated liquid state is actually in a state containing small quantities of microscopic gaseous refrigerant, and with slight pressure loss becomes a two-phase gas-liquid refrigerant. When the two-phase gas-liquid refrigerant flows into the expansion device 14b, control may become unstable, but the liquid refrigerant can be reliably supplied to the expansion device 14b with the cooling of the two-phase gas-liquid refrigerant by the action of the heat exchanger related to refrigerant 28 as above, thus enabling stable control.

(Heating Main Operating Mode)

Figure 22:
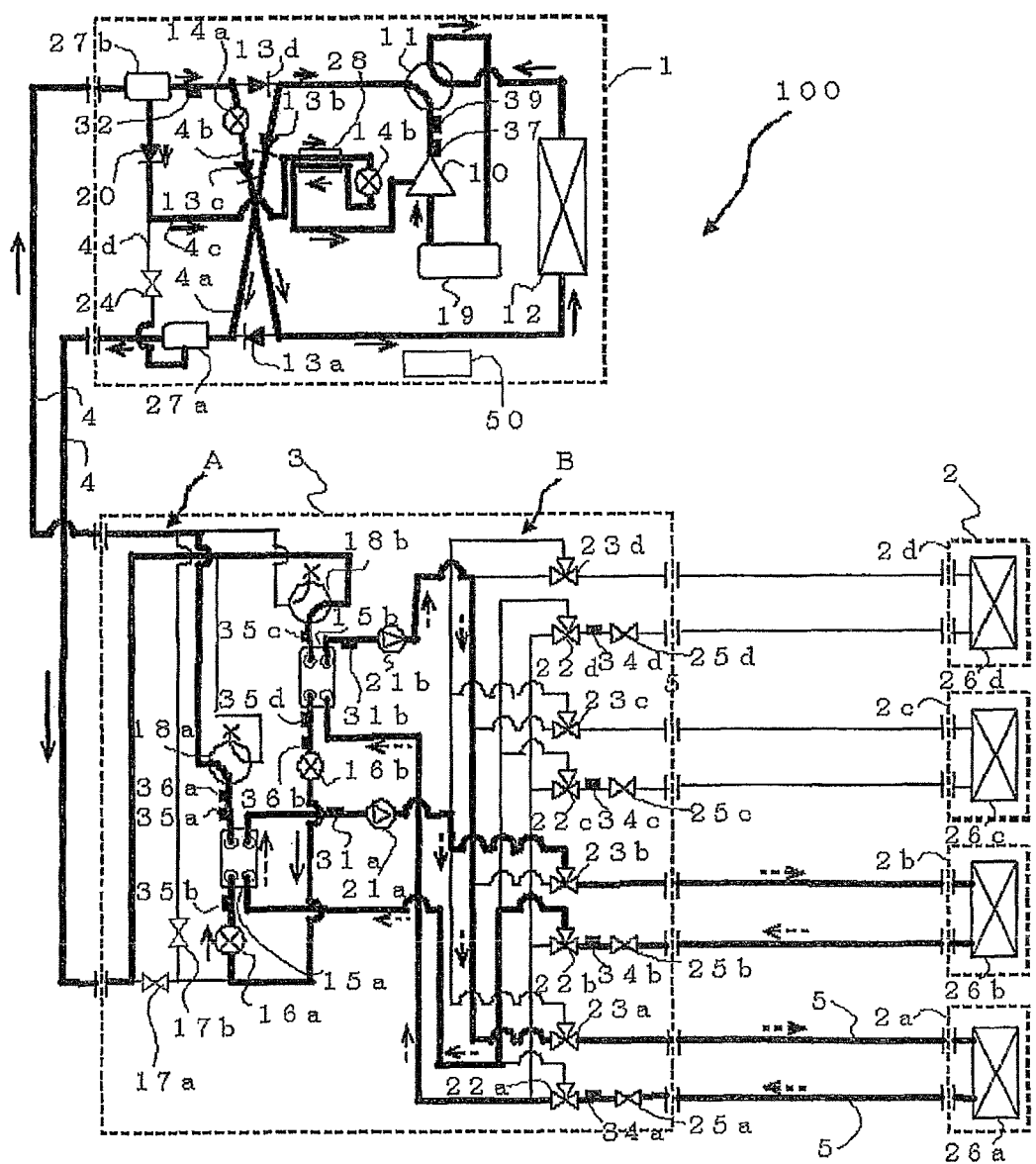
FIG. 22 is a refrigerant circuit diagram illustrating the flows of the heat source side refrigerant and the heat medium during a heating main operating mode of the air-conditioning apparatus 100 according to Embodiment 2 of the present invention.
Figure 23:
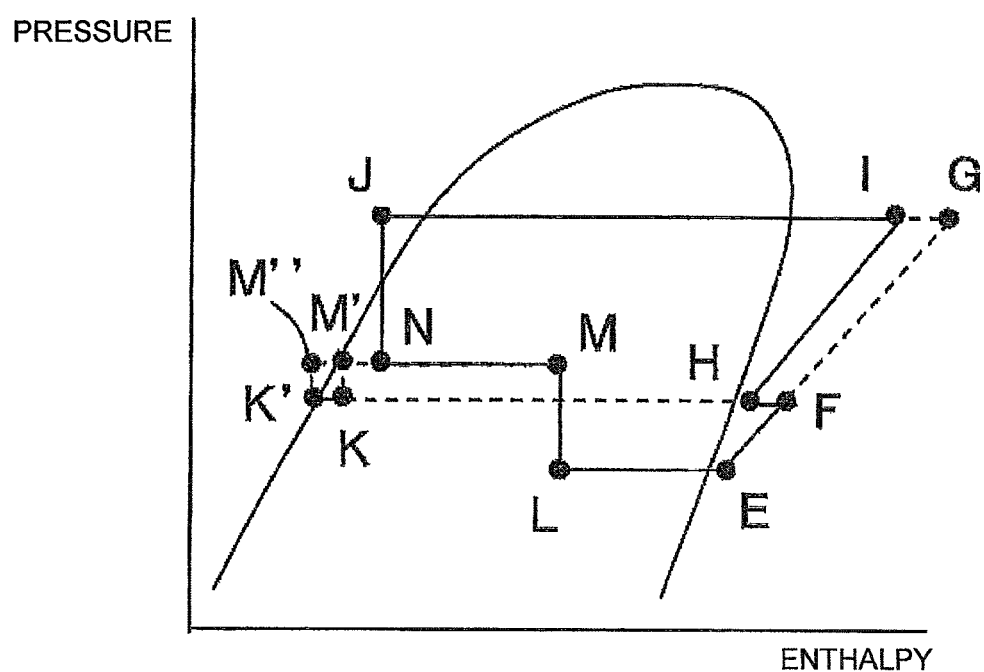
FIG. 23 is a refrigeration cycle p-h diagram during the heating main operating mode of the air-conditioning apparatus 100 according to Embodiment 2 of the present invention.

FIG. 22 is a refrigerant circuit diagram illustrating the flows of the heat source side refrigerant and the heat medium during a heating main operating mode of the air-conditioning apparatus 100 according to Embodiment 2 of the present invention, while FIG. 23 is a refrigeration cycle p-h diagram during the heating main operating mode of the same air-conditioning apparatus 100. The heating main operating mode will be described with FIG. 22, taking as an example the case where a heating load is generated by the use side heat exchanger 26a, and a cooling load is generated by the use side heat exchanger 26b. Note that in FIG. 22, pipes indicated by the thick lines represent pipes circulating the heat source side refrigerant and the heat medium, while solid-line arrows represent the direction in which the heat source side refrigerant flows and broken-line arrows represent the direction in which the heat medium flows.

The flow of the heat source side refrigerant in the refrigerant circuit A will be described with reference to FIGS. 22 and 23. A low temperature and low pressure gaseous refrigerant (point E) is compressed by the compressor 10 and discharged as a high temperature and high pressure gaseous refrigerant (point I), which flows out of the outdoor unit 1 via the first refrigerant flow switching device 11, the check valve 13b in the first connecting pipe 4a, and the gas liquid separator 27a. The high temperature and high pressure gaseous refrigerant flowing out of the outdoor unit 1 flows into the heat medium relay unit 3 via the refrigerant pipes 4.

The high temperature and high pressure gaseous refrigerant flowing into the heat medium relay unit 3 passes through the second refrigerant flow switching device 18b and flows into the heat exchanger related to heat medium 15b which acts as a condenser, and condenses to become a high pressure liquid refrigerant (point J) while heating the heat medium by radiating heat to the heat medium circulating through the heat medium circuit B. The liquid refrigerant flowing out of the heat exchanger related to heat medium 15b is expanded and depressurized by the expansion device 16b to become a medium pressure two-phase gas-liquid refrigerant (point N). The two-phase gas-liquid refrigerant passes through the expansion device 16a and flows into the heat exchanger related to heat medium 15a which acts as an evaporator, and its quality increases (point M) while cooling the heat medium by absorbing heat from the heat medium circulating through the heat medium circuit B. The two-phase gas-liquid refrigerant flowing out of the heat exchanger related to heat medium 15a flows out of the heat medium relay unit 3 via the second refrigerant flow switching device 18a, and once again flows into the outdoor unit 1 via the refrigerant pipes 4.

The two-phase gas-liquid refrigerant flowing into the outdoor unit 1 flows into the second connecting pipe 4b via the gas liquid separator 27b, and is expanded and depressurized by the expansion device 14a to become a low temperature and low pressure two-phase gas-liquid refrigerant (point L). The low temperature and low pressure two-phase gas-liquid refrigerant flows into the heat source side heat exchanger 12 via the check valve 13c and evaporates to become the low temperature and low pressure gaseous refrigerant (point E) while absorbing heat from the outside air. The low temperature and low pressure gaseous refrigerant flowing out of the heat source side heat exchanger 12 is once again suctioned into the compressor 10 via the first refrigerant flow switching device 11 and the accumulator 19.

Also, in a medium temperature and medium pressure two-phase gas-liquid refrigerant flowing into the gas liquid separator 27b, liquid refrigerant is divided from the two-phase gas-liquid refrigerant, and the liquid refrigerant thus divided (saturated liquid refrigerant, point M') flows into the injection pipe 4c after passing through the backflow prevention device 20. The liquid refrigerant flowing into the injection pipe 4c flows into the heat exchanger related to refrigerant 28, and is cooled by the heat source side refrigerant with lowered pressure and temperature that has been depressurized by the expansion device 14b (point M"). The liquid refrigerant flowing out of the heat exchanger related to refrigerant 28 is expanded and depressurized by the expansion device 14b to become a low temperature and medium pressure heat source side refrigerant (point K'), once again flows into the heat exchanger related to refrigerant 28, and is heated by the liquid refrigerant yet to be depressurized by the expansion device 14b, increasing the quality (point K). The two-phase gas-liquid refrigerant flowing out of the heat exchanger related to refrigerant 28 is injected into the compressor 10 from the aperture unit provided in the compression chamber of the compressor 10. At this point, a medium pressure gaseous refrigerant (point F) mixes with a low temperature and medium pressure two-phase gas-liquid refrigerant (point K) inside the compressor 10, the temperature of the heat source side refrigerant decreases (point H), and as a result, the discharge temperature of the gaseous refrigerant discharged from the compressor 10 decreases (point I). Additionally, the point G in FIG. 23 is the discharge temperature of the compressor 10 in the case where an injection operation is not carried out, which demonstrates that the injection operation lowers the discharge temperature from the point G to the point I.

A refrigerant in a saturated liquid state is actually in a state containing small quantities of microscopic gaseous refrigerant, and with slight pressure loss becomes a two-phase gas-liquid refrigerant. When the two-phase gas-liquid refrigerant flows into the expansion device 14b, control may become unstable, but the liquid refrigerant can be reliably supplied to the expansion device 14b with the cooling of the two-phase gas-liquid refrigerant by the action of the heat exchanger related to refrigerant 28 as above, thus enabling stable control.

Effects of Embodiment 2

A refrigerant in a saturated liquid state is actually in a state containing small quantities of microscopic gaseous refrigerant, and with slight pressure loss becomes a two-phase gas-liquid refrigerant. When the two-phase gas-liquid refrigerant flows into the expansion device 14b, control may become unstable. At this point, by reliably liquefying the heat source side refrigerant flowing into the injection pipe 4c by the cooling action of the heat exchanger related to refrigerant 28, the expansion device 14b can be reliably supplied with a liquid refrigerant, thus enabling stable control.

Embodiment 3

The points regarding the air-conditioning apparatus 100a according to Embodiment 3 that differ from the configuration and operation of the air-conditioning apparatus 100 according to Embodiment 1 will be mainly described.
(Configuration of Air-Conditioning Apparatus)

Figure 24:
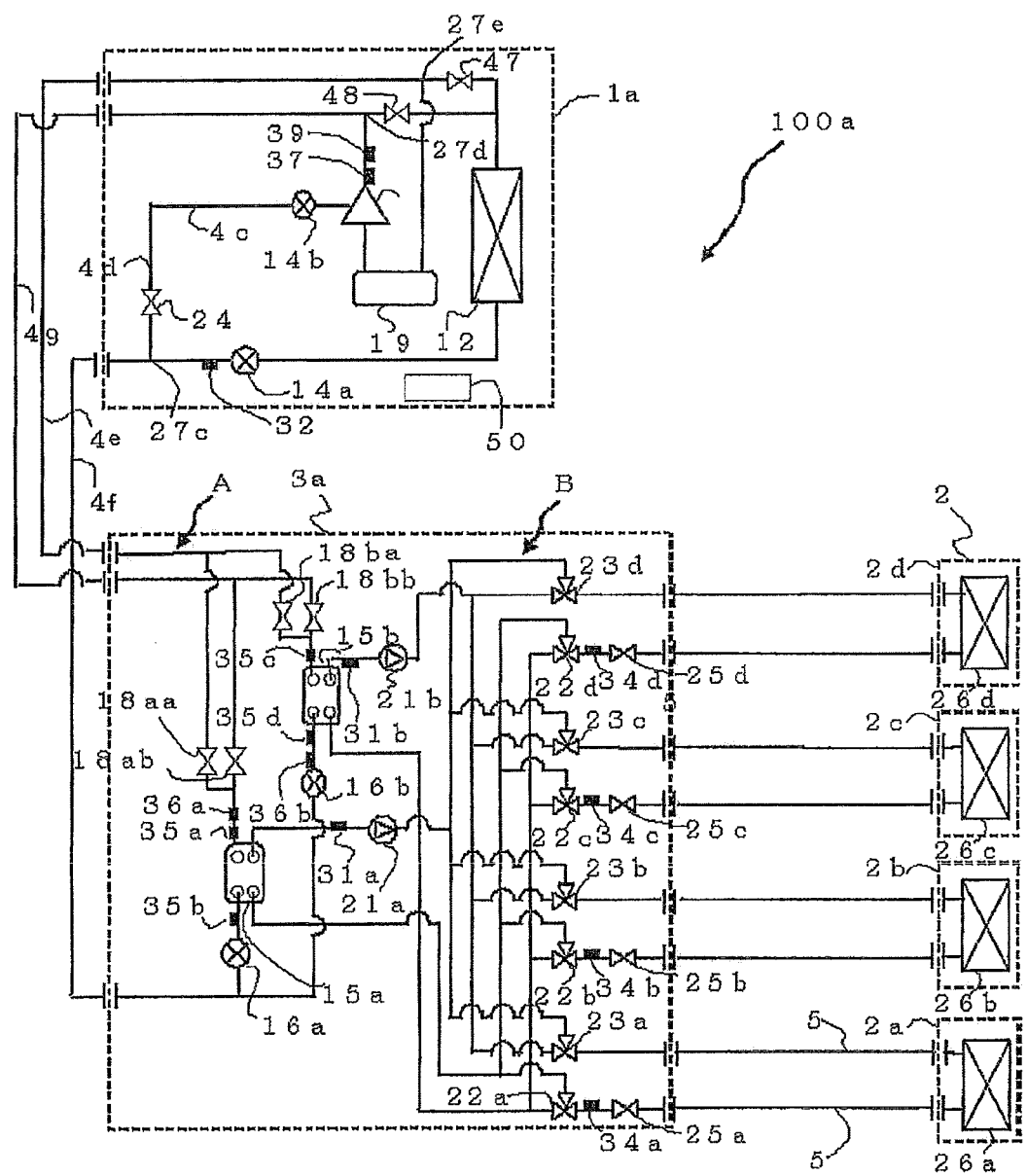
FIG. 24 is a schematic diagram illustrating an exemplary circuit configuration of an air-conditioning apparatus 100a according to Embodiment 3 of the present invention.

FIG. 24 is a schematic diagram illustrating an exemplary circuit configuration of an air-conditioning apparatus 100a according to Embodiment 3 of the present invention. Hereinafter, a configuration of the air-conditioning apparatus 100a will be described with reference to FIG. 24.

As illustrated in FIG. 24, the outdoor unit 1a and the heat medium relay unit 3a are connected by refrigerant pipes 4e to 4g that circulate the heat source side refrigerant.

In the outdoor unit 1a, a branching portion 27d, a first refrigerant flow switching device 48, a heat source side heat exchanger 12, an expansion device 14a, and a branching portion 27c are connected by refrigerant pipes in that order from the discharge side of the compressor 10. In addition, a first refrigerant flow switching device 47, a branching portion 27e, an accumulator 19, and the suction side of the compressor 10 are connected by refrigerant pipes in that order from the side of the heat source side heat exchanger 12 connected to the first refrigerant flow switching device 48. Furthermore, the branching pipe 4d branching from the branching portion 27c is connected to the injection pipe 4c, and this injection pipe 4c is connected to an aperture unit for injecting the heat source side refrigerant into the compressor 10. An opening and closing device 24 is installed in the branching pipe 4d, while an expansion device 14b is installed in the injection pipe 4c.

Note that the branching pipe 4d and the injection pipe 4c herein are continuously connected pipes without distinct differences, with the refrigerant pipe connected to the branching portion 27c being referred to as the branching pipe 4d, and the refrigerant pipe connected to the compression chamber of the compressor 10 being referred to as the injection pipe 4c.

The branching portion 27c is connected to a refrigerant pipe 4f by a refrigerant pipe, and is connected to a heat medium relay unit 3a by this refrigerant pipe 4f. The refrigerant pipe inside the heat medium relay unit 3a connected to this refrigerant pipe 4f branches, and is respectively connected to expansion devices 16a and 16b.

The branching portion 27d is connected to a refrigerant pipe 4g by a refrigerant pipe, and is connected to the heat medium relay unit 3a by this refrigerant pipe 4g. The refrigerant pipe inside the heat medium relay unit 3a connected to this refrigerant pipe 4g branches, and is respectively connected to second refrigerant flow switching devices 18ab and 18bb.

The branching portion 27e is connected to a refrigerant pipe 4e by a refrigerant pipe, and is connected to the heat medium relay unit 3a by this refrigerant pipe 4e. The refrigerant pipe inside the heat medium relay unit 3a connected to this refrigerant pipe 4e branches, and is respectively connected to second refrigerant flow switching devices 18aa and 18ba.

Additionally, the refrigerant pipes extending from the second refrigerant flow switching devices 18aa and 18ab converge to connect to the heat source side refrigerant flow path of the heat exchanger related to heat medium 15a. Also, the refrigerant pipes extending from the second refrigerant flow switching devices 18ba and 18bb converge to connect to the heat source side refrigerant flow path of the heat exchanger related to heat medium 15b.

Hereinafter, the respective operating modes of the air-conditioning apparatus 100a according to Embodiment 3 will be described. Also, in the following description, it is assumed that the controller 50 installed in the outdoor unit 1a implements control of the air-conditioning apparatus 100a overall. Note that the flow of the heat medium in the air-conditioning apparatus 100a according to Embodiment 3 is similar to the respective operating modes of the air-conditioning apparatus 100 according to Embodiment 1.

(Cooling Only Operating Mode)

Hereinafter, the cooling only operating mode will be described with reference to FIG. 24. In the cooling only operating mode, the controller 50 switches the first refrigerant flow switching device 47 to a closed state, and in addition, switches the first refrigerant flow switching device 48 to an open state. Also, the controller 50 switches the second refrigerant flow switching devices 18aa and 18ba to an open state, and in addition, switches the second refrigerant flow switching devices 18ab and 18bb to a closed state.

A low temperature and low pressure gaseous refrigerant is compressed by the compressor 10 to become a high temperature and high pressure gaseous refrigerant, and is discharged. All of the high temperature and high pressure gaseous refrigerant discharged from the compressor 10 flows into the heat source side heat exchanger 12 via the branching portion 27d and the first refrigerant flow switching device 48, and condenses to become high temperature and high pressure liquid refrigerant while radiating heat to the outside air. The high temperature and high pressure liquid refrigerant flowing out of the heat source side heat exchanger 12 is slightly depressurized by the expansion device 14a to become a medium pressure liquid refrigerant, which flows out of the outdoor unit 1a via the branching portion 27c, and flows into the heat medium relay unit 3a via the refrigerant pipe 4f.

The medium pressure liquid refrigerant flowing into the heat medium relay unit 3a splits and is respectively expanded and depressurized by the expansion device 16a and the expansion device 16b to become a low temperature and low pressure two-phase gas-liquid refrigerant. The two-phase gas-liquid refrigerant respectively flows into the heat exchanger related to heat medium 15a and the heat exchanger related to heat medium 15b which act as evaporators, and evaporates to become the low temperature and low pressure gaseous refrigerant while cooling the heat medium by absorbing heat from the heat medium circulating through the heat medium circuit B. The gaseous refrigerant flowing out of the heat exchanger related to heat medium 15a and the heat exchanger related to heat medium 15b converges via the second refrigerant flow switching device 18aa and the second refrigerant flow switching device 18ba, respectively, flows out of the heat medium relay unit 3a, and once again flows into the outdoor unit 1a through the refrigerant pipe 4e.

The gaseous refrigerant flowing into the outdoor unit 1a is once again suctioned into the compressor 10 via the branching portion 27e and the accumulator 19.

Note that in the outdoor unit 1a at this point, in the case where the discharge temperature of the compressor 10 is low and an injection into the compression chamber of the compressor 10 is not necessary, the opening and closing device 24 closes, and an injection operation into the compression chamber of the compressor 10 is not carried out. In addition, in the case where the discharge temperature of the compressor 10 is high and an injection into the compression chamber of the compressor 10 is necessary, the controller 50 puts the opening and closing device 24 in an open state to cause the medium pressure liquid refrigerant split at the branching portion 27c to flow into the branching pipe 4d and the injection pipe 4c, and adjusts the opening degree (aperture area) of the expansion device 14b to control the injection quantity into the compression chamber of the compressor 10. In so doing, the discharge temperature or the discharge degree of superheat of the compressor 10 is kept at a target temperature or within a target range.

Note that the above control of injection operation is likewise similar in the respective operating modes described later.

Note that although the case of a slightly depressurizing liquid refrigerant with the expansion device 14a to form a medium pressure liquid refrigerant in the cooling only operating mode is described as an example, the expansion device 14a may also be fully opened such that a high pressure liquid refrigerant flows out of the outdoor unit 1a as-is, with almost no depressurization. In this case, during the cooling only operating mode, a high pressure liquid refrigerant splits at the branching portion 27c, and injection into the compression chamber of the compressor 10 is carried out. When taking into account the switch from the cooling only operating mode to the cooling main operating mode or another operating mode in cases such as where the heat load changes, applying control to slightly depressurize the liquid refrigerant with the expansion device 14a to form a medium pressure liquid refrigerant allows for a smaller magnitude of change in each actuator before and after the operating change, and enables stable switching of the operating mode.

(Heating Only Operating Mode)

Next, the heating only operating mode will be described with reference to FIG. 24. In the heating only operating mode, the controller 50 switches the first refrigerant flow switching device 47 to an open state, and in addition, switches the first refrigerant flow switching device 48 to a closed state. Also, the controller 50 switches the second refrigerant flow switching devices 18aa and 18ba to a closed state, and in addition, switches the second refrigerant flow switching devices 18ab and 18bb to an open state.

A low temperature and low pressure gaseous refrigerant is compressed by the compressor 10 to become a high temperature and high pressure gaseous refrigerant, and is discharged. All of the high temperature and high pressure gaseous refrigerant discharged from the compressor 10 flows out of the outdoor unit 1a via the branching portion 27d. The high temperature and high pressure gaseous refrigerant flowing out of the outdoor unit 1a flows into the heat medium relay unit 3a via the refrigerant pipe 4g.

The high temperature and high pressure gaseous refrigerant flowing into the heat medium relay unit 3a splits and respectively flows, via the second refrigerant flow switching device 18ab and the second refrigerant flow switching device 18bb, into the heat exchanger related to heat medium 15a and the heat exchanger related to heat medium 15b which act as condensers. The high temperature and high pressure gaseous refrigerant flowing into the heat exchanger related to heat medium 15a and the heat exchanger related to heat medium 15b condenses to become a high pressure liquid refrigerant while heating the heat medium by radiating heat to the heat medium circulating through the heat medium circuit B. The high pressure liquid refrigerant flowing out of the heat exchanger related to heat medium 15a and the heat exchanger related to heat medium 15b is respectively expanded and depressurized by the expansion device 16a and the expansion device 16b to become a medium pressure liquid refrigerant. This medium pressure liquid refrigerant converges, flows out of the heat medium relay unit 3a, and once again flows into the outdoor unit 1a via the refrigerant pipe 4f.

The medium pressure liquid refrigerant flowing into the outdoor unit 1a passes through the branching portion 27c, is expanded and depressurized by the expansion device 14a to become a low temperature and low pressure two-phase gas-liquid refrigerant, and flows into the heat source side heat exchanger 12 which acts as an evaporator. The two-phase gas-liquid refrigerant flowing into the heat source side heat exchanger 12 evaporates while absorbing heat from the outside air, and becomes a low temperature and low pressure gaseous refrigerant. The low temperature and low pressure gaseous refrigerant flowing out of the heat source side heat exchanger 12 is once again suctioned into the compressor 10 via the first refrigerant flow switching device 47 and the accumulator 19.

(Cooling Main Operating Mode)

Next, the cooling main operating mode will be described with reference to FIG. 24. In the cooling main operating mode, the controller 50 switches the first refrigerant flow switching device 47 to a closed state, and in addition, switches the first refrigerant flow switching device 48 to an open state. Also, the controller 50 switches the second refrigerant flow switching devices 18aa and 18bb to an open state, and in addition, switches the second refrigerant flow switching devices 18ab and 18ba to a closed state.

A low temperature and low pressure gaseous refrigerant is compressed by the compressor 10 to become a high temperature and high pressure gaseous refrigerant, and is discharged. Part of the high temperature and high pressure gaseous refrigerant discharged from the compressor 10 splits at the branching portion 27d and flows into the heat source side heat exchanger 12 via the first refrigerant flow switching device 48, and condenses to become a high temperature and high pressure liquid refrigerant while radiating heat to the outside air. The high temperature and high pressure liquid refrigerant flowing out of the heat source side heat exchanger 12 is slightly depressurized by the expansion device 14a to become a medium pressure liquid refrigerant, which flows out of the outdoor unit 1a via the branching portion 27c, and flows into the heat medium relay unit 3a via the refrigerant pipe 4f.

Meanwhile, the remaining high temperature and high pressure gaseous refrigerant that was split at the branching portion 27d flows out of the outdoor unit 1a, and flows into the heat medium relay unit 3a via the refrigerant pipe 4g. The high temperature and high pressure gaseous refrigerant flowing into the heat medium relay unit 3a flows, via the second refrigerant flow switching device 18bb, into the heat exchanger related to heat medium 15b which acts as a condenser. The high temperature and high pressure gaseous refrigerant flowing into the heat exchanger related to heat medium 15b condenses to become a high pressure liquid refrigerant while heating the heat medium by radiating heat to the heat medium circulating through the heat medium circuit B. The high pressure liquid refrigerant flowing out of the heat exchanger related to heat medium 15b is slightly depressurized to a medium pressure by the expansion device 16b, and converges with the medium pressure liquid refrigerant flowing into the heat medium relay unit 3a. The converged medium pressure liquid refrigerant is expanded and depressurized by the expansion device 16a to become a low pressure two-phase gas-liquid refrigerant, and flows into the heat exchanger related to heat medium 15a which acts as an evaporator. The low pressure two-phase gas-liquid refrigerant flowing into the heat exchanger related to heat medium 15a evaporates to become the low temperature and low pressure gaseous refrigerant while cooling the heat medium by absorbing heat from the heat medium circulating through the heat medium circuit B. The low temperature and low pressure gaseous refrigerant flowing out of the heat exchanger related to heat medium 15a flows out of the heat medium relay unit 3a via the second refrigerant flow switching device 18aa, and once again flows into the outdoor unit 1a via the refrigerant pipe 4e.

The gaseous refrigerant flowing into the outdoor unit 1a is once again suctioned into the compressor 10 via the branching portion 27e and the accumulator 19.

(Heating Main Operating Mode)

Next, the heating main operating mode will be described with reference to FIG. 24. In the heating main operating mode, the controller 50 switches the first refrigerant flow switching device 47 to an open state, and in addition, switches the first refrigerant flow switching device 48 to a closed state. Also, the controller 50 switches the second refrigerant flow switching devices 18aa and 18bb to an open state, and in addition, switches the second refrigerant flow switching devices 18ab and 18ba to a closed state.

A low temperature and low pressure gaseous refrigerant is compressed by the compressor 10 to become high temperature and high pressure gaseous refrigerant, and is discharged. All of the high temperature and high pressure gaseous refrigerant discharged from the compressor 10 flows out of the outdoor unit 1a via the branching portion 27d. The high temperature and high pressure gaseous refrigerant flowing out of the outdoor unit 1a flows into the heat medium relay unit 3a via the refrigerant pipe 4g.

The high temperature and high pressure gaseous refrigerant flowing into the heat medium relay unit 3a flows, via the second refrigerant flow switching device 18bb, into the heat exchanger related to heat medium 15b which acts as a condenser. The high temperature and high pressure gaseous refrigerant flowing into the heat exchanger related to heat medium 15b condenses to become a high pressure liquid refrigerant while heating the heat medium by radiating heat to the heat medium circulating through the heat medium circuit B. The high pressure liquid refrigerant flowing out of the heat exchanger related to heat medium 15b is slightly depressurized by the expansion device 16b to become medium pressure liquid refrigerant. This medium pressure liquid refrigerant splits, one part of which is expanded and depressurized by the expansion device 16a to become the low temperature and low pressure two-phase gas-liquid refrigerant, and flows into the heat exchanger related to heat medium 15a which acts as an evaporator. The low temperature and low pressure two-phase gas-liquid refrigerant flowing into the heat exchanger related to heat medium 15a evaporates to become the low temperature and low pressure gaseous refrigerant while cooling the heat medium by absorbing heat from the heat medium circulating through the heat medium circuit B. The low temperature and low pressure gaseous refrigerant flowing out of the heat exchanger related to heat medium 15a flows out of the heat medium relay unit 3a via the second refrigerant flow switching device 18aa, and once again flows into the outdoor unit 1a via the refrigerant pipe 4e.

Meanwhile, after passing through the expansion device 16b, the other part of the medium pressure liquid refrigerant that split flows out of the heat medium relay unit 3a, and flows into the outdoor unit 1a via the refrigerant pipe 4f. The medium pressure liquid refrigerant flowing into the outdoor unit 1a passes through the branching portion 27c, is expanded and depressurized by the expansion device 14a to become the low temperature and low pressure two-phase gas-liquid refrigerant, and flows into the heat source side heat exchanger 12 which acts as an evaporator. The two-phase gas-liquid refrigerant flowing into the heat source side heat exchanger 12 evaporates while absorbing heat from the outside air, and becomes the low temperature and low pressure gaseous refrigerant. At the branching portion 27e, the low temperature and low pressure gaseous refrigerant flowing out of the heat source side heat exchanger 12 converges with the low temperature and low pressure gaseous refrigerant flowing into the outdoor unit 1a via the refrigerant pipe 4e. The converged low temperature and low pressure gaseous refrigerant is once again suctioned into the compressor 10 via the accumulator 19.

Effects of Embodiment 3

With the configuration of the air-conditioning apparatus 100a according to Embodiment 3 as above, it is likewise possible to obtain effects similar to the air-conditioning apparatus 100 according to Embodiment 1 described earlier.

Embodiment 4

The points regarding the air-conditioning apparatus 100b according to Embodiment 4 that differ from the configuration and operation of the air-conditioning apparatus 100 according to Embodiment 1 will be mainly described.

In the air-conditioning apparatus 100 according to Embodiment 1, the compressor 10, the first refrigerant flow switching device 11, the heat source side heat exchanger 12, the expansion device 14a, the expansion device 14b, the backflow prevention device 20, and the opening and closing device 24 are housed in the outdoor unit 1. Also, the use side heat exchangers 26 are housed in the indoor units 2, while the heat exchangers related to heat medium 15 and the expansion devices 16 are housed in the heat medium relay unit 3. Also, the outdoor unit 1 and the heat medium relay unit 3 are connected by a pair of refrigerant pipes, and the heat source side refrigerant is circulated between the outdoor unit 1 and the heat medium relay unit 3. In addition, the indoor units 2 and the heat medium relay unit 3 are respectively connected by pairs of refrigerant pipes, and the heat medium is circulated between the indoor units 2 and the heat medium relay unit 3, with the heat source side refrigerant and the heat medium exchanging heat in the heat exchangers related to heat medium 15. However, the configuration is not limited to this system. Hereinafter, an air-conditioning apparatus 100b according to Embodiment 4 will be described.

(Configuration of Air-Conditioning Apparatus 100b)

Figure 25:
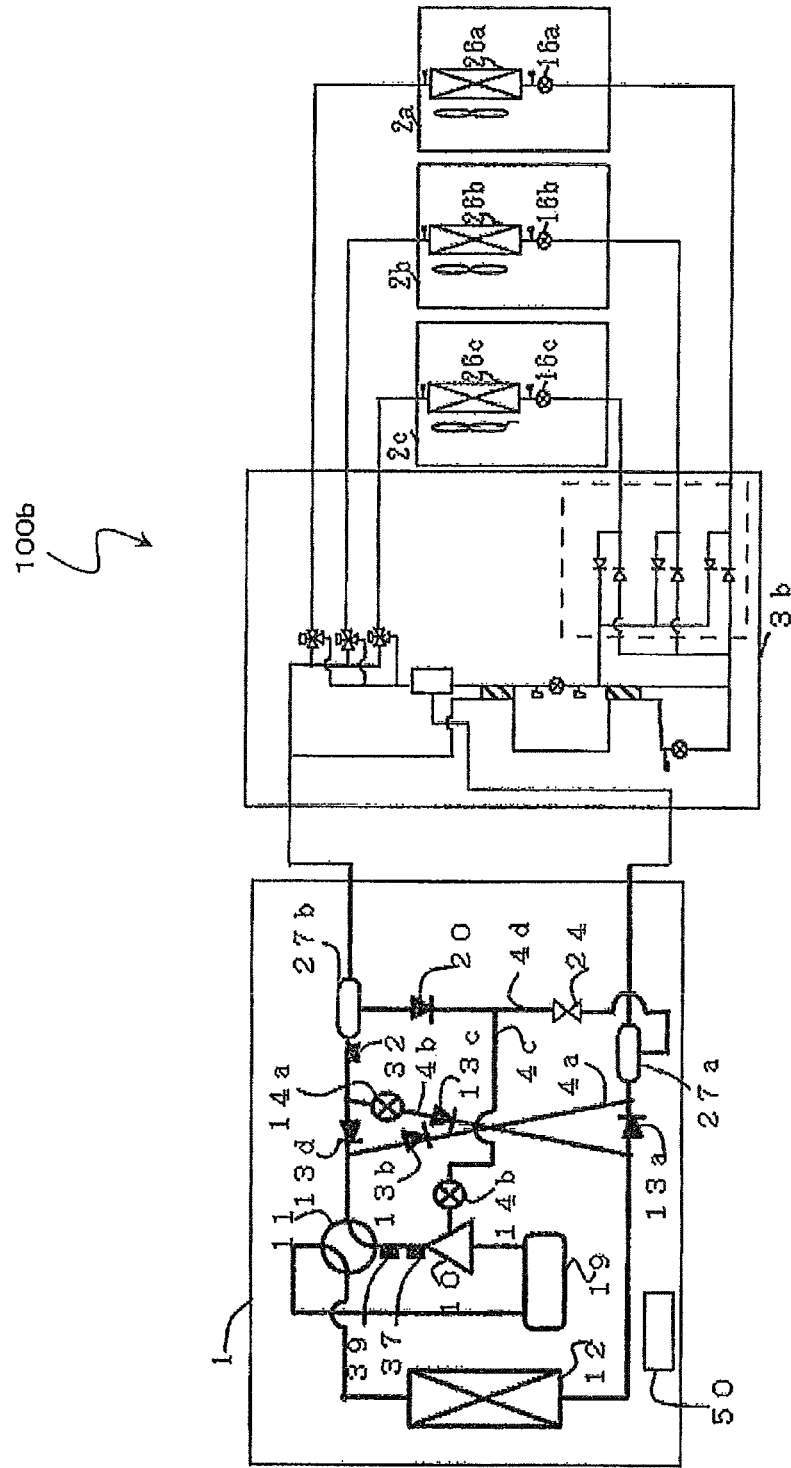
FIG. 25 is a schematic diagram illustrating an exemplary circuit configuration of an air-conditioning apparatus 100b according to Embodiment 4 of the present invention.

FIG. 25 is a schematic diagram illustrating an exemplary circuit configuration of an air-conditioning apparatus 100b according to Embodiment 4 of the present invention.

As illustrated in FIG. 25, the compressor 10, the first refrigerant flow switching device 11, the heat source side heat exchanger 12, the expansion device 14a, the expansion device 14b, the backflow prevention device 20, and the opening and closing device 24 are housed in the outdoor unit 1. Also, the use side heat exchangers 26, which serves as evaporators or condensers causing the air in the air-conditioned space to exchange heat with the refrigerant, and the expansion devices 16 are housed in the indoor units 2. In addition, there is provided a relay unit 3b, which is a relay unit formed separately from the outdoor unit 1 and the indoor units 2, with the outdoor unit 1 and the relay unit 3b connected by a pair of refrigerant pipes, while the indoor units 2 and the relay unit 3b are connected by a pair of refrigerant pipes. In so doing, it is possible to configure a direct expansion system able to circulate refrigerant between the outdoor unit 1 and the indoor units 2 via the relay unit 3b, and carry out a cooling only operating mode, a heating only operating mode, a cooling main operating mode, and a heating main operating mode. In this case, effects similar to Embodiment 1 are likewise achieved.

REFERENCE SIGNS LIST 1, 1a: outdoor unit, 2, 2a to 2d: indoor unit, 3, 3a: heat medium relay unit, 3b: relay unit, 4: refrigerant pipe, 4a: first connecting pipe, 4b: second connecting pipe, 4c: injection pipe, 4d: branching pipe, 4e to 4g: refrigerant pipe, 5: heat medium pipe, 6: outdoor space, 7: indoor space, 8: space, 9: building, 10: compressor, 11: first refrigerant flow switching device, 12: heat source side heat exchanger, 13a to 13d: check valve, 14a, 14b: expansion device, 15, 15a, 15b: heat exchanger related to heat medium, 16, 16a, 16b, 16c:

expansion device, 17, 17*a*, 17*b*: opening and closing device, 18, 18*a*, 18*b*, 18*aa*, 18*ab*, 18*ba*, 18*bb*: second refrigerant flow switching device, 19: accumulator, 20: backflow prevention device, 21, 21*a*, 21*b*: pump, 22, 22*a* to 22*d*: first heat medium flow switching device, 23, 23*a* to 23*d*: second heat medium flow switching device, 24: opening and closing device, 25, 25*a* to 25*d*: heat medium flow control device, 26, 26*a* to 26*d*: use side heat exchanger, 27*a*, 27*b*: gas liquid separator, 27*c* to 27*e*: branching portion, 28: heat exchanger related to refrigerant, 31, 31*a*, 31*b*: heat exchanger related to heat medium outlet temperature detecting device, 32: medium pressure detecting device, 34, 34*a*, 34*b*, 34*c*, 34*d*: use side heat exchanger outlet temperature detecting device, 35, 35*a*, 35*b*, 35*c*, 35*d*: heat exchanger related to heat medium refrigerant temperature detecting device, 36, 36*a*, 36*b*: heat exchanger related to heat medium refrigerant pressure detecting device, 37: discharge refrigerant temperature detecting device, 39: high pressure detecting device, 41: inflow pipe, 42: outflow pipe, 43: expansion portion, 44: valve body, 45: motor, 46: mixing device, 47, 48: first refrigerant flow switching device, 50: controller, 100, 100*a*, 100*b*: air-conditioning apparatus, A: refrigerant circuit, B: heat medium circuit.

The invention claimed is:

1. An air-conditioning apparatus comprising: a refrigeration cycle in which a compressor that compresses a low pressure refrigerant and discharges a high pressure refrigerant, a first heat exchanger in which the refrigerant exchanges heat, first expansion devices that depressurize the refrigerant, and one or more second heat exchangers in which the refrigerant exchanges heat, are connected by refrigerant pipes; an injection pipe that circulates the refrigerant split off from a refrigerant flow path through which the refrigerant that has radiated in the first heat exchanger or the one or more second heat exchangers flows; a first refrigerant branching portion that divides the refrigerant from the refrigerant flow path when the refrigerant is flowing from the first heat exchanger to the first expansion devices; a second refrigerant branching portion that divides the refrigerant from the refrigerant flow path when the refrigerant is flowing from the first expansion devices to the first heat exchanger; a branching pipe that connects the first refrigerant branching portion and the second refrigerant branching portion, with the injection pipe connected thereto; a refrigerant flow switching device that switches a refrigerant flow path between when the first heat exchanger functions as a condenser and the high pressure refrigerant passes through the first heat exchanger, and when the first heat exchanger functions as an evaporator and the low pressure refrigerant passes through the first heat exchanger; and a third expansion device, installed at a position on the refrigeration cycle, that generates a medium pressure less than the high pressure existing inside the condenser and greater than the low pressure on a suction side of the compressor when the first heat exchanger functions as an evaporator; a first mixing device, installed on an inlet-side flow path of an expansion portion of the third expansion device and in a vicinity of the expansion portion, that mixes a gaseous refrigerant and a liquid refrigerant in a two-phase gas-liquid refrigerant; and a controller that carries out driving control of the compressor, wherein the injection pipe is connected to the compressor via a second expansion device that depressurizes the refrigerant flowing thereinto, a distance between the expansion portion of the third expansion device and the first mixing device is less than or equal to six times an inner diameter of a pipe for the inlet-side flow path of the expansion portion of the third expansion device, the controller is configured to control an injection quantity of refrigerant introduced into the compressor from the injection pipe by controlling an opening degree of the second expansion device, and the controller is further configured to introduce the refrigerant from the high-pressure side into the compressor when the first heat exchanger functions as a condenser, and introduces the refrigerant from the medium-pressure side into the compressor when the first heat exchanger functions as an evaporator.

2. The air-conditioning apparatus of claim 1, wherein the third expansion device is disposed at a position such that when the first heat exchanger functions as a condenser, the refrigerant circulates between the first heat exchanger and the one or more second heat exchangers without passing through the third expansion device, and when the first heat exchanger functions as an evaporator, the refrigerant passes through the third expansion device from the one or more second heat exchangers and flows into the first heat exchanger.

3. The air-conditioning apparatus of claim 1, further comprising:
a first conducting device installed between the first refrigerant branching portion and a joint between the branching pipe and the injection pipe; and
a second conducting device installed between the second refrigerant branching portion and the joint.

4. The air-conditioning apparatus of claim 3, wherein
the first conducting device is an opening and closing device that opens and closes the refrigerant flow path in the branching pipe, and
the second conducting device is a backflow prevention device that conducts the refrigerant only in the direction flowing from the first refrigerant branching portion to the injection pipe.

5. The air-conditioning apparatus of claim 3, wherein
the first refrigerant branching portion is a gas liquid separator that conducts the refrigerant mainly in a liquid state to the branching pipe.

6. The air-conditioning apparatus of claim 5, wherein
the gas liquid separator is an elongated gas liquid separator in which the length in the horizontal direction, or the direction which the refrigerant flows in or flows out, is longer than the length in the direction perpendicular to the direction in which the refrigerant flows,
an inlet pipe that causes the refrigerant to flow into the elongated gas liquid separator, and an outlet pipe that causes most of the inflowing refrigerant to flow out, are connected in the horizontal direction of the elongated gas liquid separator, and
the branching pipe which externally removes part of the liquid-state refrigerant from inside the elongated gas liquid separator is connected to the elongated gas liquid separator at a position lower than the center of the elongated gas liquid separator.

7. The air-conditioning apparatus of claim 3, wherein
the second refrigerant branching portion is a gas liquid separator that conducts the refrigerant mainly in the liquid state to the branching pipe.

8. The air-conditioning apparatus of claim 3, further comprising:
a discharge refrigerant temperature detecting device that detects a temperature of a discharge refrigerant from the compressor;
wherein the second expansion device has a continuously variable injection point, and the controller, by adjusting an opening degree of the injection point of the second expansion device, applies control such that the temperature of the discharge refrigerant detected by the discharge refrigerant temperature detecting device approaches a target temperature, does not exceed the target temperature, or stays within a range of the target temperature.

9. The air-conditioning apparatus of claim 3, further comprising:
a discharge refrigerant temperature detecting device that detects the temperature of the discharge refrigerant from the compressor; and
a high pressure detecting device that detects a pressure of the discharge refrigerant from the compressor;
wherein the second expansion device has a continuously variable injection point, and
the controller, by adjusting an opening degree of the injection point of the second expansion device, applies control such that a discharge degree of superheat computed from the discharge refrigerant detected by the discharge refrigerant temperature detecting device and the high pressure detected by the high pressure detecting device approaches a target superheat, does not exceed the target superheat, or stays within a range of the target superheat.

10. The air-conditioning apparatus of claim 3, further comprising:
a medium pressure detecting device, installed on the refrigerant flow path between the second refrigerant branching portion and the third expansion device, that detects the medium pressure or a saturation temperature of the medium pressure;
wherein the third expansion device has a continuously variable injection point, and
when the first heat exchanger functions as an evaporator, the controller, by adjusting an opening degree of the injection point of the third expansion device, applies control such that the medium pressure or the saturation temperature of the medium pressure detected by the medium pressure detecting device approaches a target value or stays within a range of the target value.

11. The air-conditioning apparatus of claim 3, further comprising:
a heat exchanger related to refrigerant, installed on the injection pipe between the second expansion device and the joint between the branching pipe and the injection pipe, that exchanges heat between the refrigerant flowing in from the joint and the refrigerant flowing in from the second expansion device.

12. The air-conditioning apparatus of claim 3, further comprising:
an outdoor unit housing the compressor, the refrigerant flow switching device, the first heat exchanger, the second expansion device, the injection pipe, the branching pipe, the first refrigerant branching portion, the second refrigerant branching portion, the first conducting device, and the second conducting device;
indoor units housing use side heat exchangers that exchange heat with air in an air-conditioned space, and installed at positions enabling air conditioning of the air-conditioned space; and
a heat medium relay unit housing the one or more second heat exchangers and the first expansion devices, configured separately from the outdoor unit and the indoor units;
wherein the outdoor unit and the heat medium relay unit are connected by two refrigerant pipes that circulate the refrigerant,
the heat medium relay unit and the indoor units are connected by two heat medium pipes that circulate a heat medium,
the one or more second heat exchangers exchange heat between the refrigerant and the heat medium, and
the use side heat exchangers exchange heat between the air in the air-conditioned space and the heat medium.

13. The air-conditioning apparatus of claim 12, wherein the controller
includes a cooling only operating mode that causes the first heat exchanger to operate as a condenser and causes all of the second heat exchangers to operate as evaporators, such that one of the two refrigerant pipes carries the flow of a high pressure liquid refrigerant, while other thereof carries the flow of a low pressure gaseous refrigerant,
includes a heating only operating mode that causes the first heat exchanger to operate as an evaporator and causes all of the second heat exchangers to operate as condensers, such that one of the two refrigerant pipes carries the flow of a high pressure gaseous refrigerant, while other thereof carries the flow of a medium pressure two-phase gas-liquid refrigerant or a medium pressure liquid refrigerant, and
is able to selectively implement the cooling only operating mode and the heating only operating mode.

14. The air-conditioning apparatus of claim 12, wherein the controller
includes a cooling main operating mode that causes the first heat exchanger to operate as a condenser and causes some of the second heat exchangers to operate as evaporators while causing others thereof to operate as condensers, such that one of the two refrigerant pipes carries a flow of a high pressure two-phase gas-liquid refrigerant, while other thereof carries a flow of the low pressure gaseous refrigerant,
includes a heating main operating mode that causes the first heat exchanger to operate as an evaporator and causes some of the second heat exchangers to operate as condensers while causing others thereof to operate as evaporators, such that one of the two refrigerant pipes carries a flow of the high pressure gaseous refrigerant, while other thereof carries a flow of the medium pressure two-phase gas-liquid refrigerant, and
is able to selectively implement the cooling main operating mode and the heating main operating mode.

15. The air-conditioning apparatus of claim 3, further comprising:
an outdoor unit housing the compressor, the refrigerant flow switching device, the first heat exchanger, the second expansion device, the injection pipe, the branching pipe, the first refrigerant branching portion, the second refrigerant branching portion, the first conducting device, and the second conducting device;
indoor units housing the one or more second heat exchangers and the first expansion devices, and installed at positions enabling air conditioning of the air-conditioned space; and
a relay unit configured separately from the outdoor unit and the indoor units;
wherein the outdoor unit and the relay unit, and the relay unit and the indoor units, are respectively connected by two refrigerant pipes, the refrigerant circulates between the outdoor unit and the indoor units via the relay unit, and the one or more second heat exchangers exchange heat between the refrigerant and the air in the air-conditioned space.

16. The air-conditioning apparatus of claim 1, further comprising:

a second mixing device, installed on an inlet-side flow path of an expansion portion of the second expansion device and in the vicinity of the expansion portion of the second expansion device, that mixes a gaseous refrigerant and a liquid refrigerant in a two-phase gas-liquid refrigerant.

17. The air-conditioning apparatus of claim 16, wherein a distance between the expansion portion of the second expansion device and the second mixing device is less than or equal to six times an inner diameter of a pipe for the inlet-side flow path of the expansion portion of the second expansion device.

18. The air-conditioning apparatus of claim 1, wherein the first mixing device is formed with a porous metal having a porosity of 80% or greater.

19. The air-conditioning apparatus of claim 1, wherein the refrigerant is R32, a refrigerant mixture containing of R32 and HFO1234yf with an R32 mass ratio of 62% or greater, or a refrigerant mixture containing of R32 and HFO1234ze with an R32 mass ratio of 43% or greater.

\* \* \* \* \*